(12) United States Patent
Tsubata

(10) Patent No.: US 8,471,996 B2
(45) Date of Patent: Jun. 25, 2013

(54) LIQUID CRYSTAL PANEL, LIQUID CRYSTAL DISPLAY UNIT, LIQUID CRYSTAL DISPLAY DEVICE, AND TELEVISION RECEIVER

(75) Inventor: Toshihide Tsubata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 798 days.

(21) Appl. No.: 12/671,647

(22) PCT Filed: May 14, 2008

(86) PCT No.: PCT/JP2008/058801
§ 371 (c)(1),
(2), (4) Date: Feb. 1, 2010

(87) PCT Pub. No.: WO2009/019917
PCT Pub. Date: Feb. 12, 2009

(65) Prior Publication Data
US 2011/0115984 A1    May 19, 2011

(30) Foreign Application Priority Data
Aug. 9, 2007  (JP) .................................. 2007-208649

(51) Int. Cl.
    *G02F 1/1339*    (2006.01)
(52) U.S. Cl.
    USPC ....................................................... 349/155
(58) Field of Classification Search
    None
    See application file for complete search history.

(56) References Cited

U.S. PATENT DOCUMENTS

| | | | |
|---|---|---|---|
| 6,163,358 A | * | 12/2000 | Nonaka et al. ............... 349/155 |
| 6,501,527 B1 | * | 12/2002 | Hirose et al. ................ 349/155 |
| 6,795,153 B2 | * | 9/2004 | Suzuki ......................... 349/153 |
| 6,924,871 B2 | | 8/2005 | Washizawa et al. |
| 7,659,960 B2 | | 2/2010 | Doi et al. |
| 7,796,233 B2 | | 9/2010 | Park et al. |
| 7,936,438 B2 | | 5/2011 | Seo et al. |
| 2001/0005257 A1 | | 6/2001 | Yamada et al. |

(Continued)

FOREIGN PATENT DOCUMENTS

| | | |
|---|---|---|
| CN | 1499267 A | 5/2004 |
| CN | 1881015 A | 12/2006 |

(Continued)

OTHER PUBLICATIONS

U.S. Office Action mailed Jul. 28, 2011 in U.S. Appl. No. 12/515,448.

(Continued)

*Primary Examiner* — Lucy Chien
(74) *Attorney, Agent, or Firm* — Nixon & Vanderhye P.C.

(57) ABSTRACT

A liquid crystal panel includes: an active matrix substrate (3) including a transparent substrate (31) formed with a transistor, a pixel electrode, and a signal wire; a color filter substrate (30) including a transparent substrate (32) formed with a common electrode; a liquid crystal material (40) disposed between the substrates (3, 30); and a spherical main spacer (2*m*) contacting the active matrix substrate (3) and the color filter substrate (30). The active matrix substrate (3) has a surface including a sub spacer region (SA) away from the transparent substrate (31) at a distance shorter than a distance between the transparent substrate and a portion where the surface of the active matrix substrate (3) contacts the main spacer (2*m*). A spherical sub spacer (2*s*) is disposed to overlap the sub spacer region (SA). This provides a liquid crystal panel where liquid crystal bubbles hardly occur even when the liquid crystal material contracts due to low temperature, etc.

17 Claims, 33 Drawing Sheets

U.S. PATENT DOCUMENTS

| | | |
|---|---|---|
| 2004/0114090 A1 | 6/2004 | Washizawa et al. |
| 2004/0125315 A1* | 7/2004 | Park et al. ............... 349/153 |
| 2004/0141128 A1* | 7/2004 | Kim et al. ............... 349/138 |
| 2006/0170856 A1* | 8/2006 | Choi ............... 349/156 |
| 2006/0181667 A1 | 8/2006 | Doi et al. |
| 2006/0203177 A1* | 9/2006 | Cho et al. ............... 349/155 |
| 2006/0281211 A1 | 12/2006 | Yoon et al. |
| 2007/0002261 A1 | 1/2007 | Lee et al. |
| 2007/0019148 A1 | 1/2007 | Ueda |
| 2007/0146618 A1 | 6/2007 | Hashimoto |
| 2008/0024690 A1* | 1/2008 | Hirakata et al. ............... 349/54 |
| 2009/0122241 A1* | 5/2009 | Satoh ............... 349/106 |

FOREIGN PATENT DOCUMENTS

| | | |
|---|---|---|
| JP | 57-58124 | 4/1982 |
| JP | 8-122753 | 5/1996 |
| JP | 2001-033817 | 2/2001 |
| JP | 2001-183637 | 7/2001 |
| JP | 2004-145102 | 5/2004 |
| JP | 2005-10412 | 1/2005 |
| JP | 2005-258137 | 9/2005 |
| JP | 2006-171378 | 6/2006 |
| JP | 2006-208728 | 8/2006 |
| JP | 2006-208728 A | 8/2006 |
| JP | 2006-350306 | 12/2006 |

OTHER PUBLICATIONS

Notice of Allowance mailed Nov. 25, 2011 in U.S. Appl. No. 12/515,448.

International Search Report for PCT/JP2008/058801, mailed Jun. 17, 2008.

U.S. Appl. No. 12/515,448, Naoshi Yamada et al., filed May 19, 2009.

* cited by examiner

F I G. 7
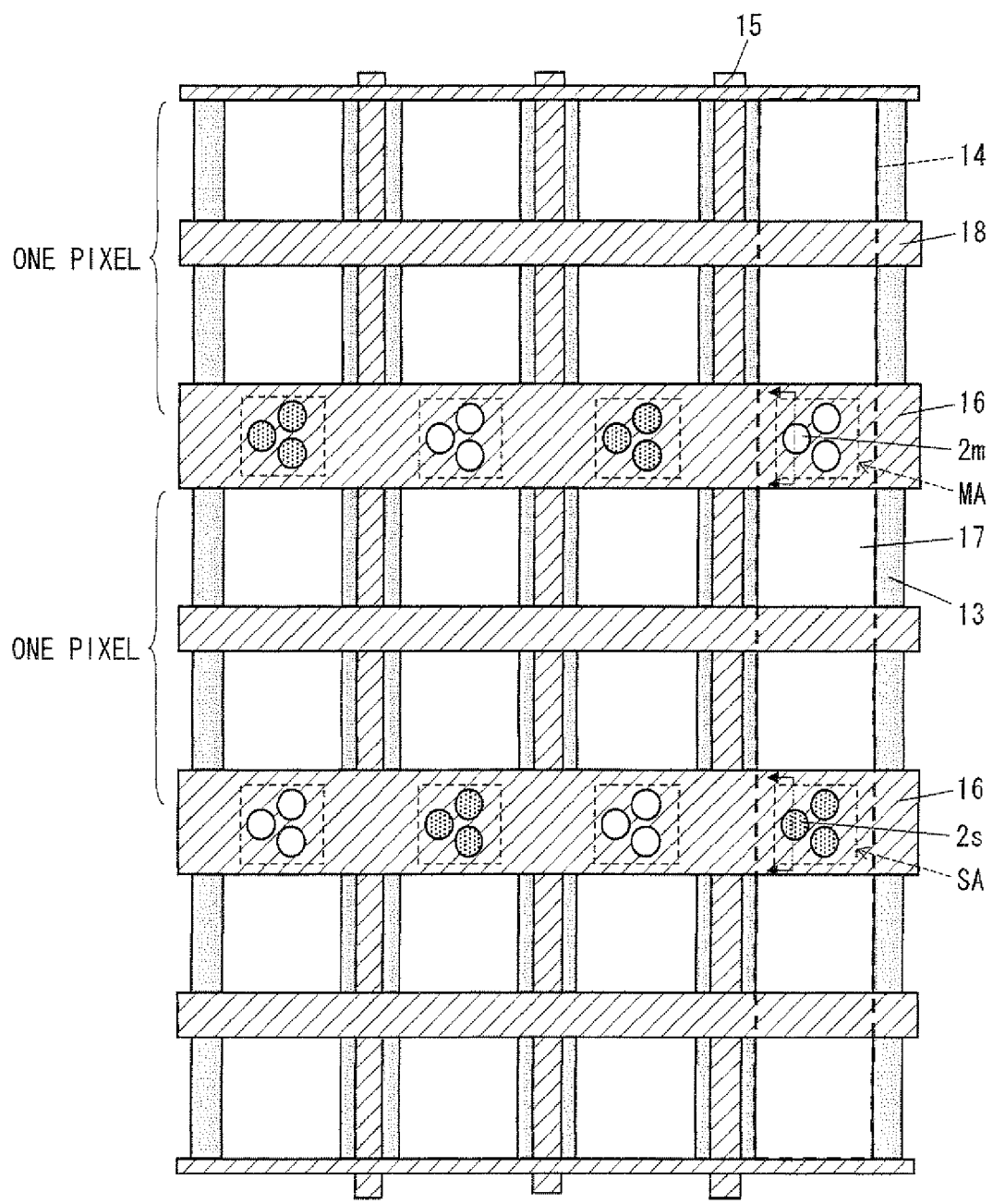

F I G. 8
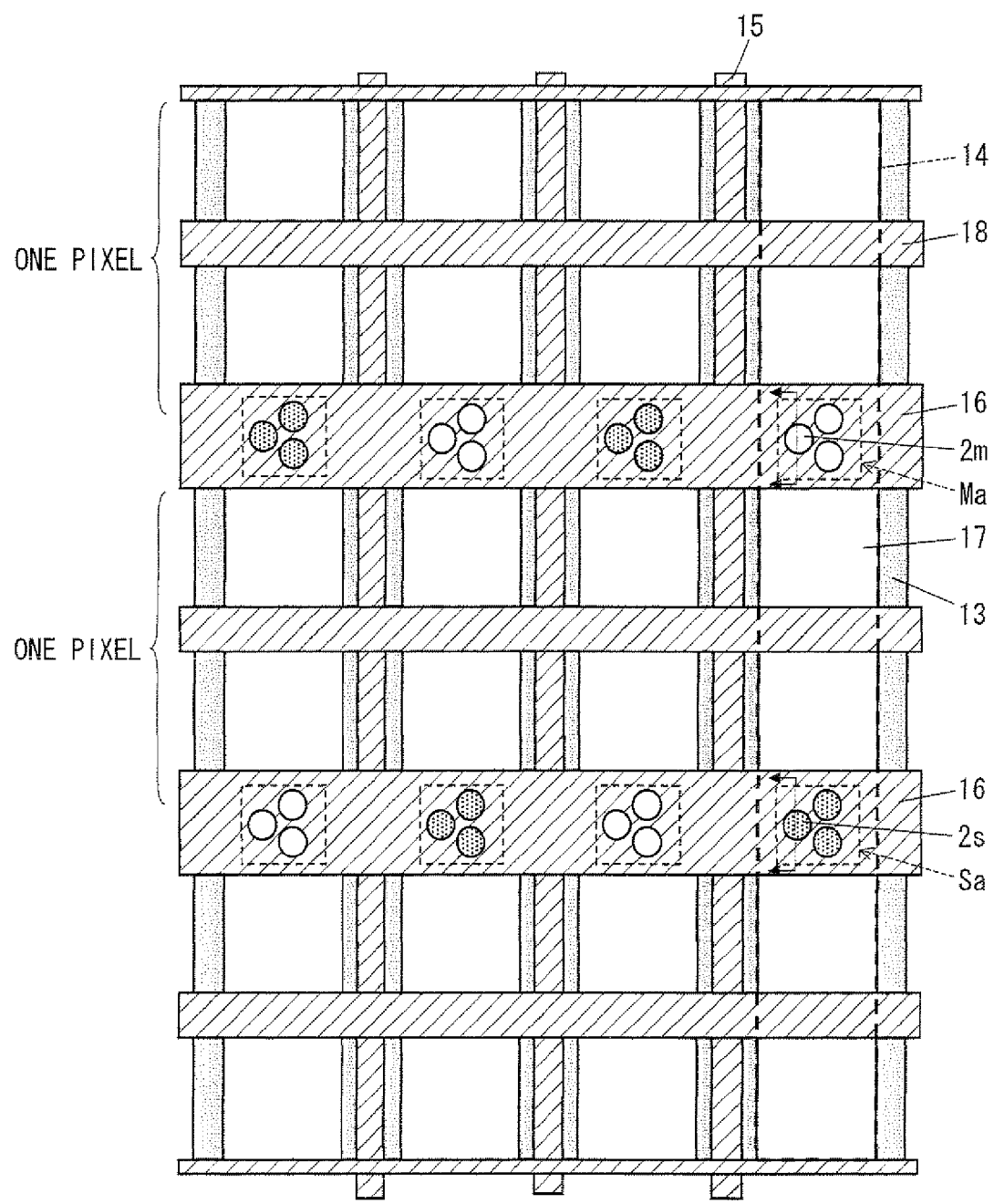

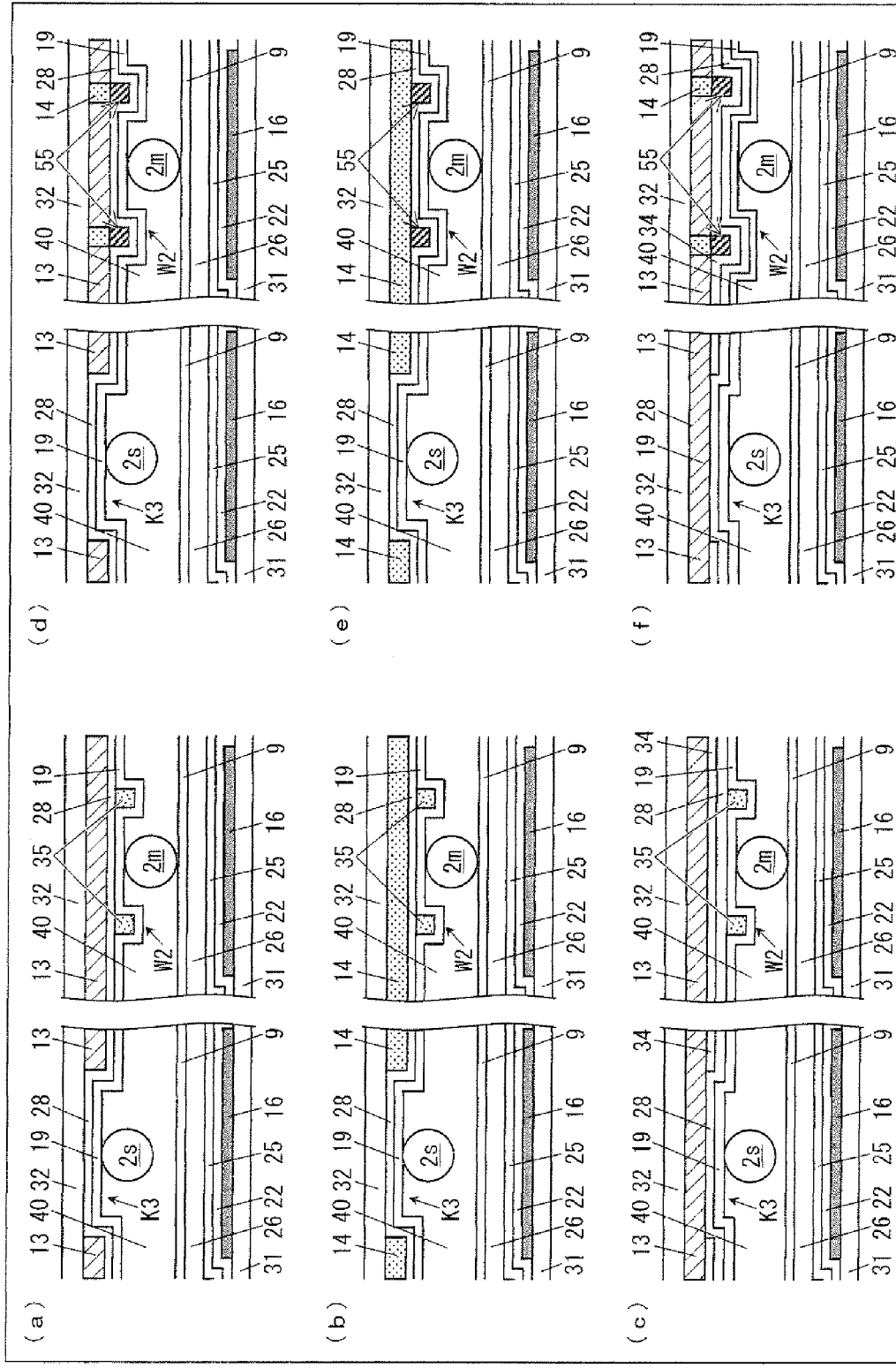
F I G. 15

LIQUID CRYSTAL PANEL, LIQUID CRYSTAL DISPLAY UNIT, LIQUID CRYSTAL DISPLAY DEVICE, AND TELEVISION RECEIVER

This application is the U.S. national phase of International Application No. PCT/JP2008/058801 filed 14 May 2008, which designated the U.S. and claims priority to JP Application No. 2007-208649 filed 9 Aug. 2007; the entire contents of each of which are hereby incorporated by reference.

TECHNICAL FIELD

The present invention relates to a liquid crystal panel including spacers.

BACKGROUND ART

A liquid crystal panel includes spacers disposed between (i) an active matrix substrate including a transparent substrate on which switching elements such as thin film transistors (TFTs) are formed and (ii) a color filter substrate including colored layers (color filter layer) of red, blue, and green. The spacers provide a gap between the active matrix substrate and the color filter substrate, in which gap a liquid crystal material is provided. Patent Literature 1 discloses a method for providing spherical spacers on an active matrix substrate or a color filter substrate by an ink-jet method.

Patent Literature 1: Japanese Patent Application Publication, Tokukai, No. 2005-10412 A (Publication Date: Jan. 13, 2005)

SUMMARY OF INVENTION

The inventors of the present invention found the following fact: When the liquid crystal material contracts at low temperature, the active matrix substrate and the color filter substrate are pressed by atmospheric pressure and the spacers elastically deform, resulting in a reduced gap between the active matrix substrate and the color filter substrate. Then, in a case where the liquid crystal material further contracts even after a degree of elastic deformation of the spacers reaches its limit, a space (liquid crystal bubble) may be created between the active matrix substrate and the color filter substrate in which space no liquid crystal material is present.

The present invention was made in view of this problem, and an object of the present invention is to provide, for a liquid crystal panel including a spherical spacer between an active matrix substrate and a color filter substrate, a configuration in which a liquid crystal bubble hardly occurs even when a liquid crystal material contracts due to low temperature, etc.

A liquid crystal panel of the present invention includes: a first substrate including a transparent substrate on which a transistor, a pixel electrode, and a signal line are formed; a second substrate including a transparent substrate on which a common electrode is formed; a liquid crystal material provided between the first substrate and the second substrate; and a main spacer which is spherical and is in contact with the first substrate and the second substrate, the first substrate having a surface provided with a region which is away from the transparent substrate in the first substrate at a distance shorter than a distance between (i) the transparent substrate in the first substrate and (ii) a portion where the surface of the first substrate and the main spacer are in contact with each other, and a sub spacer which is spherical being provided so as to overlap the region. Alternatively, this can be also expressed as follows: The first substrate has a surface provided with a region which is away from the transparent substrate in the first substrate at a distance shorter than a distance between (i) the transparent substrate in the first substrate and (ii) a portion where the surface of the first substrate and the main spacer overlap each other, and a sub spacer which is spherical is provided so as to overlap the region. Further, a liquid crystal panel of the present invention includes: a first substrate including a transparent substrate on which a transistor, a pixel electrode, and a signal line are formed; a second substrate including a transparent substrate on which a common electrode is formed; a liquid crystal material provided between the first substrate and the second substrate; and a main spacer which is spherical and is in contact with the first substrate and the second substrate, the second substrate having a surface provided with a region which is away from the transparent substrate in the second substrate at a distance shorter than a distance between (i) the transparent substrate in the second substrate and (ii) a portion where the surface of the second substrate and the main spacer are in contact with each other, and a sub spacer which is spherical being provided so as to overlap the region. Alternatively, this can be also expressed as follows: The second substrate has a surface provided with a region which is away from the transparent substrate in the second substrate at a distance shorter than a distance between (i) the transparent substrate in the second substrate and (ii) a portion where the surface of the second substrate and the main spacer overlap each other, and a sub spacer which is spherical is provided so as to overlap the region. The first substrate is, for example, an active matrix substrate, and the second substrate is, for example, a color filter substrate.

The liquid crystal panel of the present invention may be configured such that: a diameter of the main spacer is equal to a diameter of the sub spacer. With this configuration, the main spacer is in contact with both of the first and second substrates, whereas the sub spacer is merely in contact with (touches) one of the first and second substrates. When the liquid crystal material contracts due to low temperature, etc., the first substrate and the second substrate are pressed by atmospheric pressure, resulting in elastic deformation of the main spacer. This reduces a gap between the first substrate and the second substrate, thereby causing the sub spacer to come in contact with both of the first substrate and the second substrate. That is to say, in a case where the liquid crystal material further contracts even after a degree of elastic deformation of the main spacer reaches its limit, the sub spacer functions to prevent a liquid crystal bubble (i.e., a space between the first substrate and the second substrate in which space no liquid crystal material is present) which occurs due to low temperature, etc.

The liquid crystal panel of the present invention may be configured such that: the region overlaps at least one of a scanning signal line formed in the first substrate, a retention capacitor wire formed in the first substrate, and a light shielding layer formed in the second substrate. Thus, the spacer is provided in a light-shielded region, and this makes it possible to reduce an effect of the spacer on display.

The liquid crystal panel of the present invention may be configured such that: the region is defined by a first recess provided on the surface of the first substrate. In this case, the second substrate may have a surface including a portion which overlaps the sub spacer and which is recessed. Further, the surface of the first substrate may be formed with a protruded wall surrounding the main spacer. Furthermore, the second substrate may have a surface formed with a protruded wall surrounding a portion of the surface of the second substrate which portion overlaps the main spacer. Moreover, the main spacer may be provided so as to overlap a second recess which is formed on the surface of the first substrate and which is shallower than the first recess. Furthermore, the second substrate may have a surface including a portion which overlaps the sub spacer and which is recessed; and the surface of the second substrate may include a portion which overlaps the main spacer and which is recessed. Moreover, the second substrate may have a surface formed with a protruded wall surrounding a portion of the surface of the second substrate which portion overlaps the sub spacer. This makes it possible to limit movements of the (spherical) sub spacer and the (spherical) main spacer, while preventing a liquid crystal bubble which occurs due to low temperature, etc. Note that the first recess can be formed by a contact hole through which the transistor and the pixel electrode are electrically connected with each other.

The liquid crystal panel of the present invention may be configured such that: the region is defined by a third recess provided on the surface of the second substrate. In this case, the first substrate may have a surface including a portion which overlaps the sub spacer and which is recessed. Further, the surface of the second substrate may be formed with a protruded wall surrounding the main spacer. Furthermore, the first substrate may have a surface formed with a protruded wall surrounding a portion of the surface of the first substrate which portion overlaps the main spacer. Moreover, the main spacer may be provided so as to overlap a fourth recess which is formed on the surface of the second substrate and which is shallower than the third recess. Furthermore, the first substrate may have a surface including a portion which overlaps the sub spacer and which is recessed; and the surface of the first substrate may include a portion which overlaps the main spacer and which is recessed. Moreover, the first substrate may have a surface formed with a protruded wall surrounding a portion of the surface of the first substrate which portion overlaps the sub spacer. This makes it possible to limit movements of the (spherical) sub spacer and the (spherical) main spacer, while preventing a liquid crystal bubble which occurs due to low temperature, etc.

The liquid crystal panel of the present invention may be configured such that: the first recess is formed by hollowing out an insulating film formed in the first substrate or by making the insulating film partially thinner. In this case, the insulating film may be formable by coating. Further, the insulating film may include an organic matter. Furthermore, the insulating film may include at least one of a spin-on-glass, acrylic resin, epoxy resin, polyimide resin, polyurethane resin, novolac resin, and polysiloxane resin. Here, "X resin" refers to X or an X analogue compound. For example, acrylic resin refers to an acrylic or an acrylic analogue compound (the same applies to the other resins). Further, the insulating film may have photosensitivity. Furthermore, the insulating film may be a gate insulating film. In this case, the gate insulating film may include a plurality of layers; and at least one of the plurality of layers may be locally hollowed out. Further, the insulating film may be an interlayer insulating film provided above a gate insulating film. In this case, the interlayer insulating film may include a plurality of layers; and at least one of the plurality of layers may be locally hollowed out.

The liquid crystal panel of the present invention may be configured such that: the third recess is formed by partially hollowing out a light shielding layer or by making the light shielding layer partially thinner. In this case, the light shielding layer may constitute a black matrix. Further, the light shielding layer may be formable by coating. Furthermore, the third recess may be formed by partially hollowing out an insulating film formed above a light shielding layer or by making the insulating film partially thinner.

The liquid crystal panel of the present invention may be configured such that: the protruded wall includes a metal layer or a semiconductor layer, the metal layer and a data signal line being formed in the same step, the semiconductor layer and a channel section of the transistor being formed in the same step. Further, the protruded wall and a portion surrounded by the protruded wall may overlap at least one of a scanning signal line formed in the first substrate, a retention capacitor wire formed in the first substrate, and a light shielding layer formed in the second substrate. Furthermore, the protruded wall may include an insulator, the insulator and an alignment controlling rib being formed in the same step. Moreover, the second substrate may include a colored layer; and at least part of the protruded wall may be formed by an overlap of (i) an end of the colored layer and (ii) a light shielding layer.

The liquid crystal panel of the present invention may be configured such that: a plurality of sub spacers are provided so as to overlap the first recess. Further, a plurality of sub spacers may be provided so as to overlap the third recess. Furthermore, the main spacer and the sub spacer may be provided by means of an ink-jet method. Moreover, an area of the first recess is set based on (i) the number of sub spacer(s) to be provided in the first recess and (ii) each size of the sub spacer(s). An area of the third recess is set based on (i) the number of sub spacer(s) to be provided in the third recess and (ii) each size of the sub spacer(s). Furthermore, the sub spacer(s) may be provided with use of an ink-jet device; and the area may be determined also based on a droplet landing accuracy of the ink-jet device.

The liquid crystal panel of the present invention may be configured such that: a step portion formed by the first recess surrounds the sub spacer. Further, a step portion formed by the third recess may surround the sub spacer. With this configuration, movement of the sub spacer is limited by the step portion. Therefore, even in a case where the sub spacer moves due to vibrations of the panel or an impact given to the panel, it is possible to suppress the movement of the sub spacer to a very small extent. This improves evenness of a cell gap. This effect is prominently observed in a case where a spherical spacer is used in a large panel which bends easily (i.e., in which a sub spacer moves easily) due to vibrations or an impact.

A liquid crystal display unit of the present invention includes the above-described liquid crystal panel and a driver. A liquid crystal display device of the present invention includes the liquid crystal display unit and an illumination device. A television receiver of the present invention includes the liquid crystal display device and a tuner section for receiving television broadcasting.

According to a liquid crystal panel of the present invention, in a case where a liquid crystal material further contracts even after a degree of elastic deformation of a main spacer reaches its limit, a sub spacer functions to prevent a liquid crystal bubble which occurs due to low temperature, etc.

BRIEF DESCRIPTION OF DRAWINGS

FIG. 4 is a cross-section view of the liquid crystal panel shown in FIG. 1, observed when the liquid crystal contracts.

FIG. 5 is a cross-section view of the liquid crystal panel shown in FIG. 2, observed in a normal state.

FIG. 6 is a cross-section view of the liquid crystal panel shown in FIG. 2, observed when the liquid crystal contracts.

FIG. 7

FIG. 7 is a plan view illustrating further another configuration of a liquid crystal panel of the present invention.

FIG. 8

FIG. 8 is a plan view illustrating still another configuration of a liquid crystal panel of the present invention.

FIG. 9, related to Embodiment 1, shows cross-section views illustrating other configurations of the liquid crystal panel.

FIG. 10, related to Embodiment 2, shows cross-section views illustrating other configurations of the liquid crystal panel.

FIG. 11, related to Embodiment 3, shows cross-section views illustrating configurations of the liquid crystal panel.

FIG. 12, related to Embodiment 3, shows cross-section views illustrating other configurations of the liquid crystal panel.

FIG. 13, related to Embodiment 4, shows cross-section views illustrating configurations of the liquid crystal panel.

FIG. 14, related to Embodiment 5, shows cross-section views illustrating configurations of the liquid crystal panel.

FIG. 15

FIG. 15, related to Embodiment 6, shows cross-section views illustrating configurations of the liquid crystal panel.

FIG. 16, related to Embodiment 7, shows cross-section views illustrating configurations of the liquid crystal panel.

FIG. 17, related to Embodiment 8, shows cross-section views illustrating configurations of the liquid crystal panel.

FIG. 18, related to Embodiment 8, shows cross-section views illustrating other configurations of the liquid crystal panel.

FIG. 19, related to Embodiment 9, shows cross-section views illustrating configurations of the liquid crystal panel.

FIG. 20, related to Embodiment 9, shows cross-section views illustrating other configurations of the liquid crystal panel.

FIG. 21, related to Embodiment 9, shows cross-section views illustrating other configurations of the liquid crystal panel.

FIG. 22, related to Embodiment 9, shows cross-section views illustrating other configurations of the liquid crystal panel.

FIG. 23, related to Embodiment 10, shows cross-section views illustrating configurations of the liquid crystal panel.

FIG. 24, related to Embodiment 11, shows cross-section views illustrating configurations of the liquid crystal panel.

FIG. 25, related to Embodiment 12, shows cross-section views illustrating configurations of the liquid crystal panel.

FIG. 26 is a plan view illustrating yet another configuration of a liquid crystal panel of the present invention.

FIG. 27 is a plan view illustrating still yet another configuration of a liquid crystal panel of the present invention.

FIG. 28 is a cross-section view illustrating a configuration of a liquid crystal panel of another embodiment.

FIG. 29 is a cross-section view illustrating a configuration of a liquid crystal panel of further another embodiment.

FIG. 30(*a*) to (*e*) of FIG. 30 show (part of) manufacturing steps of a liquid crystal panel of the present invention.

FIG. 31(*a*) to (*f*) of FIG. 31 show (part of) another manufacturing steps of a liquid crystal panel of the present invention.

FIG. 32, related to Embodiment 13, shows cross-section views illustrating configurations of the liquid crystal panel.

FIG. 33 shows cross-section views each illustrating an example of a configuration of a color filter substrate included in a liquid crystal panel of the present invention.

FIG. 34 is a view specifically illustrating a configuration of a liquid crystal display unit of the present invention.

FIG. 35 is a block diagram illustrating how a liquid crystal display device of the present invention operates.

FIG. 36 is a block diagram illustrating how a television receiver of the present invention operates.

FIG. 37 is an exploded perspective view illustrating a configuration of a television receiver of the present invention.

REFERENCE SIGNS LIST

Figure 1:
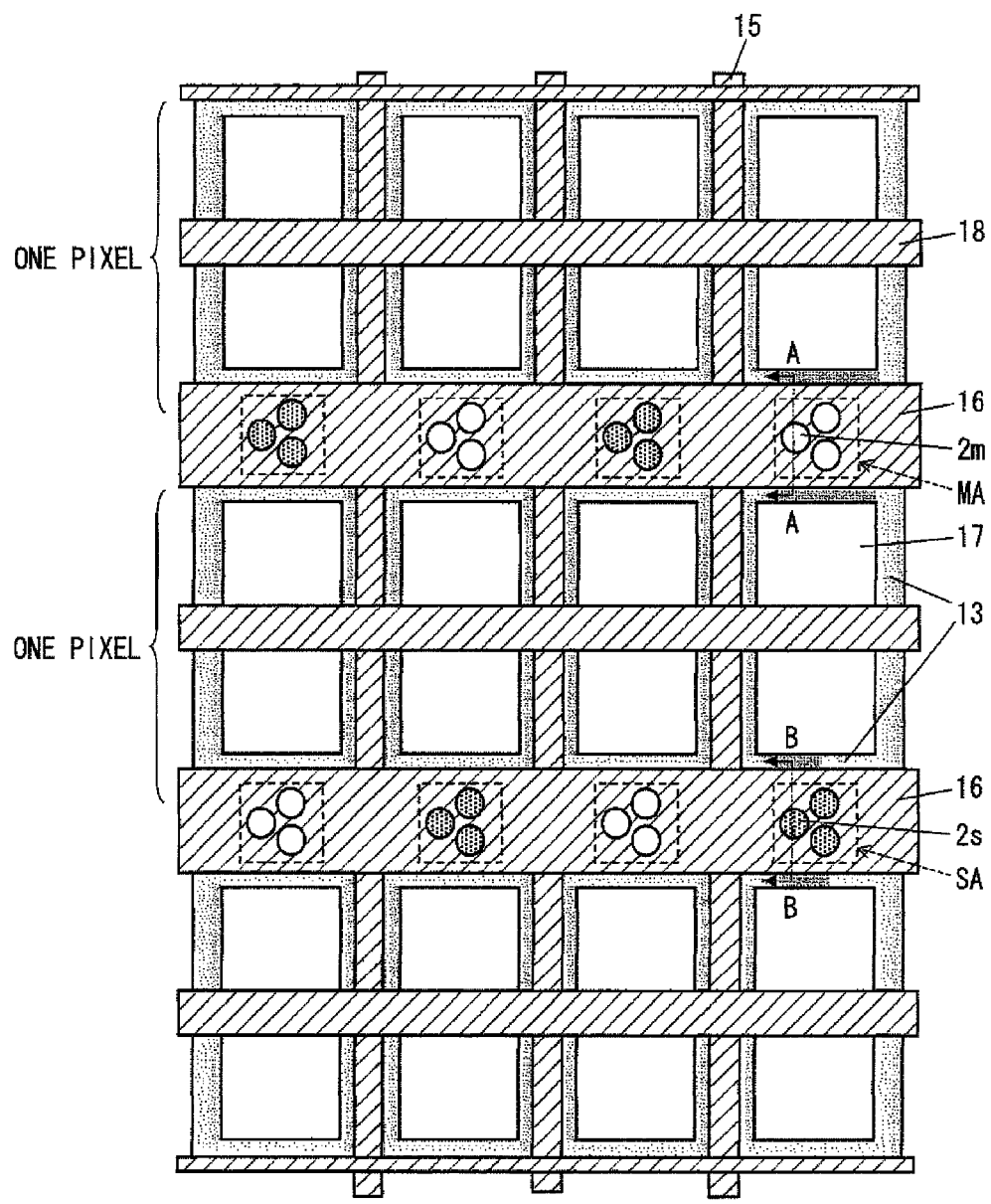
FIG. 1
FIG. 1 is a plan view illustrating a configuration of a liquid crystal panel of the present invention.

2*m* Main spacer
2*s* Sub spacer
3 Active matrix substrate
9, 19 Alignment films
13 Light shielding layer (black matrix)
14 Colored layer
15 Data signal line
16 Scanning signal line
17 Pixel electrode
18 Retention capacitor wire
22 Inorganic gate insulating film
25 Inorganic interlayer insulating film
26 Organic interlayer insulating film
28 Common electrode
30 Color filter substrate
31, 32 Transparent substrates
40 Liquid crystal material
100 Liquid crystal display unit
110 Liquid crystal display device
601 Television receiver

DESCRIPTION OF EMBODIMENTS

One embodiment of the present invention will be described below with reference to FIG. 1 to FIG. 35. FIG. 1 is a plan view illustrating one example of a configuration of a liquid crystal panel of the present invention. This liquid crystal panel includes an active matrix substrate, a color filter substrate facing the active matrix substrate, and a liquid crystal material disposed between the active matrix substrate and the color filter substrate.

The active matrix substrate includes: scanning signal lines 16 extending along a row direction (i.e., a transverse direction in FIG. 1); retention capacitor wires 18 extending along the row direction (i.e., the transverse direction in FIG. 1); data signal lines 15 extending along a column direction (i.e., an up-and-down direction in FIG. 1); pixel electrodes 17; and a transistor (not illustrated). The transistor (not illustrated) is formed in the vicinity of a part where the data signal line 15 and the scanning signal line 16 intersect with each other. A gate electrode of the transistor is connected with the scanning signal line 16, a drain electrode of the transistor is connected with the pixel electrode 17, and a source electrode of the transistor is connected with the data signal line 15. Each pixel electrode 17 is provided in a pixel region divided by the scanning signal lines 16 and the data signal lines 15. The retention capacitor wires 18 are provided so as to extend across the pixel regions (i.e., so as to overlap the pixel electrodes 17), so that a retention capacitance is formed between the retention capacitor wires 18 and the pixel electrodes 17. Note that each of the above-mentioned wires (the data signal lines 15, the scanning signal lines 16, and the retention capacitor wires 18) is made of a light blocking metal film.

The color filter substrate includes: a light shielding layer 13, which is a black matrix; colored layers 14 (color filter), each of which is formed in a region surrounded by the light shielding layer 13 and is colored with one of red (R), green (G), and blue (B); and a common electrode (not illustrated). The light shielding layer 13 is formed so as to overlap the data signal lines 15 and the scanning signal lines 16 included in the active matrix substrate, and the colored layers 14 are formed so as to overlap the pixel electrodes of the active matrix substrate. Further, the liquid crystal material is sealed in a portion surrounded by the active matrix substrate, the color filter substrate, and a seal (not illustrated) between the active matrix substrate and the color filter substrate. One pixel is constituted by: a pixel region of the active matrix substrate; a counter region of the color filter substrate which region faces the pixel region; and part of the liquid crystal material which part is sandwiched by the pixel region of the active matrix substrate and the counter region of the color filter substrate.

Figure 3:
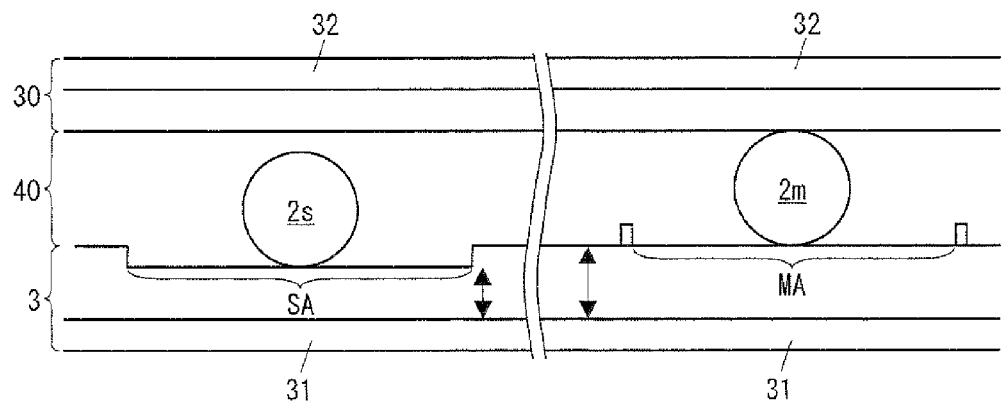
FIG. 3
FIG. 3 is a cross-section view of the liquid crystal panel shown in FIG. 1, observed in a normal state.

FIG. 3 shows a cross section of FIG. 1 along A-A line and a cross section of FIG. 1 along B-B line. As shown in FIG. 1 and FIG. 3, in the present embodiment, there are main spacers 2m and sub spacers 2s between an active matrix substrate 3 and a color filter substrate 30. Each of the main spacer 2m and the sub spacer 2s is a bead spacer having a spherical shape.

Specifically, the active matrix substrate 3 includes a surface which faces the liquid crystal material and on which main spacer regions MA each having a quadrangular shape and sub spacer regions SA each having a quadrangular shape are alternately formed at a certain interval so as to overlap the scanning signal line 16 and the light shielding layer 13. Further, on each of the main spacer regions MA, three main spacers 2m are provided (so as to overlap the main spacer region MA); and on each of the sub spacer regions SA, three sub spacers 2s are provided (so as to overlap the sub spacer region SA). The sub spacer region SA is a recess (first recess) locally provided on the surface of the active matrix substrate, which recess forms a step portion (four sides constituting an edge of the sub spacer region SA) surrounding the sub spacers 2s. The main spacer region MA is a region of the surface of the active matrix substrate, which region overlaps the main spacers 2m.

The main spacer region MA or the sub spacer region SA is provided for one pixel, and these regions (MA, SA) are arranged in a staggered pattern. For example, in a case where a scanning signal line includes (i) main spacer regions MA formed so as to correspond to pixels in even-numbered columns and (ii) sub spacer regions SA formed so as to correspond to pixels in odd-numbered columns, another scanning signal line adjacent to said scanning signal line includes (i) main spacer regions MA formed so as to correspond to pixels in odd-numbered columns and sub spacer regions SA formed so as to correspond to pixels in even-numbered columns.

Here, as shown in FIG. 3, since the sub spacer region SA is a recess provided on the surface of the active matrix substrate 3, a distance between the sub spacer region SA and a transparent substrate 31 (i.e., the transparent substrate included in the active matrix substrate 3) is shorter than a distance between the main spacer region MA and the transparent substrate 31. A diameter of the main spacer 2m and a diameter of the sub spacer 2s are substantially equal to each other (e.g., a variation coefficient CV is less than 3%).

Figure 4:
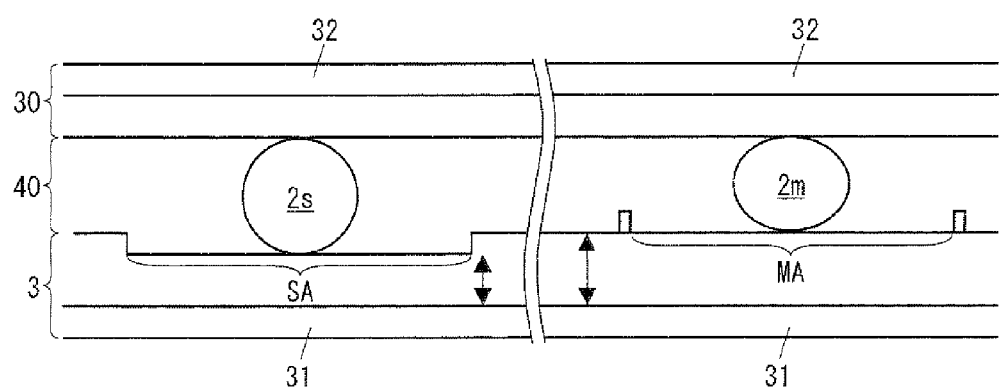
FIG. 4

That is, in a normal state, the main spacers 2m are in contact with (touches) the active matrix substrate 3 and the color filter substrate 30, whereas the sub spacers 2s are merely in contact with (touches) the active matrix substrate 3, and are not come in contact with the color filter substrate 30. However, when the liquid crystal material contracts due to low temperature, etc., the active matrix substrate 3 and the color filter substrate 30 are pressed by atmospheric pressure, resulting in elastic deformation of the main spacers 2m as shown in FIG. 4. This reduces a gap between the active matrix substrate 3 and the color filter substrate 30, thereby causing the sub spacers 2s to come in contact with both of the active matrix substrate 3 and the color filter substrate 30. In a case where the liquid crystal material further contracts even after a degree of elastic deformation of the main spacers 2m reaches its limit, the sub spacers 2s function to prevent a liquid crystal bubble (i.e., a space between the active matrix substrate 3 and the color filter substrate 30 in which space no liquid crystal material is present) which occurs due to low temperature, etc. Further, since the step portion of each sub spacer region SA (first recess) surrounds the sub spacers 2s, movement of the sub spacers 2s is restricted by the step portion. Therefore, even in a case where the sub spacers 2s move due to vibrations of the panel or an impact given to the panel, it is possible to suppress the movement of the sub spacers to a very small extent. This improves evenness of a cell gap. This effect is prominently observed in a case where spherical spacers are used in a large panel which bends easily (i.e., in which sub spacers 2s move easily) due to vibrations or an impact.

In FIG. 1, the main spacer regions MA and the sub spacer regions SA are formed on the surface of the active matrix substrate 3 which surface faces the liquid crystal material. However, as shown in FIG. 2 and FIG. 5, main spacer regions Ma and sub spacer regions Sa may be formed on a surface of the color filter substrate 30 which surface faces the liquid crystal material so that the main spacer regions Ma and the sub spacer regions Sa overlap the scanning signal line 16 and the light shielding layer 13.

Figure 2:
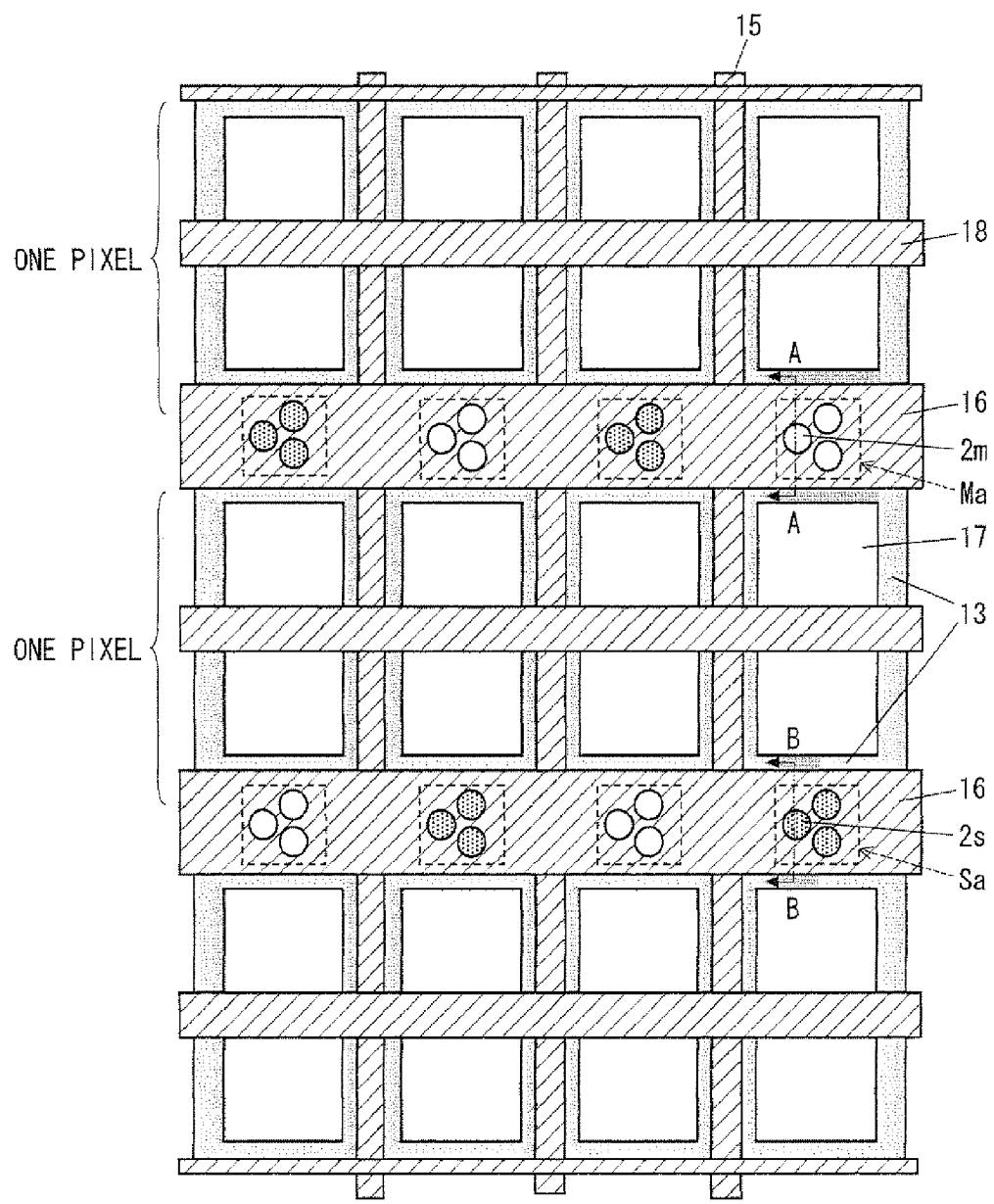
FIG. 2
FIG. 2 is a plan view illustrating another configuration of a liquid crystal panel of the present invention.
Figure 5:
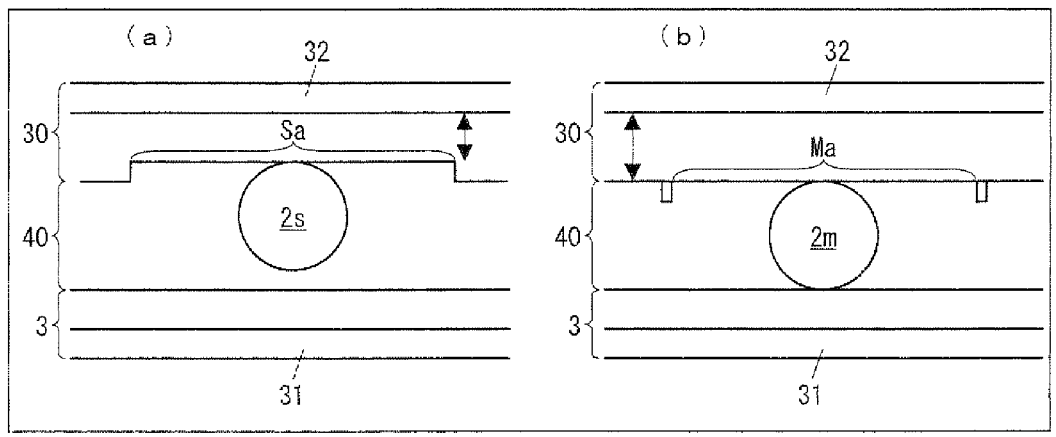
FIG. 5

FIG. 5 shows a cross section of FIG. 2 along A-A line and a cross section of FIG. 2 along B-B line. Also in this configuration, on each of the main spacer regions Ma, three main spacers 2m are provided (so as to overlap the main spacer region Ma); and on each of the sub spacer regions Sa, three sub spacers 2s are provided (so as to overlap the sub spacer region Sa). The sub spacer region Sa is a recess (third recess) locally provided on the surface of the color filter substrate, which recess forms a step portion (four sides constituting an edge of the sub spacer region Sa) surrounding the sub spacers 2s. The main spacer region Ma is a region of the surface of the color filter substrate which region overlaps the main spacers 2m.

Here, as shown in FIG. 2 and FIG. 5, since the sub spacer region Sa is a recess provided on the surface of the color filter substrate 30, a distance between the sub spacer region Sa and a transparent substrate 32 (i.e., the transparent substrate included in the color filter substrate) is shorter than a distance between the main spacer region Ma and the transparent substrate 32. A diameter of the main spacer 2m and a diameter of the sub spacer 2s are substantially equal to each other (e.g., a variation coefficient CV is less than 3%).

Figure 6:
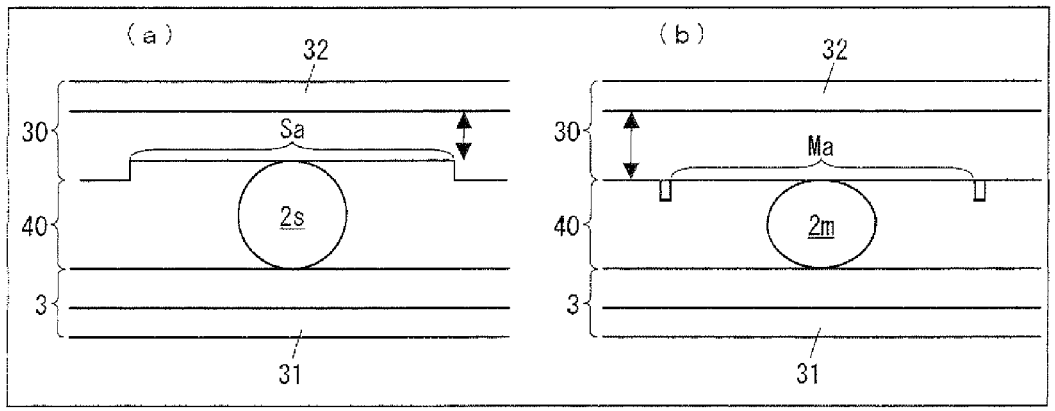
FIG. 6

That is, in a normal state, the main spacers 2m are in contact with the active matrix substrate 3 and the color filter substrate 30, whereas the sub spacers 2s are merely in contact with the color filter substrate 30, and are not in contact with the active matrix substrate 3. However, when the liquid crystal material contracts due to low temperature, etc., the active matrix substrate 3 and the color filter substrate 30 are pressed by atmospheric pressure, resulting in elastic deformation of the main spacers 2m as shown in FIG. 6. This reduces a gap between the active matrix substrate 3 and the color filter substrate 30, thereby causing the sub spacers 2s to come in contact with both of the active matrix substrate 3 and the color filter substrate 30. In a case where the liquid crystal material further contracts even after a degree of elastic deformation of the main spacers 2m reaches its limit, the sub spacers 2s function to prevent a liquid crystal bubble (i.e., a space between the active matrix substrate 3 and the color filter substrate 30 in which space no liquid crystal material is present) which occurs due to low temperature, etc. Further, since the step portion of each sub spacer region Sa (third recess) surrounds the sub spacers 2s, movement of the sub spacers 2s is restricted by the step portion. Therefore, even in a case where the sub spacers 2s move due to vibrations of the panel or an impact given to the panel, it is possible to suppress the movement of the sub spacers 2s to a very small extent.

This improves evenness of a cell gap. This effect is prominently observed in a case where spherical spacers are used in a large panel which bends easily (i.e., in which sub spacers 2s move easily) due to vibrations or an impact.

Figure 26:
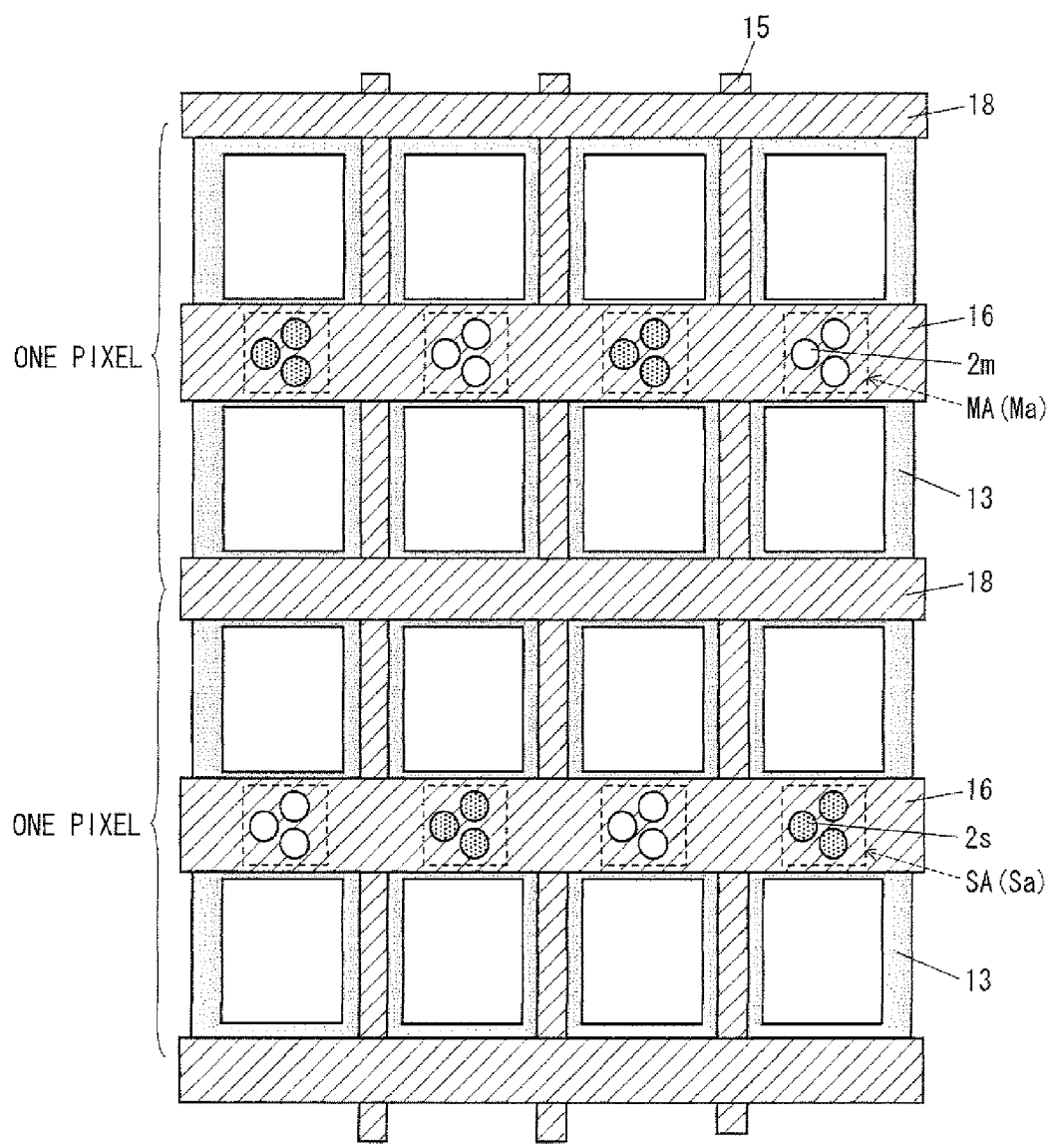
FIG. 26

In each of the liquid crystal panels shown in FIG. 1 and FIG. 2, the light shielding layer 13 has a matrix pattern. However, as shown in FIG. 7 and FIG. 8, the light shielding layer 13 and the colored layer 14 may have a stripe pattern. Further, in each of the liquid crystal panels shown in FIG. 1 and FIG. 2, one pixel region is provided with one pixel electrode. However, a liquid crystal panel of the present invention may have a configuration (a pixel splitting configuration; a multi-pixel driving method) as shown in FIG. 26 in which one pixel region is provided with two pixel electrodes.

The following description deals with one example of a manufacturing method of an active matrix substrate.

Firstly, a film of a metal such as titanium, chrome, aluminum, molybdenum, tantalum, tangsten, or copper or an alloy thereof is formed on a transparent insulating substrate (transparent substrate) by means of e.g., sputtering. Then, the metal film or alloy film thus formed is patterned by e.g., photo-etching so that the metal film or alloy film has a required shape. Thus, scanning signal lines (gate electrodes of transistors) and retention capacitor wires, each having a thickness of approximately 0.5 μm, are formed.

Subsequently, an inorganic gate insulating film having a thickness of approximately 0.4 μm and a semiconductor layer (a high resistance semiconductor layer and a low resistance semiconductor layer) having a thickness of approximately 0.2 μm are successively formed by e.g., plasma CVD (chemical vapor deposition), and then the inorganic gate insulating film and the semiconductor layer are patterned by e.g., photo-etching. Note that an organic gate insulating film (e.g., a planarizing film) which is thicker than the inorganic gate insulating film may be formed below the inorganic gate insulating film (but above the transparent substrate), and may be patterned so as to have a desired shape.

Next, data signal lines, and drain electrodes and source electrodes of transistors, each having a thickness of approximately 0.3 μm, are formed. The data signal lines, the drain electrodes, and the source electrodes can be formed in the same step. Specifically, a film of a metal such as titanium, chrome, aluminum, molybdenum, tantalum, tangsten, or copper or an alloy thereof is formed by means of e.g., sputtering, and the metal film or alloy film thus formed is patterned by e.g., photo-etching so that the metal film or alloy film has a required shape.

Then, using the data signal lines, the source electrodes, and the drain electrodes as a mask, the high resistance semiconductor layer (i layer) made of e.g., amorphous silicon and the low resistance semiconductor layer (n+ layer) made of e.g., n+ amorphous silicon are dry-etched so that channels are formed. Through this process, a thickness of the i layer is optimized, so that transistor (TFT) is formed. In this process, portions of the semiconductor layer which portions are not covered with the data signal lines, the source electrodes, and the drain electrodes are removed by the etching, so that a thickness of the i layer required for retaining the capability of the TFT is maintained.

Subsequently, an interlayer insulating film which protects (i.e., covers) the channel of the TFT is formed. For example, a plasma CVD or the like is carried out to form an inorganic interlayer insulating film which is made of a silicon nitride or an oxide silicon and has a thickness of approximately 0.3 μm. Note that an organic interlayer insulating film which is thicker than the inorganic interlayer insulating film may be formed on the inorganic interlayer insulating film. Then, the interlayer insulating film is etched so as to have a desired shape. The etching is carried out by, for example, subjecting a photosensitive resist to patterning by photolithography (exposure and development).

After that, a conductive film having transparency is formed on the interlayer insulating film by e.g., sputtering ITO, IZO, zinc oxide, tin oxide, or the like so that it has a thickness of approximately 0.1 μm. Then, the conductive film is patterned by e.g., photo-etching so as to have a required shape.

Then, an alignment film is applied thereto by e.g., an ink-jet method. Thus, an active matrix substrate is manufactured.

Next, the following description deals with one example of a manufacturing method of a color filter substrate.

Firstly, a first to third colored layers corresponding to respective three primary colors (red, green, blue) are formed. Specifically, a negative acrylic photosensitive resin in which red pigment is dispersed is applied to a transparent substrate by e.g., spin-coating. After that, the negative acrylic photosensitive resin thus applied is dried, is subjected to exposure using a photo mask, and then is subjected to development. This, a red colored layer is formed. Thereafter, a green colored layer and a blue colored layer are formed by a procedure similar to that for the red colored layer.

Subsequently, the colored layers thus formed are coated with a negative acrylic black photosensitive resin film in which carbon particles are dispersed by e.g., spin-coating. After that, the negative acrylic black photosensitive resin film thus applied is dried, is subjected to exposure using a photo mask, and then is subjected to development. Thus, a light shielding layer (black matrix) is formed.

After the colored layers and the light shielding layer are formed as described above, a common electrode (common electrode) made of a transparent electrode such as ITO is formed by sputtering, and an alignment film is applied on the common electrode by e.g., an ink-jet method. Thus, a color filter substrate is formed. Note that an overcoating film, which is an insulating film, may be formed between (i) the colored layers and the light shielding layer and (ii) the common electrode, and may be patterned in a desired shape. The colors of the colored layers are not limited to three primary colors (red, green, blue). Instead of the colored layers of the three primary colors (red, green, blue), colored layers of e.g., cyan, magenta, and yellow may be formed.

Note that, in the following description, what is meant by "on . . . " is "on a side which is closer to a liquid crystal layer than . . . is", and what is meant by "an upper layer of . . . " is "a layer on a side which is closer to a liquid crystal layer than . . . is".

[Embodiment 1]

Figure 9:
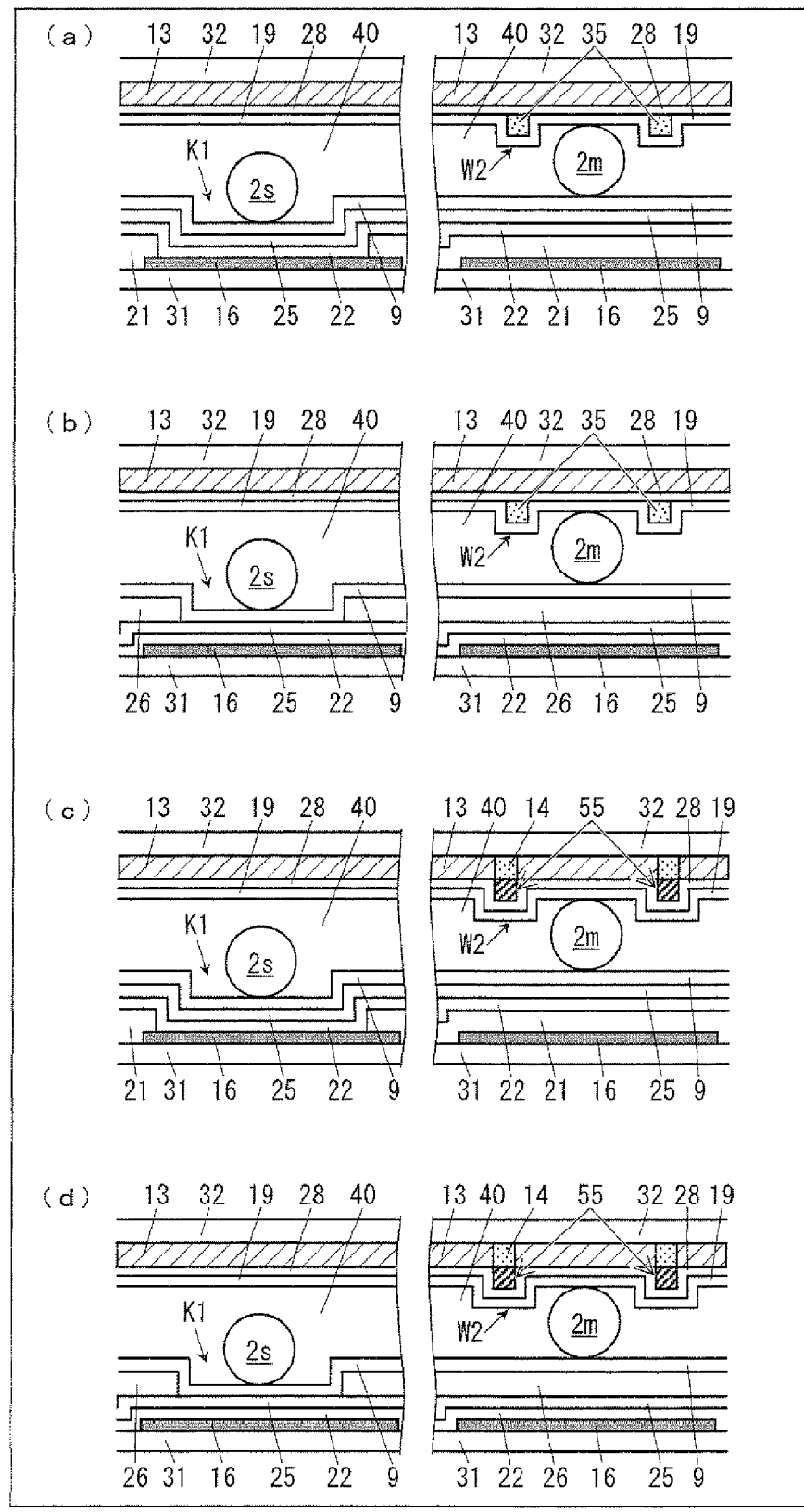
FIG. 9

(a) to (d) of FIG. 9 show specific examples of a configuration of the liquid crystal panel shown in FIG. 1, and are cross-section views of the main spacer region MA and the sub spacer region SA shown in FIG. 1. In the present embodiment, an active matrix substrate 3 includes a surface which faces a liquid crystal material 40 and on which a main spacer region MA directed to include a main spacer 2*m* and a sub spacer region SA directed to include a sub spacer 2*s* are provided so that the main spacer region MA and the sub spacer region SA overlap a scanning signal line 16 and a light shielding layer 13. Each of the sub spacer region SA and the main spacer region MA has a quadrangular shape.

The configuration shown in (a) of FIG. 9 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a portion of the organic gate insulating film 21 which portion corresponds to the sub spacer region SA is hollowed out in a quadrangular shape. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32, and a common electrode 28 is formed so as to cover the light shielding layer 13. Here, in order to form, on the surface of the color filter substrate, a protruded wall W2 surrounding a region (hereinafter, referred to as MA counter region) which faces a main spacer region MA, a rib 35 is formed on a portion of the common electrode 28 which portion corresponds to the protruded wall W2. Further, an alignment film 19 is formed so as to cover the common electrode 28 and the rib 35. Note that the rib 35 can be formed at the same time when an alignment controlling rib is formed on the color filter substrate.

As described above, in the configuration shown in (a) of FIG. 9, the first recess K1, which serves as the sub spacer region SA, is formed by locally hollowing out the organic gate insulating film 21; and the protruded wall W2, which surrounds the MA counter region, is formed by forming the rib 35 on the common electrode 28. This makes it possible to limit movement of the sub spacer 2*s* by means of the first recess K1, and also to limit movement of the main spacer 2*m* by means of the protruded wall W2, while preventing a liquid crystal bubble (i.e., a space between the active matrix substrate and the color filter substrate in which space no liquid crystal material is present) which occurs due to low temperature, etc.

The configuration shown in (b) of FIG. 9 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26, which is thicker than the inorganic interlayer insulating film 25, are formed. Here, in order to form, on the surface of the active matrix substrate, a first recess K1 serving as a sub spacer region SA, a portion of the organic interlayer insulating film 26 which portion corresponds to the sub spacer region SA is hollowed out in a quadrangular shape. An alignment film 9 is formed as an upper layer of the organic interlayer insulating film 26. The configuration of a color filter substrate is the same as that shown in (a) of FIG. 9.

As described above, in the configuration shown in (b) of FIG. 9, the first recess K1 is formed by locally hollowing out the organic interlayer insulating film 26; and a protruded wall W2, which surrounds a main spacer region MA, is formed by forming a rib 35 on a common electrode 28. This makes it possible to limit movement of the sub spacer 2*s* by means of the first recess K1, and also to limit movement of the main spacer 2*m* by means of the protruded wall W2, while preventing a liquid crystal bubble (i.e., a space between the active matrix substrate and the color filter substrate in which space no liquid crystal material is present) which occurs due to low temperature, etc.

Instead of the rib 35 shown in (a) of FIG. 9, a protrusion 55 may be formed as shown in (c) of FIG. 9 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 9, a protrusion 55 may be formed as shown in (d) of FIG. 9 by (i) causing a colored layer 14 to be left at a portion which corresponds to a protruded wall W2 and (ii) causing a light shielding layer to be stacked on the colored layer 14 thus left.

In Embodiment 1, the organic gate insulating film 21 may be hollowed out in a step of (i) removing a portion of the thick organic gate insulating film 21 which portion corresponds to a channel region of a transistor (for improvement of TFT characteristics) or (ii) removing a portion of the thick organic gate insulating film 21 in which portion the organic gate insulating film 21 overlaps a retention capacitor wire (for improvement of a retention capacitor value).

[Embodiment 2]

Figure 10:
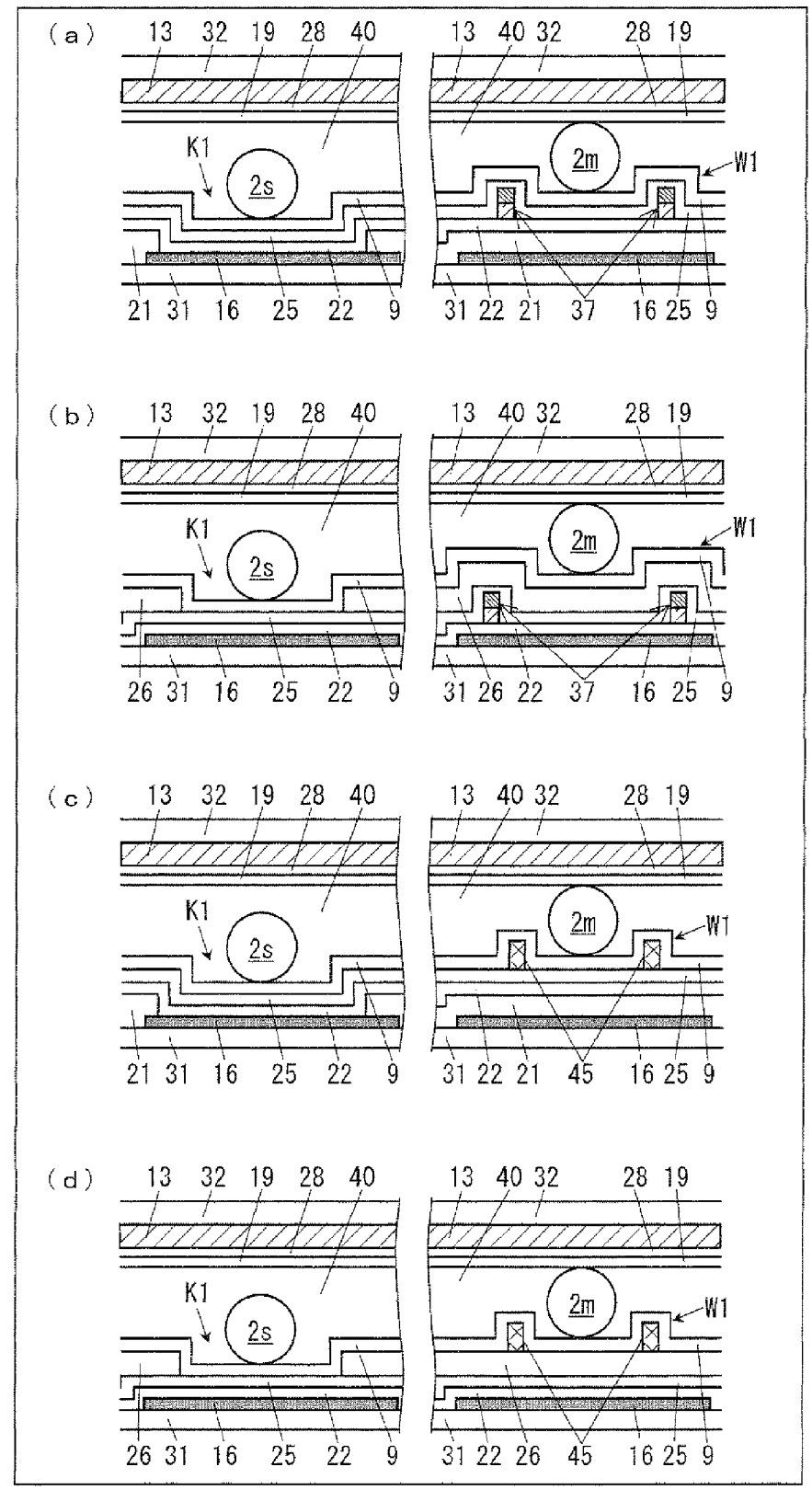
FIG. 10

(a) to (d) of FIG. 10 show specific examples of a configuration of the liquid crystal panel shown in FIG. and are cross-section views of the main spacer region MA and the sub spacer region SA shown in FIG. 1. In the present embodiment, an active matrix substrate 3 includes a surface which faces a liquid crystal material 40 and on which a main spacer region MA directed to include a main spacer 2*m* and a sub spacer region SA directed to include a sub spacer 2*s* are provided so that the main spacer region MA and the sub spacer region SA overlap a scanning signal line 16 and a light shielding layer 13.

The configuration shown in (a) of FIG. 10 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a region of the organic gate insulating film 21 which region corresponds to the sub spacer region SA is hollowed out in a quadrangular shape. In addition, in order to form a protruded wall W1 surrounding a main spacer region MA, a projection 37 having a laminated structure made of a semiconductor layer and a metal layer is formed on a portion of the inorganic gate insulating film 22 which portion corresponds to the protruded wall W1. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32, a common electrode 28 is formed so as to cover the light shielding layer 13, and an alignment film 19 is formed on the common electrode 28.

As described above, in the configuration shown in (a) of FIG. 10, the first recess K1, which serves as the sub spacer region SA, is formed by locally hollowing out the organic gate insulating film 21; and the protruded wall W1, which surrounds the main spacer region MA, is formed by forming the protrusion 37 on the inorganic gate insulating film 22. This makes it possible to limit movement of the sub spacer 2s by means of the first recess K1, and also to limit movement of the main spacer 2m by means of the protruded wall W1, while preventing a liquid crystal bubble (i.e., a space between the active matrix substrate and the color filter substrate in which space no liquid crystal material is present) which occurs due to low temperature, etc.

The configuration shown in (b) of FIG. 10 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a main spacer region MA, a projection 37 having a laminated structure made of a semiconductor layer and a metal layer is formed on a portion of the inorganic gate insulating film 22 which portion corresponds to the protruded wall W1. On the inorganic gate insulating film 22, an inorganic interlayer insulating film 25 and an organic interlayer insulating film 26 are formed. Here, in order to form, on the surface of the active matrix substrate, a first recess K1 serving as a sub spacer region SA, a region of the organic interlayer insulating film 26 which region corresponds to the sub spacer region SA is hollowed out in a quadrangular shape. An alignment film 9 is formed as an upper layer of the organic interlayer insulating film 26. The configuration of a color filter substrate is the same as that shown in (a) of FIG. 10.

As described above, in the configuration shown in (b) of FIG. 10, the first recess K1, which serves as the sub spacer region SA, is formed by locally hollowing out the organic interlayer insulating film 26; and the protruded wall W1, which surrounds the main spacer region MA, is formed by forming the protrusion 37 on the inorganic gate insulating film 22. This makes it possible to limit movement of the sub spacer 2s by means of the first recess K1, and also to limit movement of the main spacer 2m by means of the protruded wall W1, while preventing a liquid crystal bubble (i.e., a space between the active matrix substrate and the color filter substrate in which space no liquid crystal material is present) which occurs due to low temperature, etc.

Instead of the protrusion 37 shown in (a) of FIG. 10, a rib 45 may be formed (on an inorganic interlayer insulating film 25) as shown in (c) of FIG. 10. Further, instead of the protrusion 37 shown in (b) of FIG. 10, a rib 45 may be formed (on an organic interlayer insulating film 26) as shown in (d) of FIG. 10.

In Embodiment 2, since the first recess K1 and the protruded wall W1 are both formed in the active matrix substrate, it is possible to achieve the above-described effects in combination with a generally-used color filter substrate.

[Embodiment 3]

Figure 11:
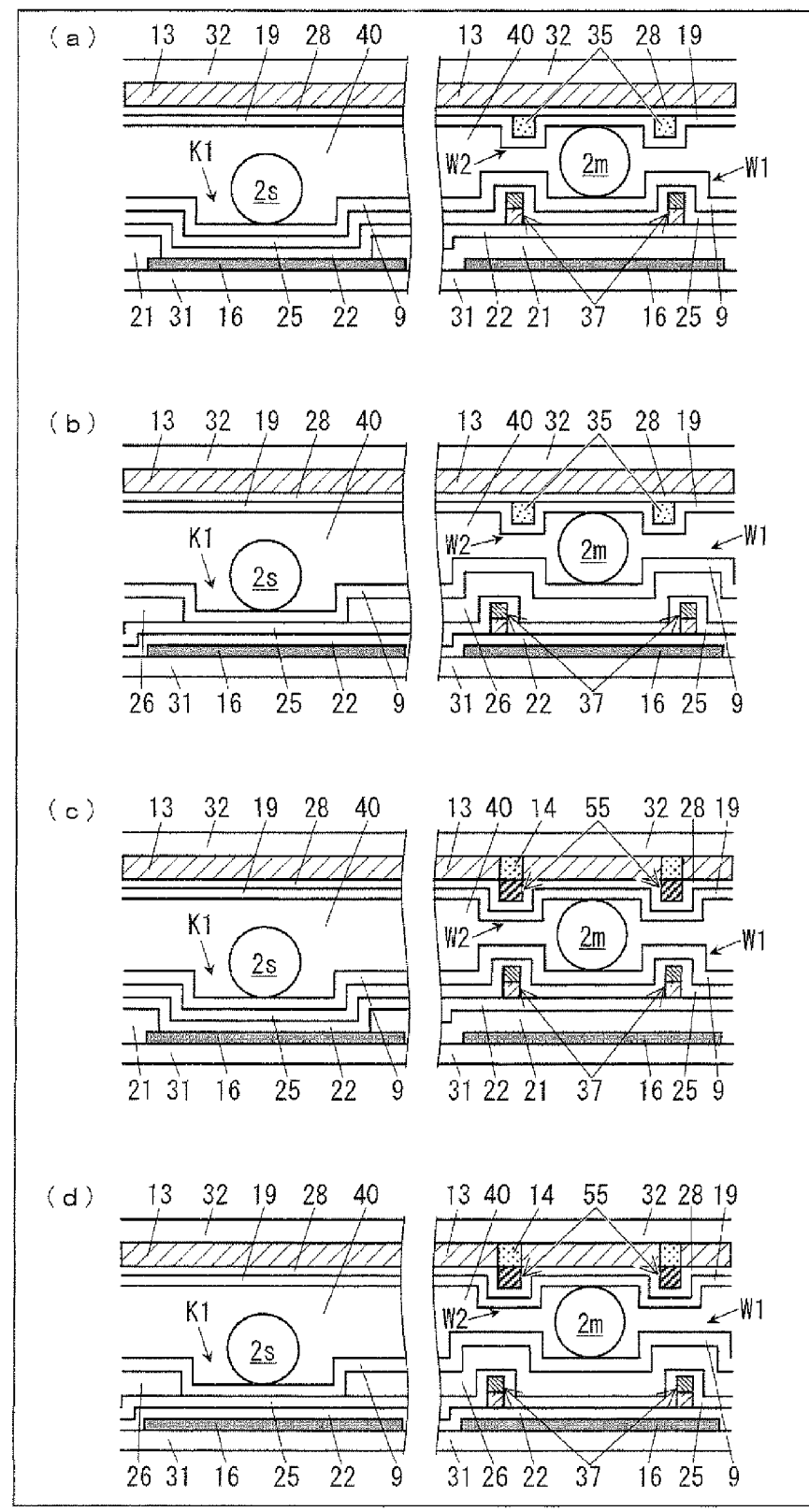
FIG. 11

(a) to (d) of FIG. 11 show specific examples of a configuration of the liquid crystal panel shown in FIG. 1, and are cross-section views of the main spacer region MA and the sub spacer region SA shown in FIG. 1. In the present embodiment, an active matrix substrate 3 includes a surface which faces a liquid crystal material 40 and on which a main spacer region MA directed to include a main spacer 2m and a sub spacer region SA directed to include a sub spacer 2s are provided so that the main spacer region MA and the sub spacer region SA overlap a scanning signal line 16 and a light shielding layer 13.

The configuration shown in (a) of FIG. 11 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a region of the organic gate insulating film 21 which region corresponds to the sub spacer region SA is hollowed out in a quadrangular shape. In addition, in order to form a protruded wall W1 surrounding a main spacer region MA, a projection 37 having a laminated structure made of a semiconductor layer and a metal layer is formed on a portion of the inorganic gate insulating film 22 which portion corresponds to the protruded wall W1. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32, and a common electrode 28 is formed so as to cover the light shielding layer 13. Here, in order to form, on the surface of the color filter substrate, a protruded wall W2 surrounding a region (hereinafter, referred to as MA counter region) which faces a main spacer region MA, a rib 35 is formed on a portion of the common electrode 28 which portion corresponds to the protruded wall W2. Further, an alignment film 19 is formed so as to cover the common electrode 28 and the rib 35.

As described above, in the configuration shown in (a) of FIG. 11, the first recess K1, which serves as the sub spacer region SA, is formed by locally hollowing out the organic gate insulating film 21; the protruded wall W1, which surrounds the main spacer region MA, is formed by forming the protrusion 37 on the inorganic gate insulating film 22; and the protruded wall W2, which surrounds the MA counter region, is formed by forming the rib 35 on the common electrode 28. This makes it possible to limit movement of the sub spacer 2s by means of the first recess K1, and also to limit movement of the main spacer 2m by means of the protruded walls W1 and W2, while preventing a liquid crystal bubble (i.e., a space between the active matrix substrate and the color filter substrate in which space no liquid crystal material is present) which occurs due to low temperature, etc.

The configuration shown in (b) of FIG. 11 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a main spacer made of a semiconductor layer and a metal layer is formed on a portion of the inorganic gate insulating film 22 which portion corresponds to the protruded wall W1. On the inorganic gate insulating film 22, an inorganic interlayer insulating film 25 and an organic interlayer insulating film 26, which is thicker than the inorganic interlayer insulating film 25, are formed. Here, in order to form, on the surface of the active matrix substrate, a first recess K1 serving as a sub spacer region SA, a region of the organic interlayer insulating film 26 which region corresponds to the sub spacer region SA is hollowed out in a quadrangular shape. An alignment film 9 is formed as an upper layer of the organic interlayer insulating film 26. The configuration of a color filter substrate is the same as that shown in (a) of FIG. 11.

As described above, in the configuration shown in (b) of FIG. 11, the first recess K1, which serves as the sub spacer region SA, is formed by locally hollowing out the organic interlayer insulating film 26; the protruded wall W1, which surrounds the main spacer region MA, is formed by forming the protrusion 37 on the inorganic gate insulating film 22; and a protruded wall W2, which surrounds an MA counter region, is formed by forming a rib 35 on a common electrode 28. This makes it possible to limit movement of the sub spacer 2s by means of the first recess K1, and also to limit movement of the main spacer 2m by means of the protruded walls W1 and W2, while preventing a liquid crystal bubble (i.e., a space between the active matrix substrate and the color filter substrate in which space no liquid crystal material is present) which occurs due to low temperature, etc.

Instead of the rib 35 shown in (a) of FIG. 11, a protrusion 55 may be formed as shown in (c) of FIG. 11 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 11, a protrusion 55 may be formed as shown in (d) of FIG. 11 by (i) causing a colored layer 14 to be left at a portion which corresponds to a protruded wall W2 and (ii) causing a light shielding layer to be stacked on the colored layer 14 thus left.

Figure 12:
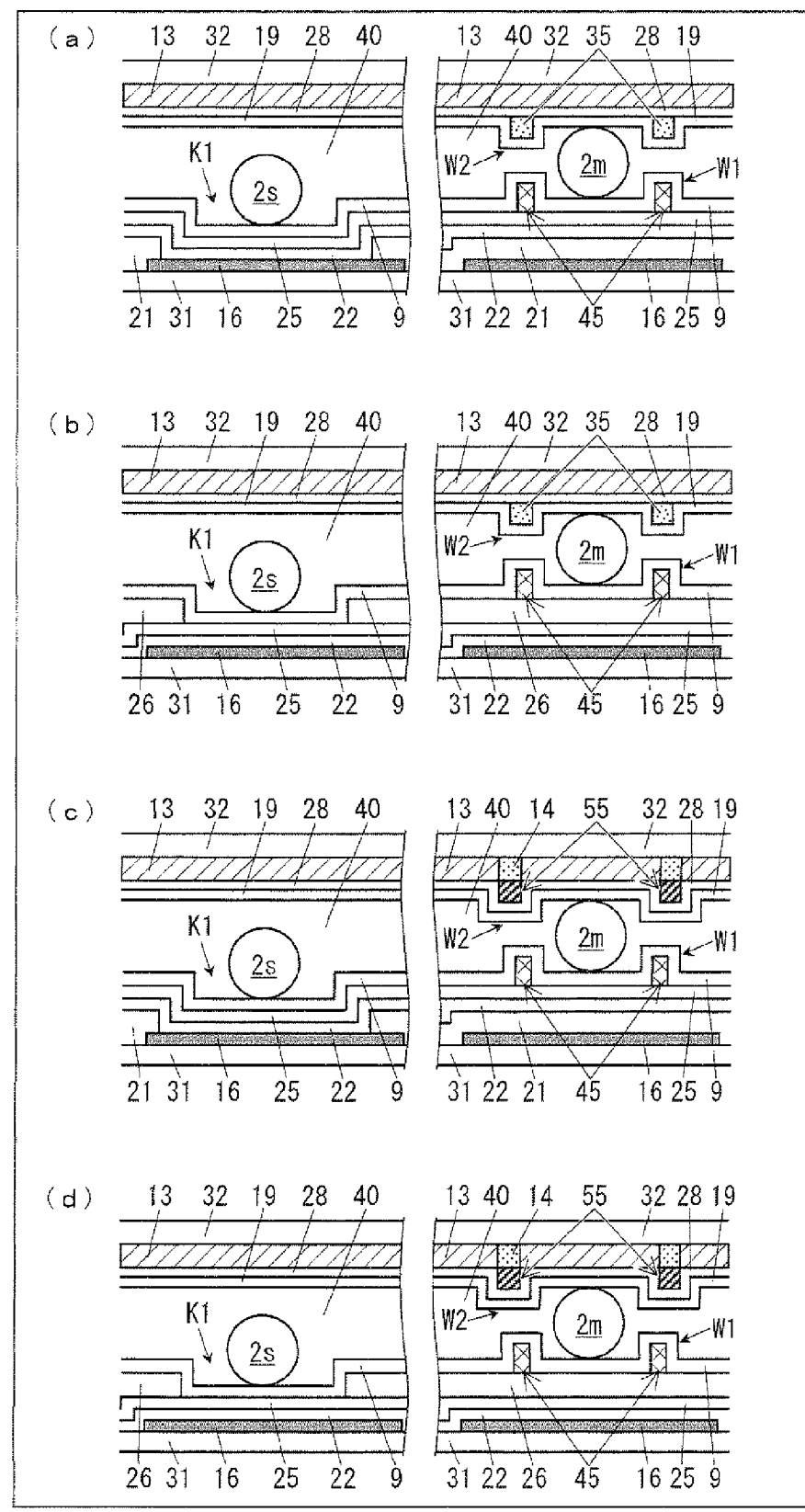
FIG. 12

Alternatively, instead of the protrusion 37 shown in (a) of FIG. 11, a rib 45 may be formed (on an inorganic interlayer insulating film 25) as shown in (a) of FIG. 12. Further, instead of the protrusion 37 shown in (b) of FIG. 11, a rib 45 may be formed (on an organic interlayer insulating film 26) as shown in (a) of FIG. 12. Furthermore, instead of the protrusion 37 shown in (c) of FIG. 11, a rib 45 may be formed (on an inorganic interlayer insulating film 25) as shown in (c) of FIG. 12. Moreover, instead of the protrusion 37 shown in (d) of FIG. 11, a rib 45 may be formed (on an organic interlayer insulating film 26) as shown in (d) of FIG. 12.

In Embodiment 3, it is possible to limit movement of the main spacer 2m by means of the protruded walls W1 and W2, thereby enhancing the movement limiting effect.

[Embodiment 4]

Figure 13:
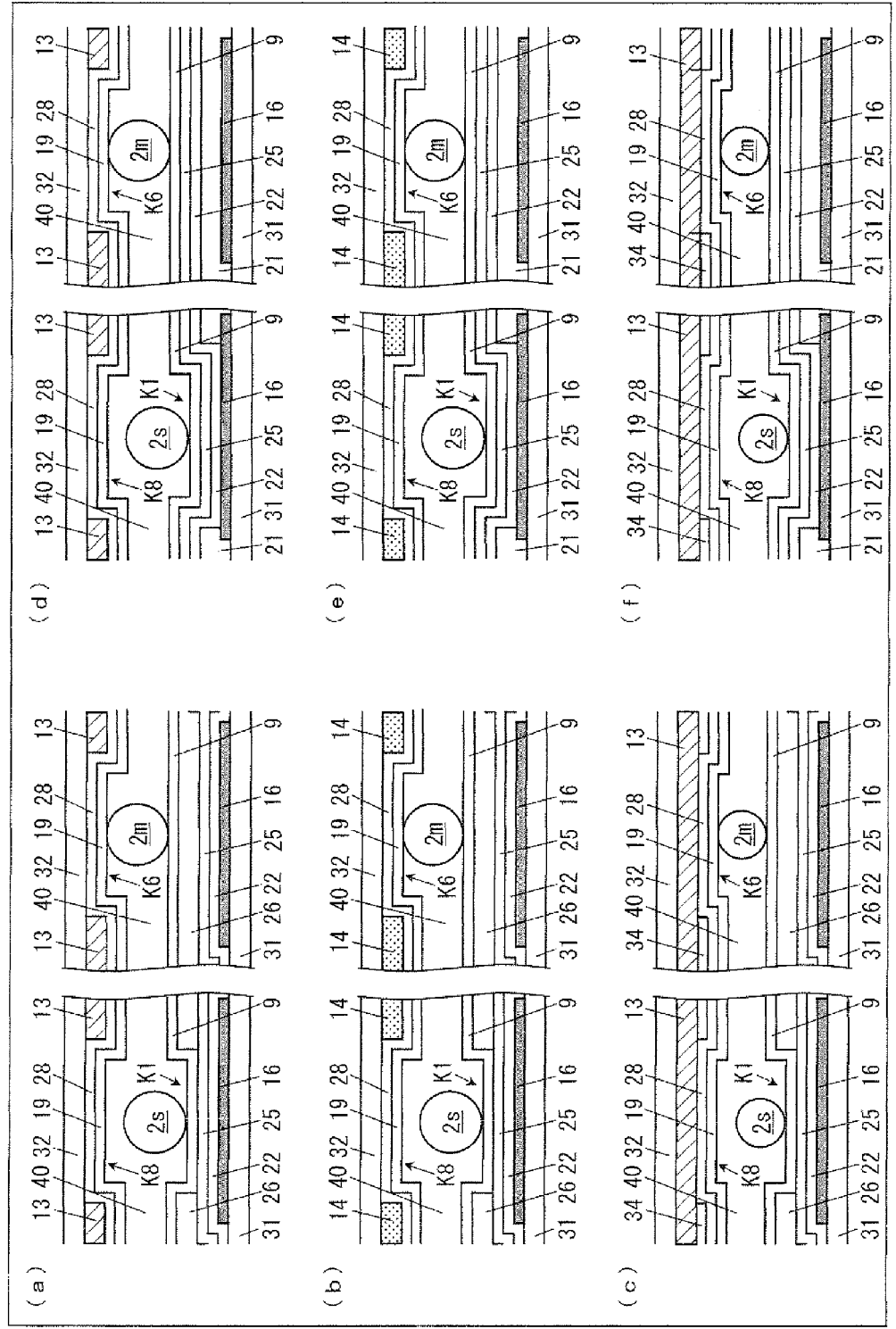
FIG. 13

(a), (c), (d), and (f) of FIG. 13 show specific examples of a configuration of the liquid crystal panel shown in FIG. 1, and are cross-section views of the main spacer region MA and the sub spacer region SA shown in FIG. 1. Further, (b) and (e) of FIG. 13 show specific examples of a configuration of the liquid crystal panel shown in FIG. 7, and are cross-section views of the main spacer region MA and the sub spacer region SA shown in FIG. 7. In the present embodiment, an active matrix substrate 3 includes a surface which faces a liquid crystal material 40 and on which a main spacer region MA directed to include a main spacer 2m and a sub spacer region SA directed to include a sub spacer 2s are provided so that the main spacer region MA and the sub spacer region SA overlap a scanning signal line 16 and a light shielding layer 13. The configuration shown in (a) of FIG. 13 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26 are formed. Here, in order to form, on the surface of the active matrix substrate, a first recess K1 serving as a sub spacer region SA, a region of the organic interlayer insulating film 26 which region corresponds to the sub spacer region SA is hollowed out in a quadrangular shape. An alignment film 9 is formed as an upper layer of the organic interlayer insulating film 26. On the other hand, in a color filter substrate, a light shielding layer (black matrix) 13 is formed on a transparent substrate 32. Here, in order to form, on the surface of the color filter substrate, a recess K8 facing the sub spacer region SA, a portion of the light shielding layer 13 which portion corresponds to the sub spacer region SA is hollowed out in a quadrangular shape. Further, in order to form, on the surface of the color filter substrate, a recess K6 facing a main spacer region MA, a portion of the light shielding layer 13 which portion corresponds to the main spacer region MA is hollowed out in a quadrangular shape. A common electrode 28 is formed on the light shielding layer 13, and an alignment film 19 is formed so as to cover the common electrode 28.

As described above, in the configuration shown in (a) of FIG. 13, the first recess K1, which serves as the sub spacer region SA, is formed by locally hollowing out the organic interlayer insulating film 26; and the recess K8, which faces the sub spacer region SA, and the recess K6, which faces the main spacer region MA, are formed by locally hollowing out the light shielding layer 13. This makes it possible to limit movement of the sub spacer 2s by means of the first recess K1 and the recess K8, and also to limit movement of the main spacer 2m by means of the recess K6, while preventing a liquid crystal bubble (i.e., a space between the active matrix substrate and the color filter substrate in which space no liquid crystal material is present) which occurs due to low temperature, etc.

The configuration of (e) of FIG. 13 includes a light shielding layer 13 having a stripe pattern as in FIG. 7 (see FIG. 7). This configuration can be achieved by replacing the light shielding layer 13 in (d) of FIG. 13 with a colored layer 14.

The configuration shown in (c) of FIG. 13 is described below. The configuration of an active matrix substrate is the same as that shown in (a) of FIG. 13. In a color filter substrate, a light shielding layer (black matrix) 13 is formed on a transparent substrate 32, and an overcoating film 34 is formed as an upper layer of the light shielding layer 13. Note that the overcoating film 34 is provided for the purpose of planarization and of facilitating patterning on a common electrode 28, and, for example, a photosensitive acrylic resin may be used as the overcoating film 34. Here, in order to form, on the surface of the color filter substrate, a recess K8 facing a sub spacer region SA, a portion of the overcoating film 34 which portion corresponds to the sub spacer region SA is hollowed out in a quadrangular shape. Further, in order to form, on the surface of the color filter substrate, a recess K6 facing a main spacer region MA, a portion of the overcoating film 34 which portion corresponds to the main spacer region MA is hollowed out in a quadrangular shape. Note that a common electrode 28 is formed on the light shielding layer 13, and an alignment film 19 is formed so as to cover the common electrode 28.

As described above, in the configuration shown in (a) of FIG. 13, a first recess K1, which serves as the sub spacer region SA, is formed by locally hollowing out an organic interlayer insulating film 26; and the recess K8, which faces the sub spacer region SA, and the recess K6, which faces the main spacer region MA, are formed by locally hollowing out the overcoating film 34. This makes it possible to limit movement of the sub spacer 2s by means of the first recess K1 and the recess K8, and also to limit movement of the main spacer 2m by means of the recess K6, while preventing a liquid crystal bubble (i.e., a space between the active matrix substrate and the color filter substrate in which space no liquid crystal material is present) which occurs due to low temperature, etc.

The configuration of (d) of FIG. 13 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a region of the organic gate insulating film 21 which region corresponds to the sub spacer region SA is hollowed out in a quadrangular shape. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32. Here, in order to form, on the surface of the color filter substrate, a recess K8 facing the sub spacer region SA, a portion of the light shielding layer 13 which portion corresponds to the sub spacer region SA is hollowed out in a quadrangular shape. Further, in order to form, on the surface of the color filter substrate, a recess K6 facing a main spacer region MA, a portion of the light shielding layer 13 which portion corresponds to the main spacer region MA is hollowed out in a quadrangular shape. A common electrode 28 is formed on the light shielding layer 13, and an alignment film 19 is formed so as to cover the common electrode 28.

As described above, in the configuration shown in (d) of FIG. 13, the first recess K1, which serves as the sub spacer region SA, is formed by locally hollowing out the organic gate insulating film 21; and the recess K8, which faces the sub spacer region SA, and the recess K6, which faces the main spacer region MA, are formed by locally hollowing out the light shielding layer 13. This makes it possible to limit movement of the sub spacer 2s by means of the first recess K1 and the recess K8, and also to limit movement of the main spacer 2m by means of the recess K6, while preventing a liquid crystal bubble (i.e., a space between the active matrix substrate and the color filter substrate in which space no liquid crystal material is present) which occurs due to low temperature, etc.

The configuration of (e) of FIG. 13 includes a light shielding layer 13 having a stripe pattern as in FIG. 7 (see FIG. 7). This configuration can be achieved by replacing the light shielding layer 13 in (d) of FIG. 13 with a colored layer 14.

The configuration shown in (f) of FIG. 13 is described below. The configuration of an active matrix substrate is the same as that shown in (d) of FIG. 13. The configuration of a color filter substrate is the same as that shown in (c) of FIG. 13. In the configuration shown in (f) of FIG. 13, a first recess K1, which serves as a sub spacer region SA, is formed by locally hollowing out an organic gate insulating film 21; and a recess K8, which faces the sub spacer region SA, and a recess K6, which faces a main spacer region MA, are formed by locally hollowing out an overcoating film 34. This makes it possible to limit movement of the sub spacer by means of the first recess K1 and the recess K8, and also to limit movement of the main spacer 2m by means of the recess K6, while preventing a liquid crystal bubble (i.e., a space between the active matrix substrate and the color filter substrate in which space no liquid crystal material is present) which occurs due to low temperature, etc.

In Embodiment 4, since only the recesses (K1, K6, K8) are formed on the surfaces of the substrates (3, 30), it is possible to prevent poor application of the alignment film. Further, since it is possible to limit movement of the sub spacer 2s by means of the first recess K1 and the recess K8, the movement limiting effect is enhanced.

[Embodiment 5]

Figure 14:
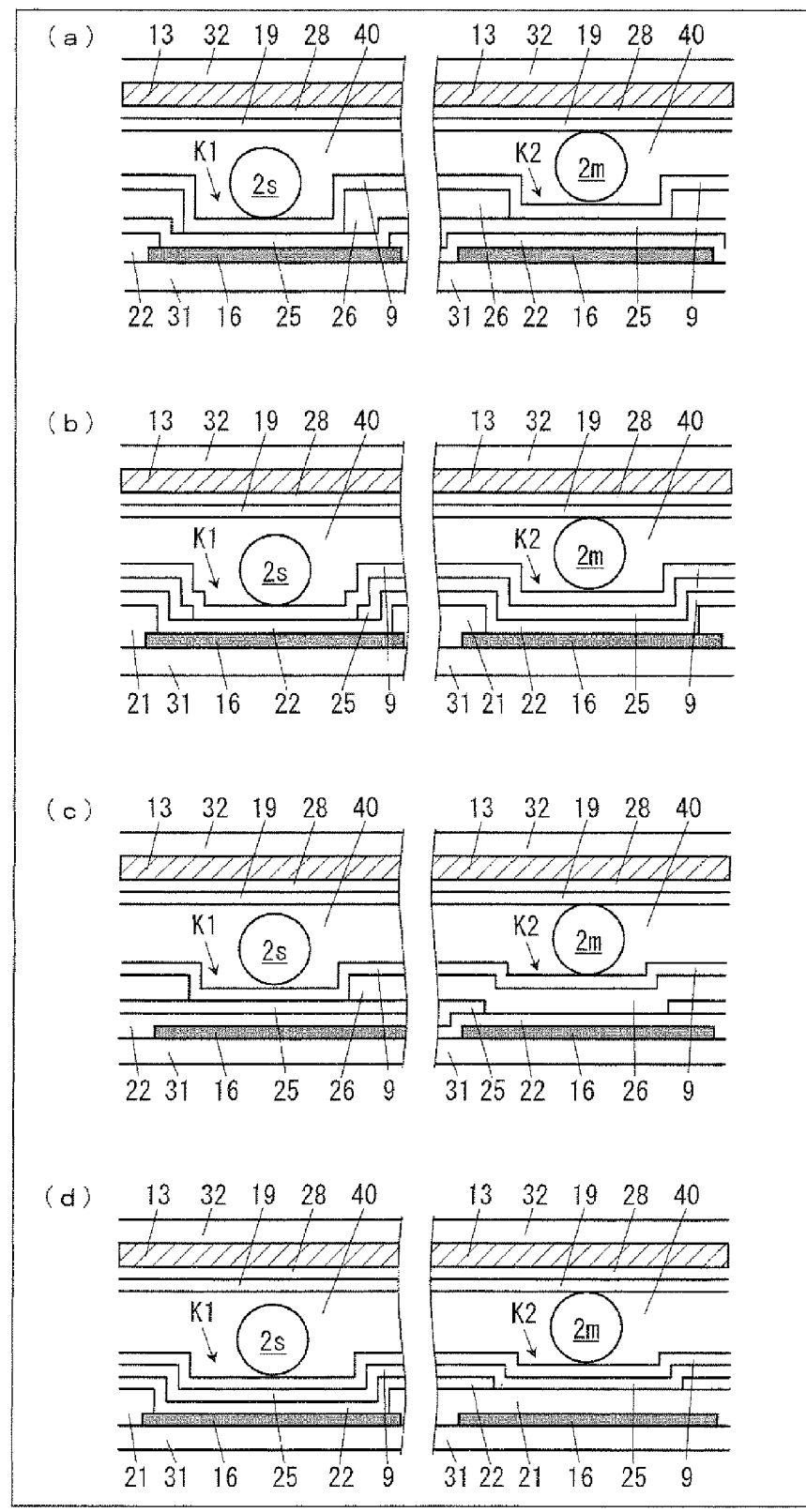
FIG. 14

(a) to (d) of FIG. 14 show specific examples of a configuration of the liquid crystal panel shown in FIG. 1, and are cross-section views of the main spacer region MA and the sub spacer region SA shown in FIG. 1. In the present embodiment, an active matrix substrate 3 includes a surface which faces a liquid crystal material 40 and on which a main spacer region MA directed to include a main spacer 2m and a sub spacer region SA directed to include a sub spacer 2s are provided so that the main spacer region MA and the sub spacer region SA overlap a scanning signal line 16 and a light shielding layer 13.

The configuration shown in (a) of FIG. 14 is described below. In an active matrix substrate, a scanning signal line 16 is formed on a transparent substrate 31, and an inorganic gate insulating film 22 is formed as an upper layer of the scanning signal line 16. Here, in order to form, on the surface of the active matrix substrate, a first recess K1 serving as a sub spacer region SA, a region of the inorganic gate insulating film 22 which region corresponds to the sub spacer region SA is hollowed out in a quadrangular shape. On the inorganic gate insulating film 22, an inorganic interlayer insulating film 25 and an organic interlayer insulating film 26 are formed. Here, in order to form, on the surface of the active matrix substrate, the first recess K1 serving as the sub spacer region SA, a region of the organic interlayer insulating film 26 which region corresponds to the sub spacer region SA is hollowed out in a quadrangular shape. In addition, in order to form, on the surface of the active matrix substrate, a second recess K2 serving as a main spacer region MA, a region of the organic interlayer insulating film 26 which region corresponds to the main spacer region MA is hollowed out in a quadrangular shape. An alignment film 9 is formed as an upper layer of the organic interlayer insulating film 26. On the other hand, in a color filter substrate, a light shielding layer (black matrix) 13 is formed on a transparent substrate 32, a common electrode 28 is formed so as to cover the light shielding layer 13, and an alignment film 19 is formed so as to cover the common electrode 28.

As described above, in the configuration shown in (a) of FIG. 14, the first recess K1 (deep recess) is formed by hollowing out a portion of the inorganic gate insulating film 22 and a portion of the organic interlayer insulating film 26 each of which portions corresponds to the sub spacer region SA;

and the second recess K2 (shallow recess) is formed by hollowing out a portion of the organic interlayer insulating film 26 which portion corresponds to the main spacer region MA. This makes it possible to limit movement of the sub spacer 2s by means of the first recess K1, and also to limit movement of the main spacer 2m by means of the second recess K2, while preventing a liquid crystal bubble (i.e., a space between the active matrix substrate and the color filter substrate in which space no liquid crystal material is present) which occurs due to low temperature, etc.

The configuration shown in (b) of FIG. 14 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a region of the organic gate insulating film 21 which region corresponds to the sub spacer region SA is hollowed out in a quadrangular shape. In addition, in order to form, on the surface of the active matrix substrate, a second recess K2 serving as a main spacer region MA, a region of the organic gate insulating film 21 which region corresponds to the main spacer region MA is hollowed out in a quadrangular shape. On the inorganic gate insulating film 22, an inorganic interlayer insulating film 25 is formed. Here, in order to form, on the surface of the active matrix substrate, the first recess K1 serving as the sub spacer region SA, a portion of the inorganic interlayer insulating film 25 which portion corresponds to the sub spacer region SA is hollowed out in a quadrangular shape. An alignment film 9 is formed as an upper layer of the organic interlayer insulating film 26. The configuration of a color filter substrate is the same as that shown in (a) of FIG. 14.

As described above, in the configuration shown in (b) of FIG. 14, the first recess K1 (deep recess) is formed by hollowing out a portion of the organic gate insulating film 21 and a portion of the inorganic interlayer insulating film 25 each of which portions corresponds to the sub spacer region SA; and the second recess K2 (shallow recess) is formed by hollowing out a portion of the organic gate insulating film 21 which portion corresponds to the main spacer region MA. This makes it possible to limit movement of the sub spacer 2s by means of the first recess K1, and also to limit movement of the main spacer 2m by means of the second recess K2, while preventing a liquid crystal bubble (i.e., a space between the active matrix substrate and the color filter substrate in which space no liquid crystal material is present) which occurs due to low temperature, etc.

The configuration shown in (c) of FIG. 14 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26 are formed. Here, in order to form, on the surface of the active matrix substrate, a first recess K1 serving as a sub spacer region SA, a region of the organic interlayer insulating film 26 which region corresponds to the sub spacer region SA is hollowed out in a quadrangular shape. In addition, in order to form, on the surface of the active matrix substrate, a second recess K2 serving as a main spacer region MA, a region of the inorganic interlayer insulating film 25 which region corresponds to the main spacer region MA is hollowed out in a quadrangular shape. An alignment film 9 is formed as an upper layer of the organic interlayer insulating film 26. The configuration of a color filter substrate is the same as that shown in (a) of FIG. 14.

As described above, in the configuration shown in (c) of FIG. 14, the first recess K1 (deep recess) is formed by hollowing out a portion of the organic interlayer insulating film 26 which portion corresponds to the sub spacer region SA; and the second recess K2 (shallow recess) is formed by hollowing out a portion of the inorganic interlayer insulating film 25 which portion corresponds to the main spacer region MA. This makes it possible to limit movement of the sub spacer 2s by means of the first recess K1, and also to limit movement of the main spacer 2m by means of the second recess K2, while preventing a liquid crystal bubble (i.e., a space between the active matrix substrate and the color filter substrate in which space no liquid crystal material is present) which occurs due to low temperature, etc.

The configuration shown in (d) of FIG. 14 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a region of the organic gate insulating film 21 which region corresponds to the sub spacer region SA is hollowed out in a quadrangular shape. In addition, in order to form, on the surface of the active matrix substrate, a second recess K2 serving as a main spacer region MA, a region of the inorganic gate insulating film 22 which region corresponds to the main spacer region MA is hollowed out in a quadrangular shape. An inorganic interlayer insulating film 25 is formed on the inorganic gate insulating film 22, and an alignment film 9 is formed as an upper layer of the inorganic interlayer insulating film 25. The configuration of a color filter substrate is the same as that of (a) of FIG. 14.

As described above, in the configuration shown in (d) of FIG. 14, the first recess K1 (deep recess) is formed by hollowing out a portion of the organic gate insulating film 21 which portion corresponds to the sub spacer region SA; and the second recess K2 (shallow recess) is formed by hollowing out a portion of the inorganic gate insulating film 22 which portion corresponds to the main spacer region MA. This makes it possible to limit movement of the sub spacer 2s by means of the first recess K1, and also to limit movement of the main spacer 2m by means of the second recess K2, while preventing a liquid crystal bubble (i.e., a space between the active matrix substrate and the color filter substrate in which space no liquid crystal material is present) which occurs due to low temperature, etc.

In Embodiment 5, since the first recess K1 and the recess K2 are both formed in the active matrix substrate, it is possible to achieve the above-described effects in combination with a generally-used color filter substrate.

Further, since merely the recesses (K1, K2) are formed on the surfaces of the substrates (3, 30), it is possible to prevent poor application of the alignment film.

[Embodiment 6]

(a), (c), (d), and (f) of FIG. 15 show specific examples of a configuration of the liquid crystal panel shown in FIG. 2, and are cross-section views of the main spacer region Ma and the sub spacer region Sa shown in FIG. 2. Further, (b) and (e) of FIG. 15 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 15 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26 are formed. An alignment film 9 is formed as an upper layer of the organic interlayer insulating film 26. On the other hand, in a color filter substrate, a light shielding layer (black matrix) 13 is formed on a transparent substrate 32. Here, in order to form, on the surface of the color filter substrate, a third recess K3 serving as a sub spacer region Sa, a portion of the light shielding layer 13 which portion corresponds to the sub spacer region Sa is hollowed out in a quadrangular shape. On the light shielding layer 13, a common electrode 28 is formed. Here, in order to form, on the surface of the color filter substrate, a protruded wall W2 surrounding a main spacer region Ma, a rib 35 is formed on a portion of the common electrode 28 which portion corresponds to the protruded wall W2. Further, an alignment film 19 is formed so as to cover the common electrode 28 and the rib 35. Note that the scanning signal line 16 is formed of a light blocking metal. Therefore, hollowing out (removing) a portion of the light shielding layer 13 as described above hardly causes such a case where display quality is affected by light leakage.

As described above, in the configuration shown in (a) of FIG. 15, the third recess K3, which serves as the sub spacer region Sa, is formed by locally hollowing out the light shielding layer 13; and the protruded wall W2, which surrounds the main spacer region Ma, is formed by forming the rib 35 on the common electrode 28. This makes it possible to limit movement of the sub spacer 2s by means of the third recess K3, and also to limit movement of the main spacer 2m by means of the protruded wall W2, while preventing a liquid crystal bubble which occurs due to low temperature, etc.

The configuration of (b) of FIG. 15 includes a light shielding layer 13 having a stripe pattern as in FIG. 7 (see FIG. 7). This configuration can be achieved by replacing the light shielding layer 13 in (a) of FIG. 15 with a colored layer 14.

The configuration shown in (c) of FIG. 15 is described below. The configuration of an active matrix substrate is the same as that shown in (a) of FIG. 15. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. On the overcoating film 34, a common electrode 28 is formed. Here, in order to form, on the surface of the color filter substrate, a protruded wall W2 surrounding a main spacer region Ma, a rib 35 is formed on a portion of the common electrode 28 which portion corresponds to the protruded wall W2. Further, an alignment film 19 is formed so as to cover the common electrode 28 and the rib 35.

As described above, in the configuration shown in (c) of FIG. 15, the third recess K3, which serves as the sub spacer region Sa, is formed by locally hollowing out the overcoating film 34; and the protruded wall W2, which surrounds the main spacer region Ma, is formed by forming the rib 35 on the common electrode 28. This makes it possible to limit movement of the sub spacer 2s by means of the third recess K3, and also to limit movement of the main spacer 2m by means of the protruded wall W2, while preventing a liquid crystal bubble which occurs due to low temperature, etc.

Instead of the rib 35 shown in (a) of FIG. 15, a protrusion 55 may be formed as shown in (d) of FIG. 15 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 15, a protrusion 55 may be formed as shown in (e) of FIG. 15 by causing a light shielding layer to be left at a portion which corresponds to a protruded wall W2. Note that a common electrode 28 is formed on the protrusion 55. Furthermore, instead of the rib 35 shown in (c) of FIG. 15, a protrusion 55 may be formed as shown in (f) of FIG. 15 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55.

In Embodiment 6, since the third recess K3 and the protruded wall W2 are both formed in the color filter substrate, it is possible to achieve the above-described effects in combination with a generally-used active matrix substrate.

[Embodiment 7]

Figure 16:
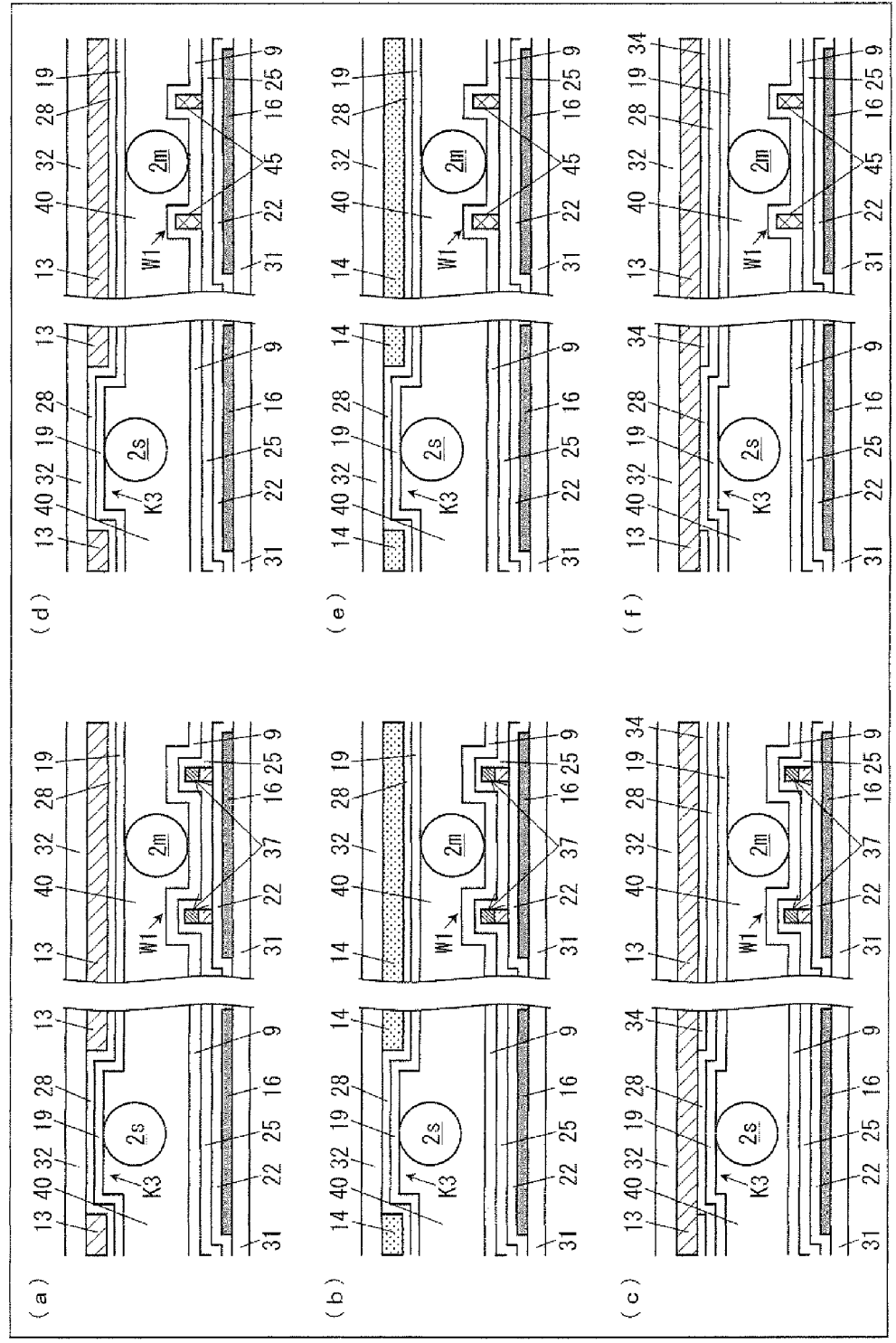
FIG. 16

(a), (c), (d), and (f) of FIG. 16 show specific examples of a configuration of the liquid crystal panel shown in FIG. 2, and are cross-section views of the main spacer region Ma and the sub spacer region Sa shown in FIG. 2. Further, (b) and (e) of FIG. 16 show specific examples of configuration of the liquid crystal panel shown in FIG. 8, and are cross-section views of the main spacer region Ma present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 16 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a region (hereinafter, referred to as Ma counter region) which faces a main spacer region Ma, a protrusion 37 having a laminated structure made of a semiconductor layer and a metal layer is formed on a portion of the inorganic gate insulating film 22 which portion corresponds to the protruded wall W1. An inorganic interlayer insulating film 25 is formed as an upper layer of the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32. Here, in order to form, on the surface of the color filter substrate, a third recess K3 serving as a sub spacer region Sa, a portion of the light shielding layer 13 which portion corresponds to the sub spacer region Sa is hollowed out in a quadrangular shape. A common electrode 28 is formed on the light shielding layer 13, and an alignment film 19 is formed so as to cover the common electrode 28.

As described above, in the configuration shown in (a) of FIG. 16, the third recess K3, which serves as the sub spacer region Sa, is formed by locally hollowing out the light shielding layer 13; and the protruded wall W1, which surrounds the Ma counter region, is formed by forming the protrusion 37 on the inorganic gate insulating film 22. This makes it possible to limit movement of the sub spacer by means of the third recess K3, and also to limit movement of the main spacer 2m by means of the protruded wall W1, while preventing a liquid crystal bubble which occurs due to low temperature, etc.

The configuration of (b) of FIG. 16 includes a light shielding layer 13 having a stripe pattern as in FIG. 7 (see FIG. 7). This configuration can be achieved by replacing the light shielding layer 13 in (a) of FIG. 16 with a colored layer 14.

The configuration shown in (c) of FIG. 16 is described below. The configuration of an active matrix substrate is the same as that shown in (a) of FIG. 16. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. A common electrode 28 is formed on the overcoating film 34, and an alignment film 19 is formed so as to cover the common electrode 28.

As described above, in the configuration shown in (c) of FIG. 16, the third recess K3, which serves as the sub spacer region Sa, is formed by locally hollowing out the overcoating film 34; and a protruded wall W1, which surrounds an Ma counter region, is formed by forming a protrusion 37 on an inorganic gate insulating film 22. This makes it possible to limit movement of the sub spacer 2s by means of the third recess K3, and also to limit movement of the main spacer 2m by means of the protruded wall W1, while preventing a liquid crystal bubble which occurs due to low temperature, etc.

Instead of the protrusion 37 shown in (a) of FIG. 16, a rib 45 may be formed (on an inorganic interlayer insulating film 25) as shown in (d) of FIG. 16. Further, instead of the protrusion 37 shown in (b) of FIG. 16, a rib 45 may be formed (on an inorganic interlayer insulating film 25) as shown in (e) of FIG. 16. Furthermore, instead of the protrusion 37 shown in (c) of FIG. 16, a rib 45 may be formed (on an inorganic interlayer insulating film 25) as shown in (f) of FIG. 16.

[Embodiment 8]

Figure 17:
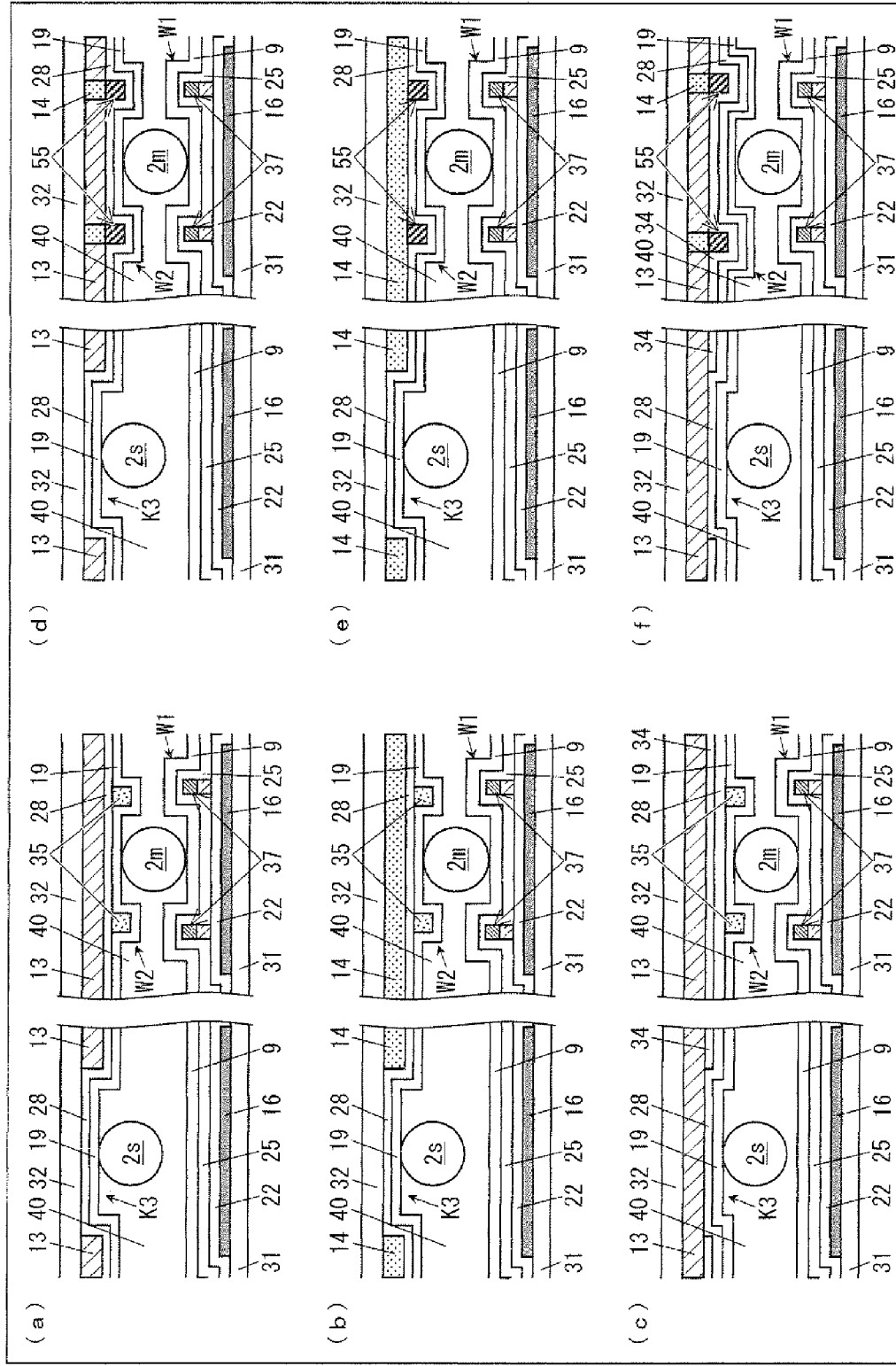
FIG. 17

(a), (c), (d), and (f) of FIG. 17 show specific examples of a configuration of the liquid crystal panel shown in FIG. 2, and are cross-section views of the main spacer region Ma and the sub spacer region Sa shown in FIG. 2. Further, (b) and (e) of FIG. 17 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 17 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a region (hereinafter, referred to as Ma counter region) which faces a main spacer region Ma, a protrusion 37 having a laminated structure made of a semiconductor layer and a metal layer is formed on a portion of the inorganic gate insulating film 22 which portion corresponds to the protruded wall W1. An inorganic interlayer insulating film 25 is formed as an upper layer of the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32. Here, in order to form, on the surface of the color filter substrate, a third recess K3 serving as a sub spacer region Sa, a portion of the light shielding layer 13 which portion corresponds to the sub spacer region Sa is hollowed out in a quadrangular shape. In addition, in order to form, on the surface of the color filter substrate, a protruded wall W2 surrounding a main spacer region Ma, a rib 35 is formed on a portion of a common electrode 28 which portion corresponds to the protruded wall W2, and an alignment film 19 is formed so as to cover the common electrode 28 and the rib 35.

As described above, in the configuration shown in (a) of FIG. 17, the third recess K3, which serves as the sub spacer region Sa, is formed by locally hollowing out the light shielding layer 13; the protruded wall W2, which surrounds the main spacer region Ma, is formed by forming the rib 35 on the common electrode 28; and the protruded wall W1, which surrounds the Ma counter region, is formed by forming the protrusion 37 on the inorganic gate insulating film 22. This makes it possible to limit movement of the sub spacer 2s by means of the third recess K3, and also to limit movement of the main spacer 2m by means of the protruded walls W1 and W2, while preventing a liquid crystal bubble which occurs due to low temperature, etc.

The configuration of (b) of FIG. 17 includes a light shielding layer 13 having a stripe pattern as in FIG. 7 (see FIG. 7). This configuration can be achieved by replacing the light shielding layer 13 in (a) of FIG. 17 with a colored layer 14.

The configuration shown in (c) of FIG. 17 is described below. The configuration of an active matrix substrate is the same as that shown in (a) of FIG. 17. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. On the overcoating film 34, a common electrode 28 is formed. Here, in order to form, on the surface of the color filter substrate, a protruded wall W2 surrounding a main spacer region Ma, a rib 35 is formed on a portion of the common electrode 28 which portion corresponds to the protruded wall W2. Further, an alignment film 19 is formed so as to cover the common electrode 28 and the rib 35.

As described above, in the configuration shown in (c) of FIG. 17, the third recess K3, which serves as the sub spacer region Sa, is formed by locally hollowing out the overcoating film 34; the protruded wall W2, which surrounds the main spacer region Ma, is formed by forming the rib 35 on the common electrode 28; and a protruded wall W1, which surrounds an Ma counter region, is formed by forming a protrusion 37 on an inorganic gate insulating film 22. This makes it possible to limit movement of the sub spacer 2s by means of the third recess K3, and also to limit movement of the main spacer 2m by means of the protruded walls W1 and W2, while preventing a liquid crystal bubble which occurs due to low temperature, etc.

Instead of the rib 35 shown in (a) of FIG. 17, a protrusion 55 may be formed as shown in (d) of FIG. 17 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 17, a protrusion 55 may be formed as shown in (e) of FIG. 17 by causing a light shielding layer to be left at a portion which corresponds to a protruded wall W2. Note that a common electrode 28 is formed on the protrusion 55. Furthermore, instead of the rib 35 shown in (c) of FIG. 17, a protrusion 55 may be formed as shown in (f) of FIG. 17 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55.

Figure 18:
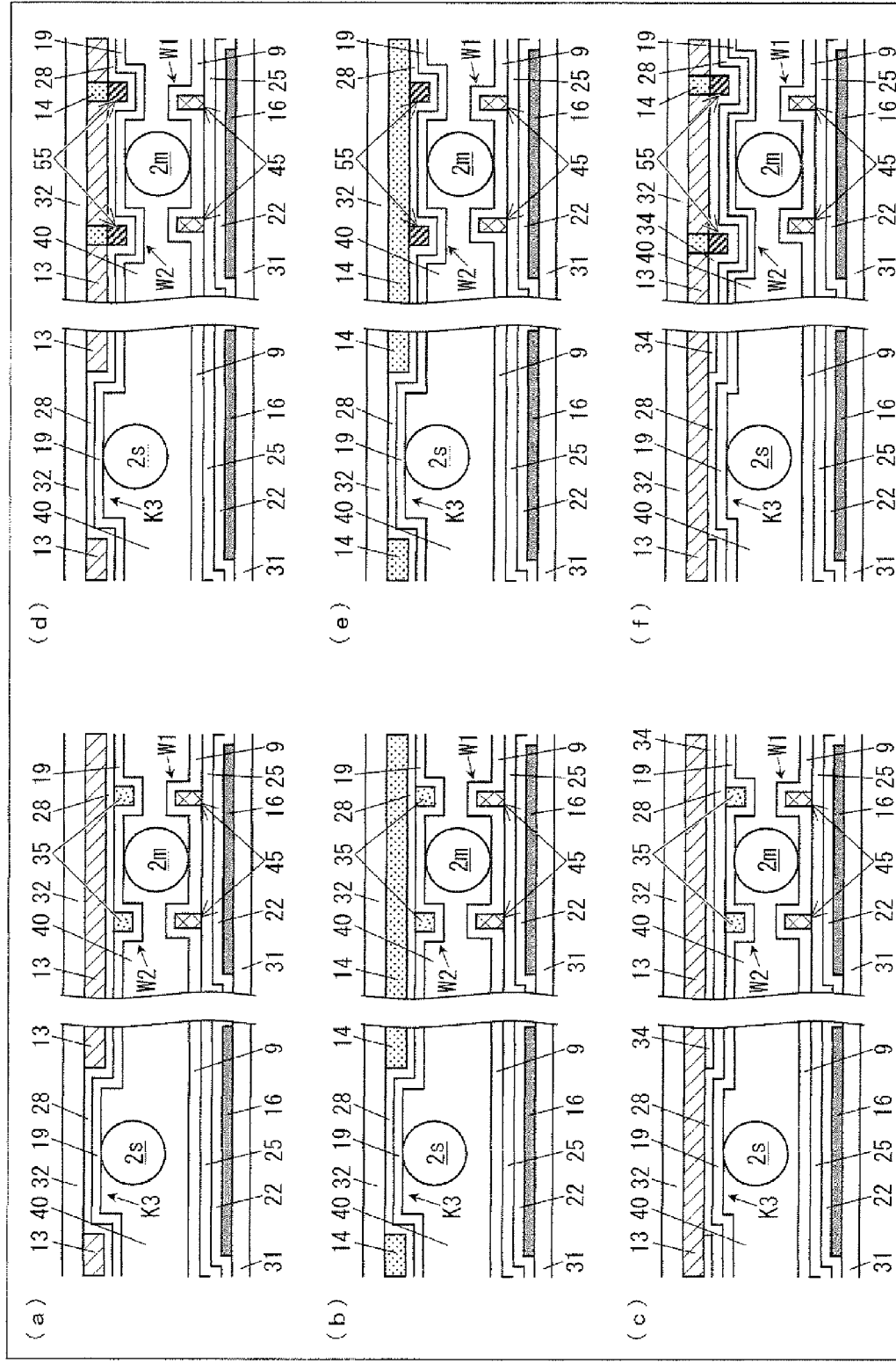
FIG. 18

Alternatively, instead of the protrusion 37 shown in (a) of FIG. 17, a rib 45 may be formed (on an inorganic interlayer insulating film 25) as shown in (a) of FIG. 18. Further, instead of the protrusion 37 shown in (b) of FIG. 17, a rib 45 may be formed (on an inorganic interlayer insulating film 25) as shown in (b) of FIG. 18. Furthermore, instead of the protrusion 37 shown in (c) of FIG. 17, a rib 45 may be formed (on an inorganic interlayer insulating film 25) as shown in (c) of FIG. 18. Moreover, instead of the protrusion 37 shown in (d) of FIG. 17, a rib 45 may be formed (on an inorganic interlayer insulating film 25) as shown in (d) of FIG. 18. Furthermore, instead of the protrusion 37 shown in (e) of FIG. 17, a rib 45 may be formed (on an inorganic interlayer insulating film 25) as shown in (e) of FIG. 18. Moreover, instead of the protrusion 37 shown in (f) of FIG. 17, a rib 45 may be formed (on an inorganic interlayer insulating film 25) as shown in (f) of FIG. 18.

In Embodiment 8, since it is possible to limit movement of the main spacer 2m by means of the protruded walls W1 and W2, the movement limiting effect is enhanced.

[Embodiment 9]

Figure 19:
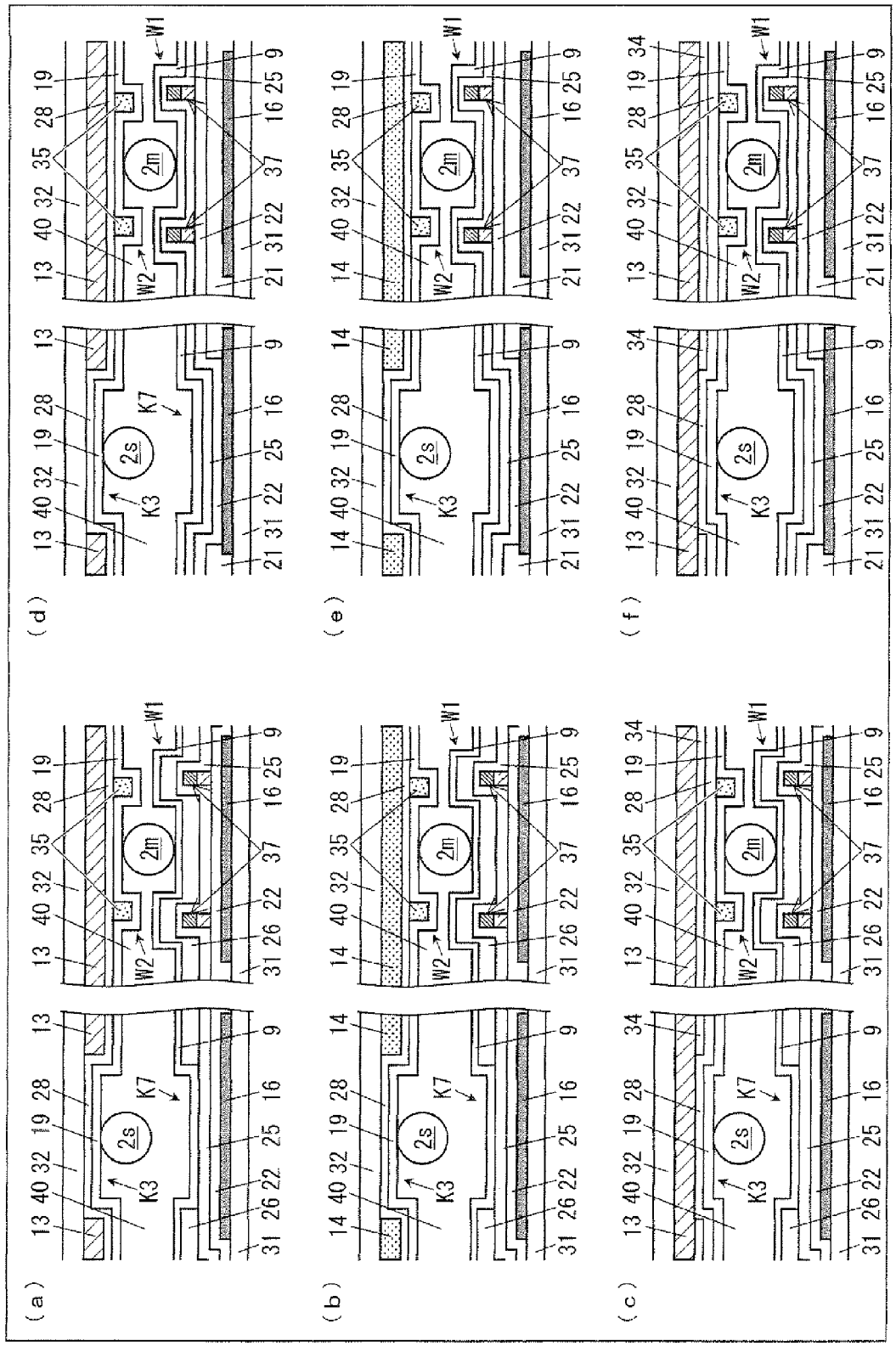
FIG. 19

(a), (c), (d), and (f) of FIG. 19 show specific examples of a configuration of the liquid crystal panel shown in FIG. 2, and are cross-section views of the main spacer region Ma and the sub spacer region Sa shown in FIG. 2. Further, (b) and (e) of FIG. 19 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 19 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a region (hereinafter, referred to as Ma counter region) which faces a main spacer region Ma, a protrusion 37 having a laminated structure made of a semiconductor layer and a metal layer is formed on a portion of the inorganic gate insulating film 22 which portion corresponds to the protruded wall W1. On the inorganic gate insulating film 22, an inorganic interlayer insulating film 25 and an organic interlayer insulating film 26, which is thicker than the inorganic interlayer insulating film 25, are formed. Here, in order to form a recess K7 which faces a sub spacer region Sa, a region of the organic interlayer insulating film 26 which region corresponds to the sub spacer region Sa is hollowed out in a quadrangular shape. An alignment film 9 is formed as an upper layer of the organic interlayer insulating film 26. On the other hand, in a color filter substrate, a light shielding layer (black matrix) 13 is formed on a transparent substrate 32. Here, in order to form, on the surface of the color filter substrate, a third recess K3 serving as the sub spacer region Sa, a portion of the light shielding layer 13 which portion corresponds to the sub spacer region Sa is hollowed out in a quadrangular shape. In addition, in order to form, on the surface of the color filter substrate, a protruded wall W2 surrounding the main spacer region Ma, a rib 35 is formed on a portion of a common electrode 28 which portion corresponds to the protruded wall W2, and an alignment film 19 is formed so as to cover the common electrode 28 and the rib 35.

As described above, in the configuration shown in (a) of FIG. 19, the third recess K3, which serves as the sub spacer region Sa, is formed by locally hollowing out the light shielding layer 13; the recess K7, which faces the sub spacer region Sa, is formed by locally hollowing out the organic interlayer insulating film 26; the protruded wall W2, which surrounds the main spacer region Ma, is formed by forming the rib 35 on the common electrode 28; and the protruded wall W1, which surrounds the Ma counter region, is formed by forming the protrusion 37 on the inorganic gate insulating film 22. This makes it possible to limit movement of the sub spacer 2s by means of the third recess K3 and the recess K7, and also to limit movement of the main spacer 2m by means of the protruded walls W1 and W2, while preventing a liquid crystal bubble which occurs due to low temperature, etc.

The configuration of (b) of FIG. 19 includes a light shielding layer 13 having a stripe pattern as in FIG. 7 (see FIG. 7). This configuration can be achieved by replacing the light shielding layer 13 in (a) of FIG. 19 with a colored layer 14.

The configuration shown in (c) of FIG. 19 is described below. The configuration of an active matrix substrate is the same as that shown in (a) of FIG. 19. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. On the overcoating film 34, a common electrode 28 is formed. Here, in order to form, on the surface of the color filter substrate, a protruded wall W2 surrounding a main spacer region Ma, a rib 35 is formed on a portion of the common electrode 28 which portion corresponds to the protruded wall W2, and an alignment film 19 is formed so as to cover the common electrode 28 and the rib 35.

As described above, in the configuration shown in (c) of FIG. 19, the third recess K3, which serves as the sub spacer region Sa, is formed by locally hollowing out the overcoating film 34; a recess K7, which faces the sub spacer region Sa, is formed by locally hollowing out an organic interlayer insulating film 26; the protruded wall W2, which surrounds the main spacer region Ma, is formed by forming the rib 35 on the common electrode 28; and a protruded wall W1, which surrounds an Ma counter region, is formed by forming a protrusion 37 on an inorganic gate insulating film 22. This makes it possible to limit movement of the sub spacer 2s by means of the third recess K3 and the recess K7, and also to limit movement of the main spacer 2m by means of the protruded walls W1 and W2, while preventing a liquid crystal bubble which occurs due to low temperature, etc.

The configuration of (d) of FIG. 19 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form a recess K7 which faces a sub spacer region Sa, a region of the organic gate insulating film 21 which region corresponds to the sub spacer region Sa is hollowed out in a quadrangular shape. In addition, in order to form a protruded wall W1 surrounding a region (hereinafter, referred to as Ma counter region) which faces a main spacer region Ma, a protrusion 37 having a laminated structure made of a semiconductor layer and a metal layer is formed on a portion of the inorganic gate insulating film 22 which portion corresponds to the protruded wall W1. An alignment film 9 is formed as an upper layer of the inorganic gate insulating film 22. On the other hand, in a color filter substrate, a light shielding layer (black matrix) 13 is formed on a transparent substrate 32. Here, in order to form, on the surface of the color filter substrate, a third recess K3 serving as the sub spacer region Sa, a portion of the light shielding layer 13 which portion corresponds to the sub spacer region Sa is hollowed out in a quadrangular shape. In addition, in order to form, on the surface of the color filter substrate, a protruded wall W2 surrounding the main spacer region Ma, a rib 35 is formed on a portion of a common electrode 28 which portion corresponds to the protruded wall W2. Further, an alignment film 19 is formed so as to cover the common electrode 28 and the rib 35.

As described above, in the configuration shown in (d) of FIG. 19, the third recess K3, which serves as the sub spacer region Sa, is formed by locally hollowing out the light shielding layer 13; the recess K7, which faces the sub spacer region Sa, is formed by locally hollowing out the organic gate insulating film 21; the protruded wall W2, which surrounds the main spacer region Ma, is formed by forming the rib 35 on the common electrode 28; and the protruded wall W1, which surrounds the Ma counter region, is formed by forming the protrusion 37 on the inorganic gate insulating film 22. This makes it possible to limit movement of the sub spacer 2s by means of the third recess K3 and the recess K7, and also to limit movement of the main spacer 2m by means of the protruded walls W1 and W2, while preventing a liquid crystal bubble which occurs due to low temperature, etc.

The configuration of (e) of FIG. 19 includes a light shielding layer 13 having a stripe pattern as in FIG. 7 (see FIG. 7). This configuration can be achieved by replacing the light shielding layer 13 in (d) of FIG. 19 with a colored layer 14.

The configuration shown in (f) of FIG. 19 is described below. The configuration of an active matrix substrate is the same as that shown in (d) of FIG. 19. The configuration of a color filter substrate is the same as that shown in (c) of FIG. 19.

As described above, in the configuration shown in (f) of FIG. 19, a third recess K3, which serves as a sub spacer region Sa, is formed by locally hollowing out an overcoating film 34; a recess K7, which faces the sub spacer region Sa, is formed by locally hollowing out an organic gate insulating film 21; a protruded wall W2, which surrounds a main spacer region Ma, is formed by forming a rib 35 on a common electrode 28; and a protruded wall W1, which surrounds an Ma counter region, is formed by forming a protrusion 37 on an inorganic gate insulating film 22. This makes it possible to limit movement of the sub spacer 2s by means of the third recess K3 and the recess K7, and also to limit movement of the main spacer 2m by means of the protruded walls W1 and W2, while preventing a liquid crystal bubble which occurs due to low temperature, etc.

Figure 20:
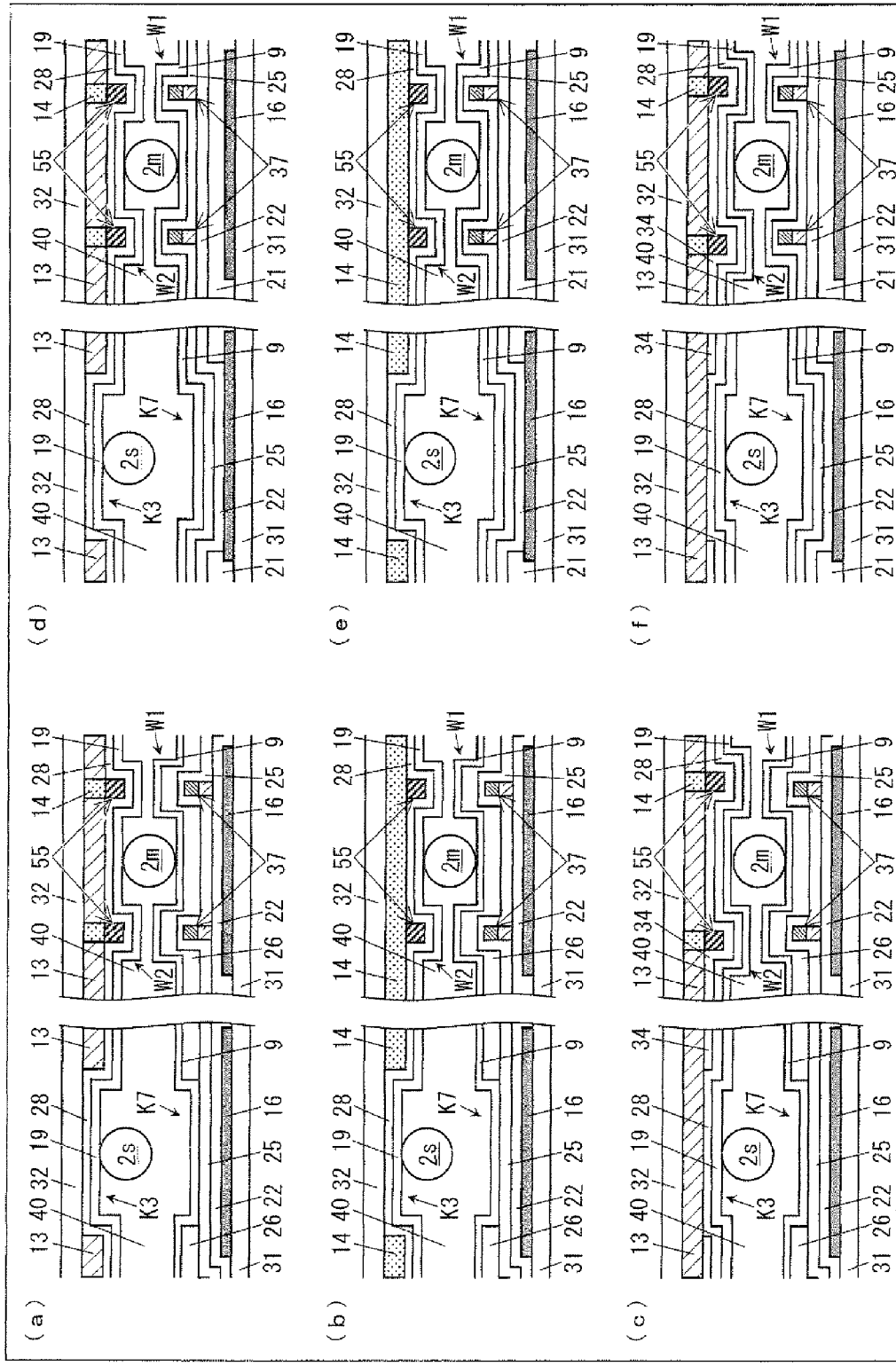
FIG. 20

Instead of the rib 35 shown in (a) of FIG. 19, a protrusion 55 may be formed as shown in (a) of FIG. 20 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 19, a protrusion 55 may be formed as shown in (b) of FIG. 20 by causing a light shielding layer to be left at a portion which corresponds to a protruded wall W2. Note that a common electrode 28 is formed on the protrusion 55. Furthermore, instead of the rib 35 shown in (c) of FIG. 19, a protrusion 55 may be formed as shown in (e) of FIG. 20 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55. Moreover, instead of the rib 35 shown in (d) of FIG. 19, a protrusion 55 may be formed as shown in (d) of FIG. 20 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Furthermore, instead of the rib 35 shown in (e) of FIG. 19, a protrusion 55 may be formed as shown in (e) of FIG. 20 by causing a light shielding layer to be left at a portion which corresponds to a protruded wall W2. Note that a common electrode 28 is formed on the protrusion 55. Moreover, instead of the rib 35 shown in (f) of FIG. 19, a protrusion 55 may be formed as shown in (f) of FIG. 20 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55.

Figure 21:
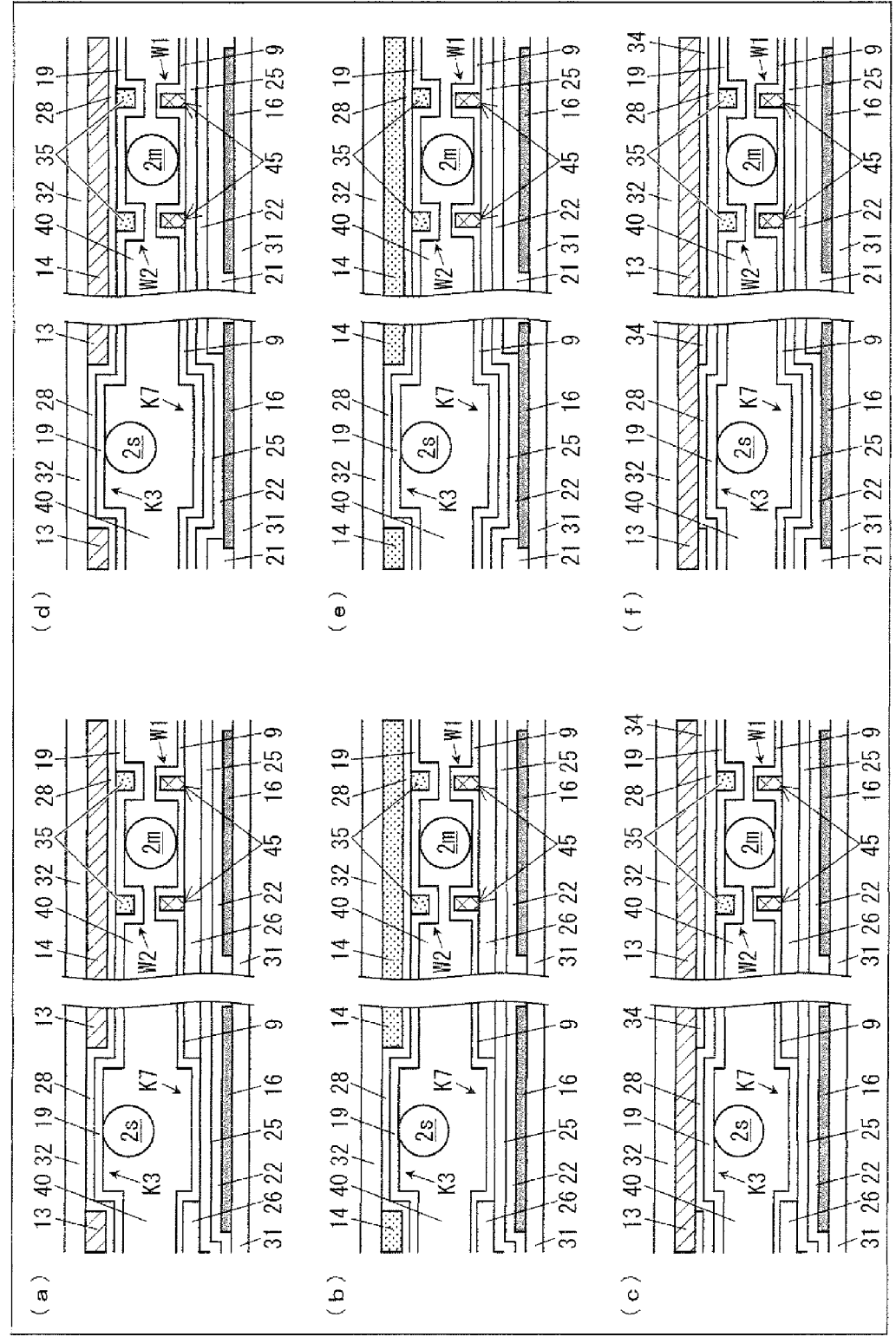
FIG. 21

Alternatively, instead of the protrusion 37 shown in (a) of FIG. 19, a rib 45 may be formed (on an organic interlayer insulating film 26) as shown in (a) of FIG. 21. Further, instead of the protrusion 37 shown in (b) of FIG. 19, a rib 45 may be formed (on an organic interlayer insulating film 26) as shown in (b) of FIG. 21. Furthermore, instead of the protrusion 37 shown in (c) of FIG. 19, a rib 45 may be formed (on an organic interlayer insulating film 26) as shown in (c) of FIG. 21. Moreover, instead of the protrusion 37 shown in (d) of FIG. 19, a rib 45 may be formed (on an inorganic interlayer insulating film 25) as shown in (d) of FIG. 21. Furthermore, instead of the protrusion 37 shown in (e) of FIG. 19, a rib 45 may be formed (on an inorganic interlayer insulating film 25) as shown in (d) of FIG. 21. Moreover, instead of the protrusion 37 shown in (f) of FIG. 19, a rib 45 may be formed (on an inorganic interlayer insulating film 25) as shown in (f) of FIG. 21.

Figure 22:
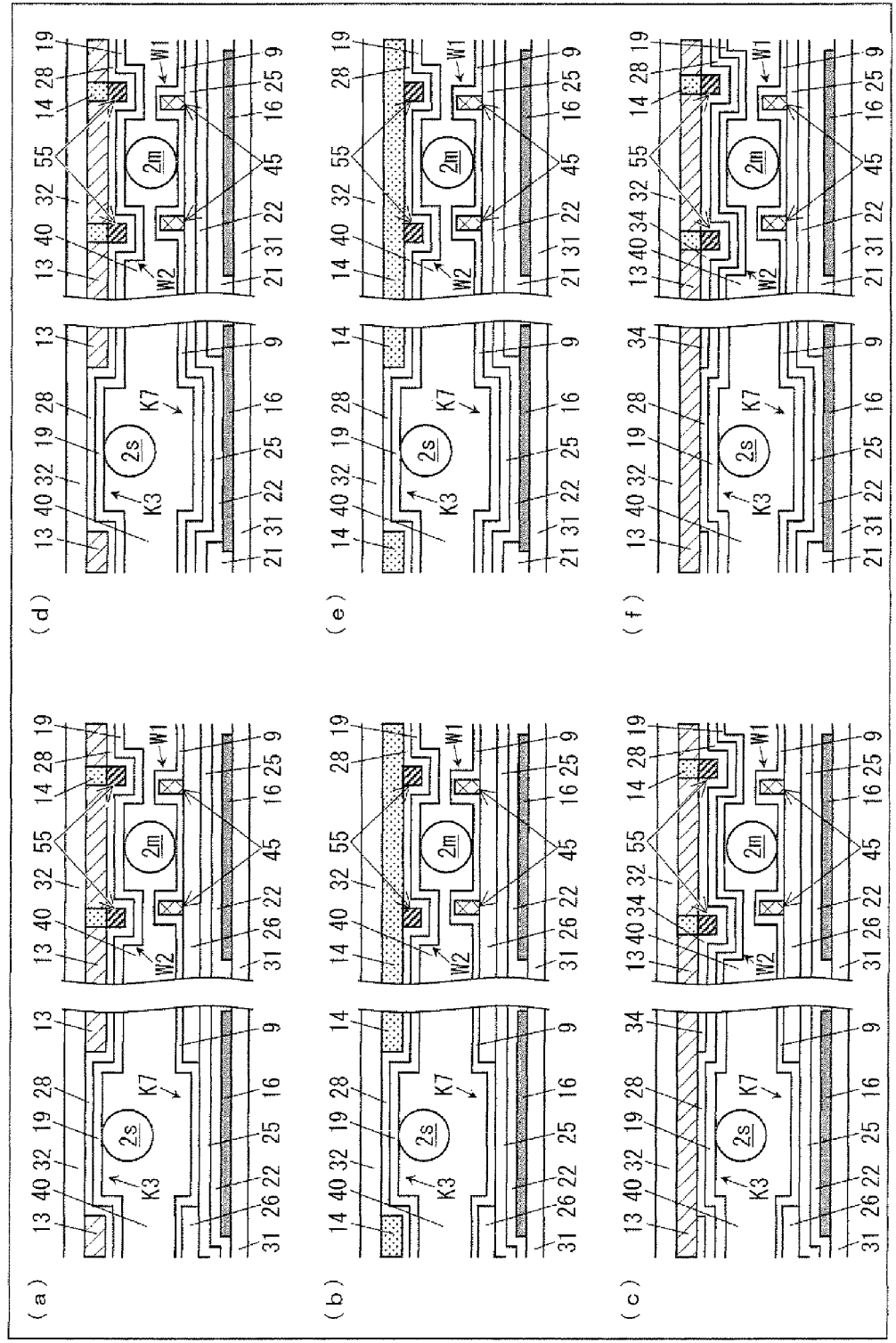
FIG. 22

Alternatively, instead of the rib 35 shown in (a) of FIG. 21, a protrusion 55 may be formed as shown in (a) of FIG. 22 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 21, a protrusion 55 may be formed as shown in (b) of FIG. 22 by causing a light shielding layer to be left at a portion which corresponds to a protruded wall W2. Note that a common electrode 28 is formed on the protrusion 55. Furthermore, instead of the rib 35 shown in (c) of FIG. 21, a protrusion 55 may be formed as shown in (c) of FIG. 22 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55. Moreover, instead of the rib 35 shown in (d) of FIG. 21, a protrusion 55 may be formed as shown in (d) of FIG. 22 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Furthermore, instead of the rib 35 shown in (e) of FIG. 21, a protrusion 55 may be formed as shown in (e) of FIG. 22 by causing a light shielding layer to be left at a portion which corresponds to a protruded wall W2. Note that a common electrode 28 is formed on the protrusion 55. Moreover, instead of the rib 35 shown in (f) of FIG. 21, a protrusion 55 may be formed as shown in (f) of FIG. 22 by (i) causing a colored layer 14 to be left at a portion which corresponds to a protruded wall W2 and (ii) causing a light shielding layer to be stacked on the colored layer 14 thus left. Note that an overcoating film 34 is formed on the protrusion 55.

In Embodiment 9, since it is possible to limit movement of the sub spacer 2s by means of the third recess K3 and the recess K7, and also to limit movement of the main spacer 2m by means of the protruded walls W1 and W2, the movement limiting effect with respect to these spacers is enhanced.

[Embodiment 10]

Figure 23:
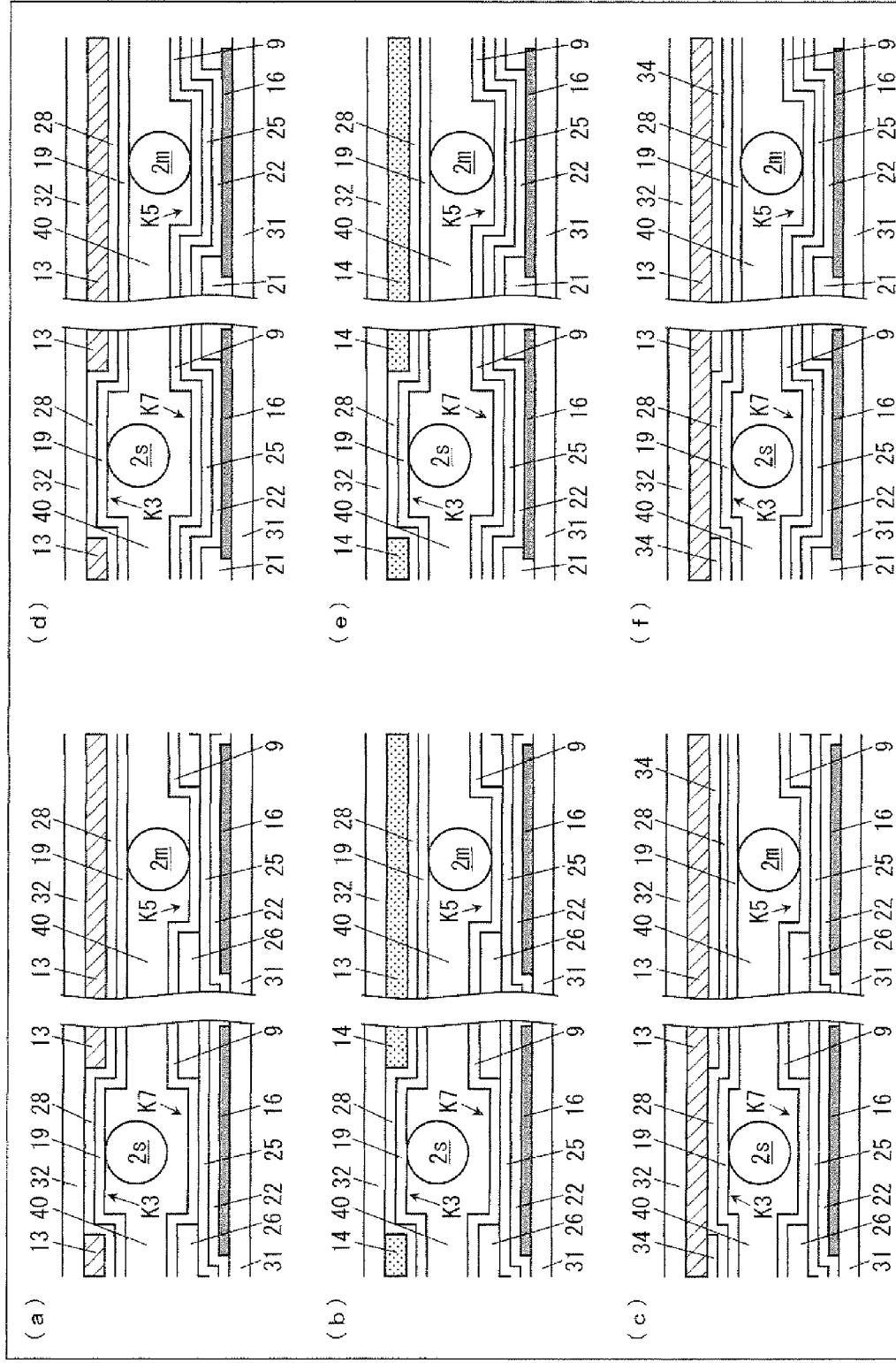
FIG. 23

(a), (c), (d), and (f) of FIG. 23 show specific examples of a configuration of the liquid crystal panel shown in FIG. 2, and are cross-section views of the main spacer region Ma and the sub spacer region Sa shown in FIG. 2. Further, (b) and (e) of FIG. 23 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 23 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26, which is thicker than the inorganic interlayer insulating film 25, are formed. Here, in order to form a recess K7 which faces a sub spacer region Sa, a region of the organic interlayer insulating film 26 which region corresponds to the sub spacer region Sa is hollowed out in a quadrangular shape. In addition, in order to form a recess K5 which faces a main spacer region Ma, a region of the organic interlayer insulating film 26 which region corresponds to the main spacer region Ma is hollowed out in a quadrangular shape. An alignment film 9 is formed as an upper layer of the organic interlayer insulating film 26. On the other hand, in a color filter substrate, a light shielding layer (black matrix) 13 is formed on a transparent substrate 32. Here, in order to form, on the surface of the color filter substrate, a third recess K3 serving as the sub spacer region Sa, a portion of the light shielding layer 13 which portion corresponds to the sub spacer region Sa is hollowed out in a quadrangular shape. A common electrode 28 is formed as an upper layer of the light shielding layer 13, and an alignment film 19 is formed so as to cover the common electrode 28.

As described above, in the configuration shown in (a) of FIG. 23, the third recess K3, which serves as the sub spacer region Sa, is formed by locally hollowing out the light shielding layer 13; and the recess K7, which faces the sub spacer region Sa, and the recess K5, which faces the main spacer region Ma, are formed by locally hollowing out the organic interlayer insulating film 26. This makes it possible to limit movement of the sub spacer 2s by means of the third recess K3 and the recess K7, and also to limit movement of the main spacer 2m by means of the recess K5, while preventing a liquid crystal bubble which occurs due to low temperature, etc.

The configuration of (b) of FIG. 23 includes a light shielding layer 13 having a stripe pattern as in FIG. 7 (see FIG. 7). This configuration can be achieved by replacing the light shielding layer 13 in (a) of FIG. 23 with a colored layer 14.

The configuration shown in (c) of FIG. 23 is described below. The configuration of an active matrix substrate is the same as that shown in (a) of FIG. 23. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. A common electrode 28 is formed on the overcoating film 34, and an alignment film 19 is formed so as to cover the common electrode 28.

As described above, in the configuration shown in (c) of FIG. 23, the third recess K3, which serves as the sub spacer region Sa, is formed by locally hollowing out the overcoating film 34; and a recess K7, which faces the sub spacer region Sa, and a recess K5, which faces a main spacer region Ma, are formed by locally hollowing out an organic interlayer insulating film 26. This makes it possible to limit movement of the sub spacer 2s by means of the third recess K3 and the recess K7, and also to limit movement of the main spacer 2m by means of the recess K5, while preventing a liquid crystal bubble which occurs due to low temperature, etc.

The configuration of (d) of FIG. 23 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form a recess K7 which faces a sub spacer region Sa, a region of the organic gate insulating film 21 which region corresponds to the sub spacer region Sa is hollowed out in a quadrangular shape. In addition, in order to form a recess K5 which faces a main spacer region Ma, a region of the organic gate insulating film 21 which region corresponds to the main spacer region Ma is hollowed out in a quadrangular shape. An inorganic interlayer insulating film 25 is formed as an upper layer of the inorganic gate insulating film 22, and an alignment film 9 is formed as an upper layer of the inorganic interlayer insulating film 25. The configuration of a color filter substrate is the same as that shown in (a) of FIG. 23.

As described above, in the configuration shown in (d) of FIG. 23, a third recess K3, which serves as the sub spacer region Sa, is formed by locally hollowing out a light shielding layer 13; and the recess K7, which faces the sub spacer region Sa, and the recess K5, which faces the main spacer region Ma, are formed by locally hollowing out the organic gate insulating film 21. This makes it possible to limit movement of the sub spacer 2s by means of the third recess K3 and the recess K7, and also to limit movement of the main spacer 2m by means of the recess K5, while preventing a liquid crystal bubble which occurs due to low temperature, etc.

The configuration of (e) of FIG. 23 includes a light shielding layer 13 having a stripe pattern as in FIG. 7 (see FIG. 7). This configuration can be achieved by replacing the light shielding layer 13 in (d) of FIG. 23 with a colored layer 14.

The configuration of (f) of FIG. 23 is described below. The configuration of an active matrix substrate is the same as that shown in (d) of FIG. 23. The configuration of a color filter substrate is the same as that shown in (c) of FIG. 23.

As described above, in the configuration shown in (f) of FIG. 23, a third recess K3, which serves as a sub spacer region Sa, is formed by locally hollowing out an overcoating film 34; and a recess K7, which faces the sub spacer region Sa, and a recess K5, which faces a main spacer region Ma, are formed by locally hollowing out an organic gate insulating film 21. This makes it possible to limit movement of the sub spacer 2s by means of the third recess K3 and the recess K7, and also to limit movement of the main spacer 2m by means of the recess K5, while preventing a liquid crystal bubble which occurs due to low temperature, etc.

In Embodiment 10, since merely the recesses (K3, K5, K7) are formed on the surfaces of the substrates (3, 30), it is possible to prevent poor application of the alignment film. Further, since it is possible to limit movement of the sub spacer 2s by means of the third recess K3 and the recess K7, the movement limiting effect is enhanced.

[Embodiment 11]

Figure 24:
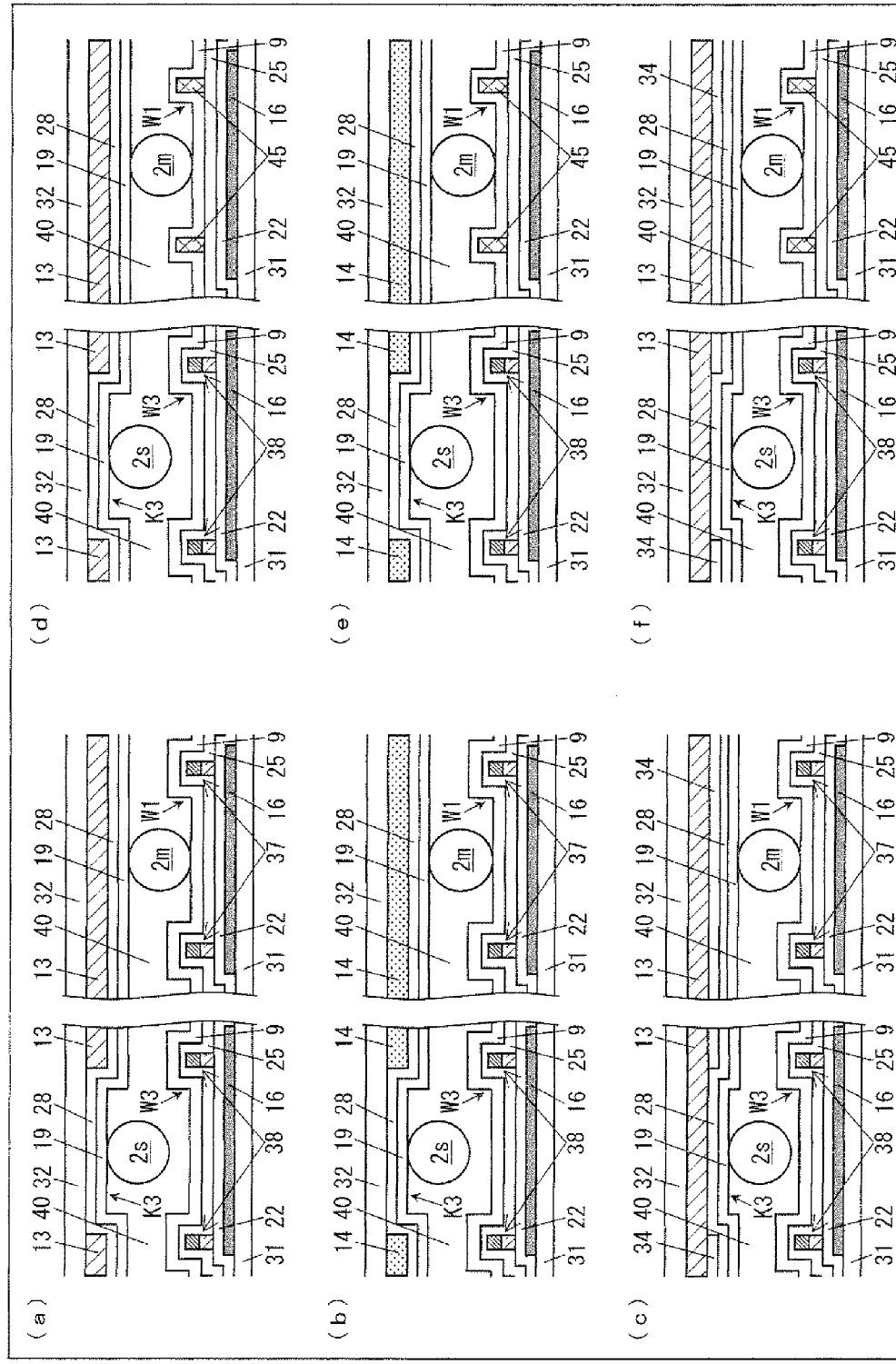
FIG. 24

(a), (c), (d), and (f) of FIG. 24 show specific examples of a configuration of the liquid crystal panel shown in FIG. 2, and are cross-section views of the main spacer region Ma and the sub spacer region Sa shown in FIG. 2. Further, (b) and (e) of FIG. 24 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 24 is described below. In an active matrix substrate, a scanning signal line 16 is formed on a transparent substrate 31, and an inorganic gate insulating film 22 is formed as an upper layer of the scanning signal line 16. Here, in order to form a protruded wall W1 surrounding a region (hereinafter, referred to as Ma counter region) which faces a main spacer region Ma, a protrusion 37 having a laminated structure made of a semiconductor layer and a metal layer is formed on a portion of the inorganic gate insulating film 22 which portion corresponds to the protruded wall W1. In addition, in order to form a protruded wall W3 surrounding a region (hereinafter, referred to as Sa counter region) which faces a sub spacer region Sa, a protrusion 38 having a laminated structure made of a semiconductor layer and a metal layer is formed on a portion of the inorganic gate insulating film 22 which portion corresponds to the protruded wall W3. An inorganic interlayer insulating film 25 is formed on the inorganic gate insulating film 22, and an alignment film 9 is formed as an upper layer of the inorganic interlayer insulating film 25.

On the other hand, in a color filter substrate, a light shielding layer (black matrix) 13 is formed on a transparent substrate 32. Here, in order to form, on the surface of the color filter substrate, a third recess K3 serving as the sub spacer region Sa, a portion of the light shielding layer 13 which portion corresponds to the sub spacer region Sa is hollowed out in a quadrangular shape. A common electrode 28 is formed on the light shielding layer 13, and an alignment film 19 is formed so as to cover the common electrode 28.

As described above, in the configuration shown in (a) of FIG. 24, the third recess K3, which serves as the sub spacer region Sa, is formed by locally hollowing out the light shielding layer 13; the protruded wall W1, which surrounds the Ma counter region, is formed by forming the protrusion 37 on the inorganic gate insulating film 22; and the protruded wall W3, which surrounds the Sa counter region, is formed by forming the protrusion 38 on the inorganic gate insulating film 22. This makes it possible to limit movement of the sub spacer 2s by means of the third recess K3 and the protruded wall W3, and also to limit movement of the main spacer 2m by means of the protruded wall W1, while preventing a liquid crystal bubble which occurs due to low temperature, etc.

The configuration of (b) of FIG. 24 includes a light shielding layer 13 having a stripe pattern as in FIG. 7 (see FIG. 7). This configuration can be achieved by replacing the light shielding layer 13 in (a) of FIG. 24 with a colored layer 14.

The configuration shown in (c) of FIG. 24 is described below. The configuration of an active matrix substrate is the same as that shown in (a) of FIG. 24. In a color filter substrate, a light shielding layer (black matrix) 13 is formed on a transparent substrate 32, and an overcoating film 34 is formed as an upper layer of the light shielding layer 13. Here, in order to form, on the surface of the color filter substrate, a third recess K3 serving as a sub spacer region Sa, a portion of the overcoating film 34 which portion corresponds to the sub spacer region Sa is hollowed out in a quadrangular shape. A common electrode 28 is formed on the overcoating film 34, and an alignment film 19 is formed so as to cover the common electrode 28.

As described above, in the configuration shown in (c) of FIG. 24, the third recess K3, which serves as the sub spacer region Sa, is formed by locally hollowing out the overcoating film 34; a protruded wall W1, which surrounds an Ma counter region, is formed by forming a protrusion 37 on an inorganic gate insulating film 22; and a protruded wall W3, which surrounds an Sa counter region, is formed by forming a protrusion 38 on the inorganic gate insulating film 22. This makes it possible to limit movement of the sub spacer 2s by means of the third recess K3 and the protruded wall W3, and also to limit movement of the main spacer 2m by means of the protruded wall W1, while preventing a liquid crystal bubble which occurs due to low temperature, etc.

Instead of the protrusion 37 shown in (a) of FIG. 24, a rib 45 may be formed (on an inorganic interlayer insulating film 25) as shown in (d) of FIG. 24. Further, instead of the protrusion 37 shown in (b) of FIG. 24, a rib 45 may be formed (on an inorganic interlayer insulating film 25) as shown in (e) of FIG. 24. Furthermore, instead of the protrusion 37 shown in (c) of FIG. 24, a rib 45 may be formed (on an inorganic interlayer insulating film 25) as shown in (f) of FIG. 24.

In Embodiment 11, since it is possible to limit movements of the sub spacer 2s by means of the third recess K3 and the protruded wall W3, the movement limiting effect is enhanced.

[Embodiment 12]

Figure 25:
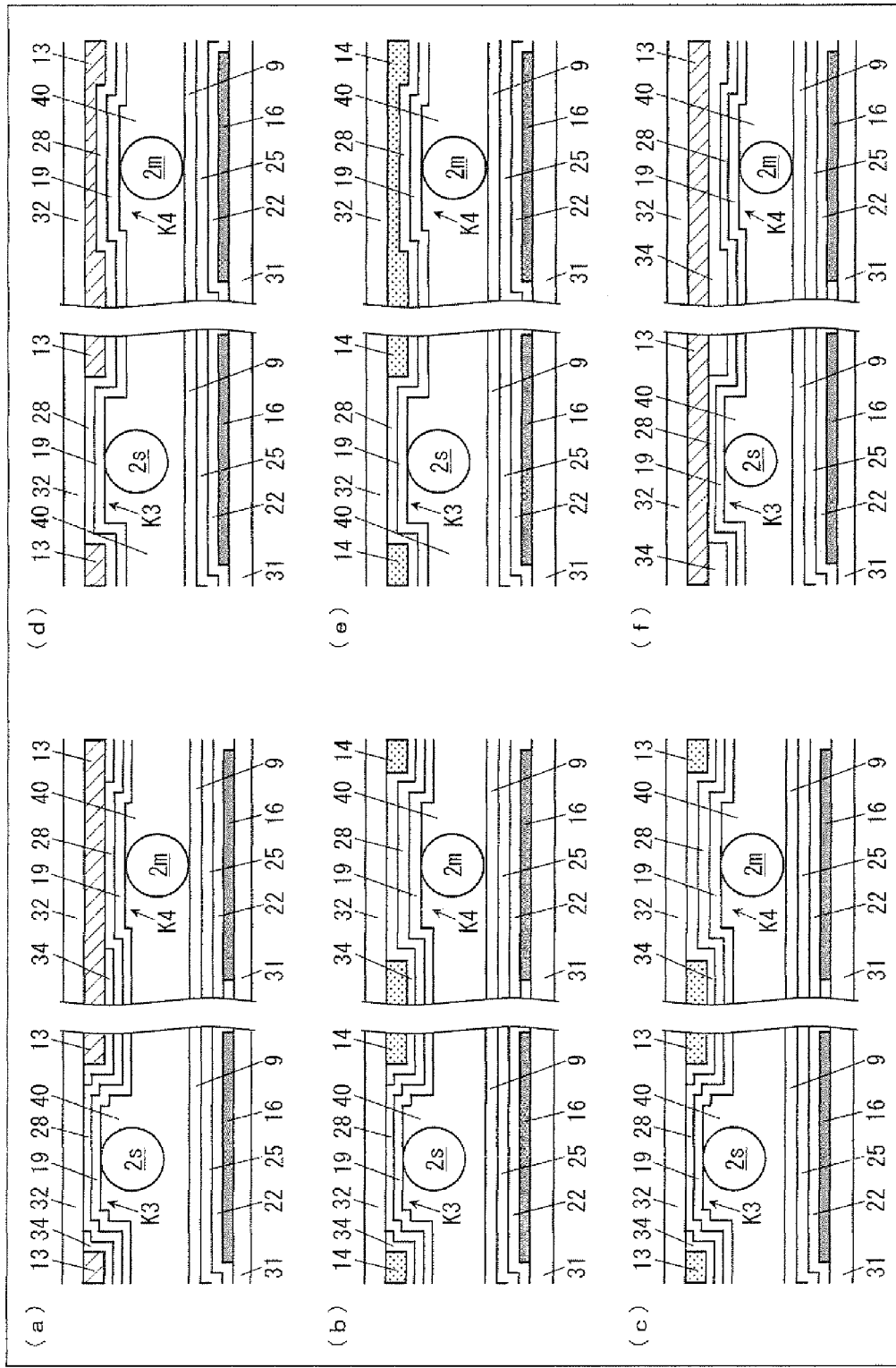
FIG. 25

(a), (c), (d), and (f) of FIG. 25 show specific examples of a configuration of the liquid crystal panel shown in FIG. 2, and are cross-section views of the main spacer region Ma and the sub spacer region Sa shown in FIG. 2. Further, (b) and (e) of FIG. 25 show specific examples of a configuration of the liquid crystal panel shown in FIG. 8, and are cross-section views of the main spacer region Ma and the sub spacer region Sa shown in FIG. 8. In the present embodiment, a color filter substrate 30 includes a surface which faces a liquid crystal material 40 and on which a main spacer region Ma directed to include a main spacer 2m and a sub spacer region Sa directed to include a sub spacer 2s are provided so that the main spacer region Ma and the sub spacer region Sa overlap a scanning signal line 16 and a light shielding layer 13.

The configuration shown in (a) of FIG. 25 is described below. In an active matrix substrate, a scanning signal line 16 is formed on a transparent substrate 31, and an inorganic gate insulating film 22 is formed as an upper layer of the scanning signal line 16. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32. Here, in order to form, on the surface of the color filter substrate, a third recess K3 (deep recess) serving as a sub spacer region Sa, a portion of the light shielding layer 13 which portion corresponds to the sub spacer region Sa is hollowed out in a quadrangular shape. An overcoating film 34 is formed as an upper layer of the light shielding layer 13. Here, in order to form, on the surface of the color filter substrate, the third recess K3 (deep recess) serving as the sub spacer region Sa, a portion of the overcoating film 34 which portion corresponds to the sub spacer region Sa is hollowed out in a quadrangular shape. In addition, in order to form, on the surface of the color filter substrate, a fourth recess K4 (shallow recess) serving as a main spacer region Ma, a portion of the overcoating film 34 which portion corresponds to the main spacer region Ma is hollowed out in a quadrangular shape. A common electrode 28 is formed as an upper layer of the overcoating film 34, and an alignment film 19 is formed so as to cover the common electrode 28.

As described above, in the configuration shown in (a) of FIG. 25, the third recess (deep recess) K3, which serves as the sub spacer region Sa, is formed by hollowing out a portion of the light shielding layer 13 and a portion of the overcoating film 34 each of which portions corresponds to the sub spacer region Sa; and the fourth recess (shallow recess) K4, which serves as the main spacer region Ma, is formed by hollowing out a portion of the overcoating film 34 which portion corresponds to the main spacer region Ma. This makes it possible to limit movement of the sub spacer 2s by means of the third recess K3, and also to limit movement of the main spacer 2m by means of the fourth recess K4, while preventing a liquid crystal bubble which occurs due to low temperature, etc.

The configuration of (b) of FIG. 25 includes a light shielding layer 13 having a stripe pattern as in FIG. 7 (see FIG. 7). This configuration can be achieved by replacing the light shielding layer 13 in (a) of FIG. 25 with a colored layer 14.

The configuration shown in (c) of FIG. 25 is described below. The configuration of an active matrix substrate is the same as that shown in (a) of FIG. 25. In a color filter substrate, a light shielding layer (black matrix) 13 is formed on a transparent substrate 32. Here, in order to form, on the surface of the color filter substrate, a third recess K3 (deep recess) serving as a sub spacer region Sa, a portion of the light shielding layer 13 which portion corresponds to the sub spacer region Sa is hollowed out in a quadrangular shape. In addition, in order to form, on the surface of the color filter substrate, a fourth recess K4 (shallow recess) serving as a main spacer region Ma, a portion of the light shielding layer 13 which portion corresponds to the main spacer region Ma is hollowed out in a quadrangular shape. An overcoating film 34 is formed as an upper layer of the light shielding layer 13. Here, in order to form, on the surface of the color filter substrate, the third recess K3 (deep recess) serving as the sub spacer region Sa, a portion of the overcoating film 34 which portion corresponds to the sub spacer region Sa is hollowed out in a quadrangular shape. A common electrode 28 is formed as an upper layer of the overcoating film 34, and an alignment film 19 is formed so as to cover the common electrode 28.

As described above, in the configuration shown in (a) of FIG. 25, the third recess (deep recess) K3, which serves as the sub spacer region Sa, is formed by hollowing out a portion of the light shielding layer 13 and a portion of the overcoating film 34 each of which portions correspond to the sub spacer region Sa; and the fourth recess (shallow recess) K4, which serves as the main spacer region Ma, is formed by hollowing out a portion of the light shielding layer 13 which portion corresponds to the main spacer region Ma. This makes it possible to limit movement of the sub spacer 2s by means of the third recess K3, and also to limit movement of the main spacer 2m by means of the fourth recess K4, while preventing a liquid crystal bubble which occurs due to low temperature, etc.

The configuration shown in (d) of FIG. 25 is described below. The configuration of an active matrix substrate is the same as that shown in (a) of FIG. 25. In a color filter substrate, a light shielding layer (black matrix) 13 is formed on a transparent substrate 32. Here, in order to form, on the surface of the color filter substrate, a third recess K3 (deep recess) serving as a sub spacer region Sa, a portion of the light shielding layer 13 which portion corresponds to the sub spacer region Sa is hollowed out in a quadrangular shape. In order to form, on the surface of the color filter substrate, a fourth recess K4 (shallow recess) serving as a main spacer region Ma, a portion of the light shielding layer 13 which portion corresponds to the main spacer region Ma is formed so as to be locally thinner. A common electrode 28 is formed as an upper layer of the light shielding layer 13, and an alignment film 19 is formed so as to cover the common electrode 28.

As described above, in the configuration shown in (d) of FIG. 25, the third recess (deep recess) K3, which serves as the sub spacer region Sa, is formed by hollowing out a portion of the light shielding layer 13 which portion corresponds to the sub spacer region Sa; and the fourth recess (shallow recess) K4, which serves as the main spacer region, is formed by forming a portion of the light shielding layer 13 which portion corresponds to the main spacer region Ma so that the portion becomes thinner. This makes it possible to limit movement of the sub spacer 2s by means of the third recess K3, and also to limit movement of the main spacer 2m by means of the fourth recess K4, while preventing a liquid crystal bubble which occurs due to low temperature, etc.

The configuration of (e) of FIG. 25 includes a light shielding layer 13 having a stripe pattern as in FIG. 7 (see FIG. 7). This configuration can be achieved by replacing the light shielding layer 13 in (d) of FIG. 25 with a colored layer 14.

The configuration shown in (f) of FIG. 25 is described below. The configuration of an active matrix substrate is the same as that shown in (a) of FIG. 25. In a color filter substrate, a light shielding layer 13 is formed on a transparent substrate 32. An overcoating film 34 is formed as an upper layer of the light shielding layer 13. Here, in order to form, on the surface of the color filter substrate, a third recess K3 (deep recess) serving as a sub spacer region Sa, a portion corresponding to the sub spacer region Sa is hollowed out in a quadrangular shape. In addition, in order to form, on the surface of the color filter substrate, a fourth recess K4 (shallow recess) serving as a main spacer region Ma, a portion of the overcoating film 34 which portion corresponds to the main spacer region Ma is formed so as to be locally thinner. A common electrode 28 is formed as an upper layer of the overcoating film 34, and an alignment film 19 is formed so as to cover the common electrode 28.

As described above, in the configuration shown in (f) of FIG. 25, the third recess (deep recess) K3, which serves as the sub spacer region Sa, is formed by hollowing out a portion of the overcoating film 34 which portion corresponds to the sub spacer region Sa; and the fourth recess (shallow recess) K4, which serves as the main spacer region, is formed by forming a portion of the light overcoating film 34 which portion corresponds to the main spacer region Ma so that the portion becomes thinner. This makes it possible to limit movement of the sub spacer by means of the third recess K3, and also to limit movement of the main spacer 2m by means of the fourth recess K4, while preventing a liquid crystal bubble which occurs due to low temperature, etc.

In Embodiment 12, since the third recess K3 and the recess K4 are both formed in the color filter substrate, it is possible to achieve the above-described effects in combination with a generally-used active matrix substrate.

[Embodiment 13]

Figure 32:
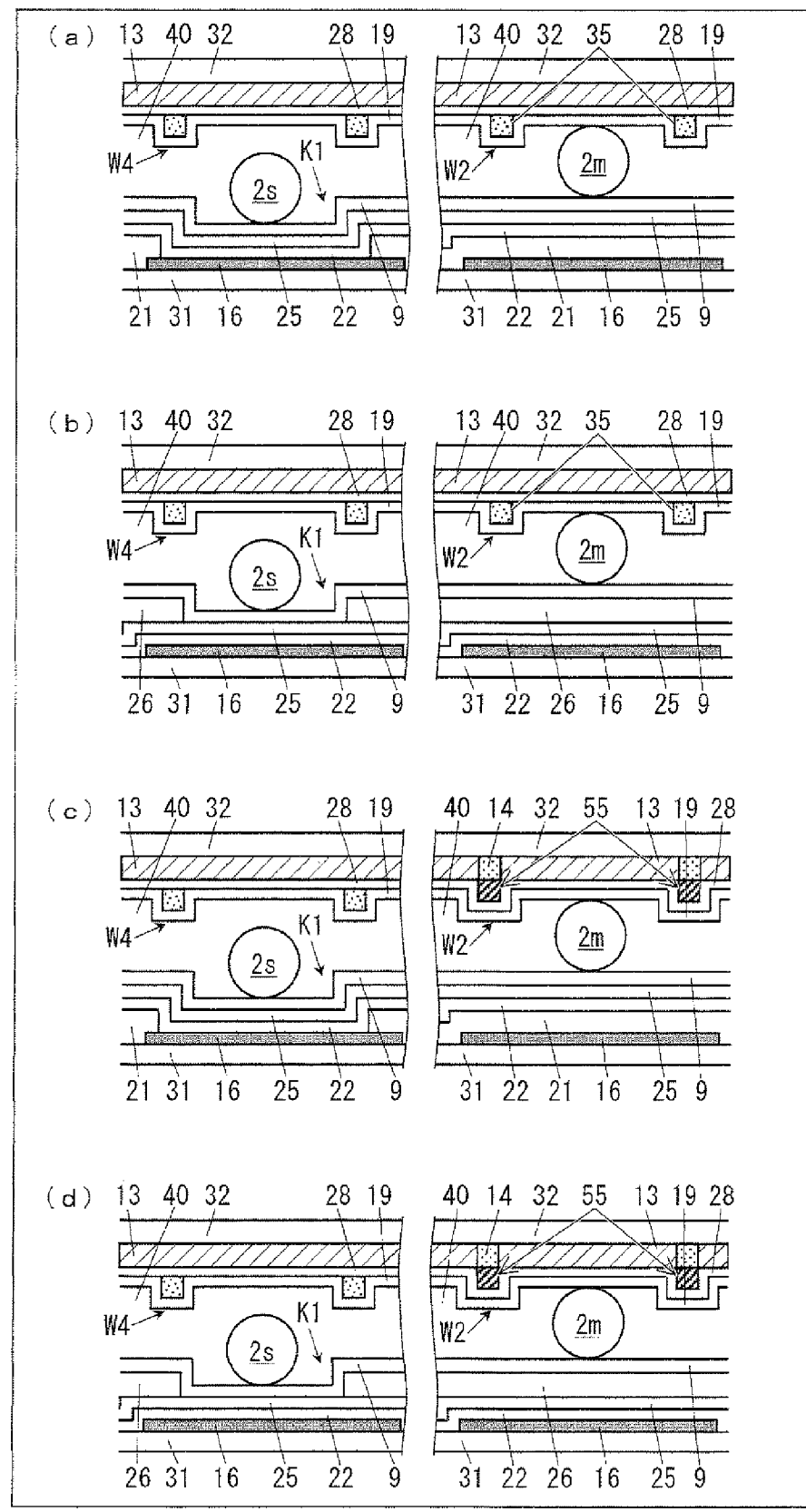
FIG. 32

(a) to (d) of FIG. 32 show specific examples of a configuration of the liquid crystal panel shown in FIG. 1, and are cross-section views of the main spacer region MA and the sub spacer region SA shown in FIG. 1. In the present embodiment, an active matrix substrate 3 includes a surface which faces a liquid crystal material 40 and on which a main spacer region MA directed to include a main spacer 2m and a sub spacer region SA directed to include a sub spacer 2s are provided so that the main spacer region MA and the sub spacer region SA overlap a scanning signal line 16 and a light shielding layer 13. Each of the sub spacer region SA and the main spacer region MA has a quadrangular shape.

The configuration shown in (a) of FIG. 32 is described below. In an active matrix substrate, a scanning signal line 16 is formed on a transparent substrate 31, and an organic gate insulating film 21 and an inorganic gate insulating film 22, which is thinner than the organic gate insulating film 21, are formed as an upper layer of the scanning signal line 16. Here, in order to form, on the surface of the active matrix substrate, a first recess K1 serving as a sub spacer region SA, a portion of the organic gate insulating film 21 which portion corresponds to the sub spacer region SA is hollowed out in a quadrangular shape. An inorganic interlayer insulating film 25 is formed on the inorganic gate insulating film 22, and an alignment film 9 is formed as an upper layer of the inorganic interlayer insulating film 25. On the other hand, in a color filter substrate, a light shielding layer (black matrix) 13 is formed on a transparent substrate 32, and a common electrode 28 is formed so as to cover the light shielding layer 13. Here, in order to form, on the surface of the color filter substrate, a protruded wall W2 surrounding a region (hereinafter, referred to as MA counter region) which faces a main spacer region MA, a rib 35 is formed on a portion of the common electrode 28 which portion corresponds to the protruded wall W2. Further, in order to form, on the surface of the color filter substrate, a protruded wall W4 surrounding a region (hereinafter, referred to as SA counter region) which faces a sub spacer region SA, a rib 35 is formed on a portion of the common electrode 28 which portion corresponds to the protruded wall W4. Furthermore, an alignment film 19 is formed so as to cover the common electrode 28 and the rib 35. Note that the rib can be formed in a step in which an alignment controlling rib is formed on the color filter substrate.

As described above, in the configuration shown in (a) of FIG. 32, the first recess K1, which serves as the sub spacer region SA, is formed by locally hollowing out the organic gate insulating film 21; and the protruded wall W2, which surrounds the MA counter region, and the protruded wall W4, which surrounds the SA counter region, are formed by forming the ribs 35 on the common electrode 28. This makes it possible to limit movement of the sub spacer 2s by means of the first recess K1 and the protruded wall W4, and also to limit movement of the main spacer 2m by means of the protruded wall W2, while preventing a liquid crystal bubble (i.e., a space between the active matrix substrate and the color filter substrate in which space no liquid crystal material is present) which occurs due to low temperature, etc.

The configuration shown in (b) of FIG. 32 is described below. In an active matrix substrate, a scanning signal line 16 is formed on a transparent substrate 31, and an inorganic gate insulating film 22 is formed as an upper layer of the scanning signal line 16. On the inorganic gate insulating film 22, an inorganic interlayer insulating film 25 and an organic interlayer insulating film 26, which is thicker than the inorganic interlayer insulating film 25, are formed. Here, in order to form, on the surface of the active matrix substrate, a first recess K1 serving as a sub spacer region SA, a portion of the organic interlayer insulating film 26 which portion corresponds to the sub spacer region SA is hollowed out in a quadrangular shape. An alignment film 9 is formed as an upper layer of the inorganic interlayer insulating film 26. The configuration of a color filter substrate is the same as that shown in (a) of FIG. 32.

As described above, in the configuration shown in (b) of FIG. 32, the first recess K1 is formed by locally hollowing out the organic interlayer insulating film 26; and a protruded wall W2, which surrounds an MA counter region, and a protruded wall W4, which surrounds the SA counter region, are formed by forming ribs 35 on a common electrode 28. This makes it possible to limit movement of the sub spacer 2s by means of the first recess K1 and the protruded wall W4, and also to limit movement of the main spacer 2m by means of the protruded wall W2, while preventing a liquid crystal bubble (i.e., a space between the active matrix substrate and the color filter substrate in which space no liquid crystal material is present) which occurs due to low temperature, etc.

Instead of the rib 35 shown in (a) of FIG. 32, a protrusion 55 may be formed as shown in (c) of FIG. 32 by (i) causing a colored layer 14 to be left at a portion which corresponds to a protruded wall W2 and (ii) causing a light shielding layer to be stacked on the colored layer 14 thus left. Note that a common electrode 28 is formed on the protrusion 55. Further, instead of the rib 35 shown in (b) of FIG. 32, a protrusion 55 may be formed as shown in (d) of FIG. 32 by (i) causing a colored layer 14 to be left at a portion which corresponds to a protruded wall W2 and (ii) causing a light shielding layer to be stacked on the colored layer 14 thus left.

[Regarding Above-Described Embodiments]

In each of the above-described embodiments, it is possible to use, as an alternative to the organic gate insulating film 21, an inorganic insulating film (e.g., an insulating film made of a siloxane compound) which is thicker than the inorganic gate insulating film 22. Further, it is possible to use, as an alternative to the organic interlayer insulating film 26, an inorganic insulating film which is thicker than the inorganic interlayer insulating film 25.

In (a) to (f) of FIG. 13, in which the sub spacer 2s is disposed to be in contact with the active matrix substrate, the sub spacer 2s may be disposed to be in contact with the color filter substrate. Further, in (a) to (f) of FIG. 19, (a) to (f) of FIG. 20, (a) to (f) of FIG. 21, (a) to (f) of FIG. 22, (a) to (f) of FIG. 23, and (a) to (f) of FIG. 24, in which the sub spacer 2s is disposed to be in contact with the color filter substrate, the sub spacer 2s may be disposed to be in contact with the active matrix substrate.

In the configurations shown in (a) and (b) of FIG. 10, (a) to (d) of FIG. 11, (a) to (c) of FIG. 16, (a) to (f) of FIGS. 17, 19, 20, and 24, the semiconductor layer of the protrusion 37 is formed in a step of forming the channels of the transistors, and the metal layer of the protrusion 37 is formed in a step of forming the data signal lines and/or the like. This provides an advantage of eliminating a need for an additional step of forming the protrusion 37.

In (d) of FIG. 10, (b) and (d) of FIG. 12, and (a) to (c) of FIGS. 21 and 22, the protrusion (the protrusion 37 or the protrusion 45) is formed on the organic interlayer insulating film 26 (thick interlayer insulating film) having a planarizing effect. This provides such an advantage that a height of the protruded wall can be easily secured.

Figure 33:
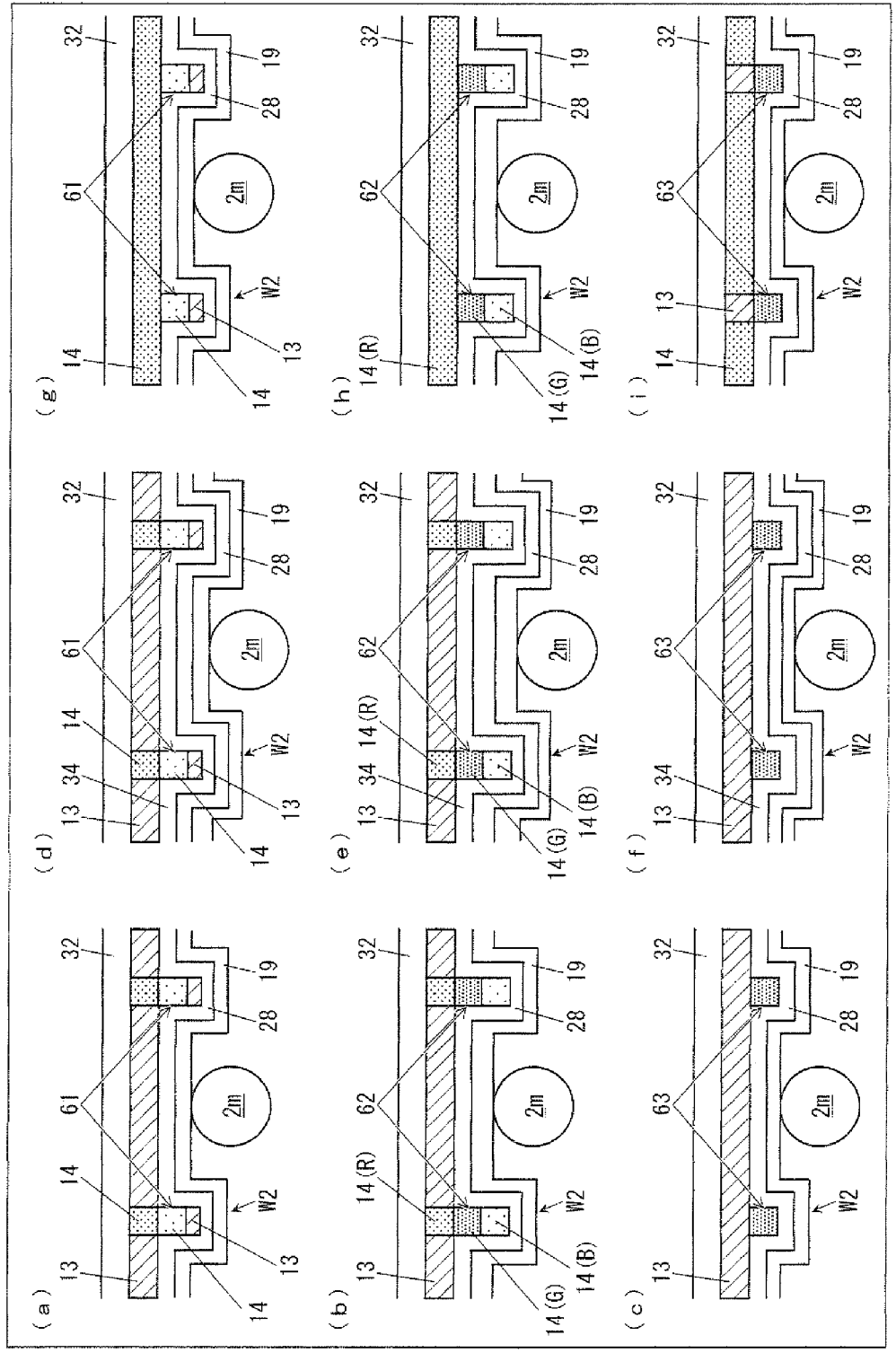
FIG. 33

In the above-described configurations shown in (c) and (d) of FIGS. 9, 11, and 12, (d) of FIGS. 15, 17, and 18, (a) and (d) of FIG. 20 and FIG. 22, and (e) and (d) of FIG. 32, the protrusion 55 may be replaced with a protrusion 61 made of laminated films including a colored layer 14 and a light shielding layer 13 as shown in (a) of FIG. 33. In this case, two colored layers (of two colors) are left at a portion which corresponds to a protruded wall W2, and a light shielding layer 13 is formed as an upper layer of the colored layer thus left. Alternately, in the above-described configurations shown in (c) and (d) of FIGS. 9, 11, and 12, (d) of FIGS. 15, 17, and 18, (a) and (d) of FIG. 20 and FIG. 22, and (c) and (d) of FIG. 32, the protrusion 55 may be replaced with a protrusion 62 made of laminated films including two colored layers (of two colors) (e.g., 14(G) and 14(B)) as shown in (b) of FIG. 33. In this case, three colored layers 14(R), 14(G), and 14(B) are left at a portion which corresponds to a protruded wall W2, and a portion of a light shielding layer which portion corresponds to the protruded wall W2 is removed. In a case where a colored layer is formed following formation of a light shielding layer, in the above-described configurations shown in (c) and (d) of FIGS. 9, 11, and 12, (d) of FIGS. 15, 17, and 18, (a) and (d) of FIG. 20 and FIG. 22, and (c) and (d) of FIG. 32, the protrusion 55 may be replaced with a protrusion 63 made of a colored layer as shown in (c) of FIG. 33. That is, in forming a colored layer 14 following formation of a light shielding layer 13, a portion of the colored layer which portion corresponds to a protruded wall W2 is not removed but is left.

In the above-described configurations shown in (f) of FIGS. 15, 17, and 18 and (c) and (f) of FIGS. 20 and 22, the protrusion 55 may be replaced with a protrusion 61 made of laminated films including a colored layer 14 and a light shielding layer 13 as shown in (d) of FIG. 33. In this case, two colored layers (of two colors) are left at a portion which corresponds to a protruded wall W2, and a light shielding layer 13 is formed as an upper layer of the colored layers thus left. Further, in the above-described configurations shown in (f) of FIGS. 15, 17, and 18 and (c) and (f) of FIGS. 20 and 22, the protrusion 55 may be replaced with a protrusion 62 made of laminated films including two colored layers (of two colors) (e.g., 14(G) and 14(B)) as shown in (e) of FIG. 33. In this case, three colored layers 14(R), 14(G), and 14(B) are left at a portion which corresponds to a protruded wall W2, and a portion of a light shielding layer which portion corresponds to the protruded wall W2 is removed. In a case where a colored layer is formed following formation of a light shielding layer, in the above-described configurations shown in (f) of FIGS. 15, 17, and 18 and (c) and (f) of FIGS. 20 and 22, the protrusion 55 may be replaced with a protrusion 63 made of a colored layer as shown in (f) of FIG. 33. That is, in forming a colored layer following formation of a light shielding layer 13, a portion of the colored layer which portion corresponds to a protruded wall W2 is not removed but is left.

In the above-described configurations shown in (e) of FIGS. 15, 17, and 18 and (b) and (e) of FIGS. 20 and 22, the protrusion 55 may be replaced with a protrusion 61 made of laminated films including a colored layer 14 and a light shielding layer 13 as shown in (g) of FIG. 33. In this case, one colored layer is left on a portion of a colored layer 14 which portion corresponds to a protruded wall W2, and a light shielding layer 13 is formed as an upper layer of the one colored layer thus left. Further, in the above-described configurations shown in (e) of FIGS. 15, 17, and 18 and (b) and (e) of FIGS. 20 and 22, the protrusion 55 may be replaced with a protrusion 62 made of laminated films including two colored layers (e.g., 14(G) and 14(B)) as shown in (h) of FIG. 33. In this case, two colored layers 14(G) and 14(B) are left on a portion of a colored layer 14 which portion corresponds to a protruded wall W2, and a portion of a light shielding layer which portion corresponds to the protruded wall W2 is removed. In a case where a colored layer is formed following formation of a light shielding layer, in the above-described configurations shown in (e) of FIGS. 15, 17, and 18 and (b) and (e) of FIGS. 20 and 22, the protrusion 55 may be replaced with a protrusion 63 made of a colored layer as shown in (i) of FIG. 33. That is, a light shielding layer 13 is left at a portion which corresponds to a protruded wall W2, and a colored layer is stacked on the light shielding layer 13 thus left.

Figure 27:
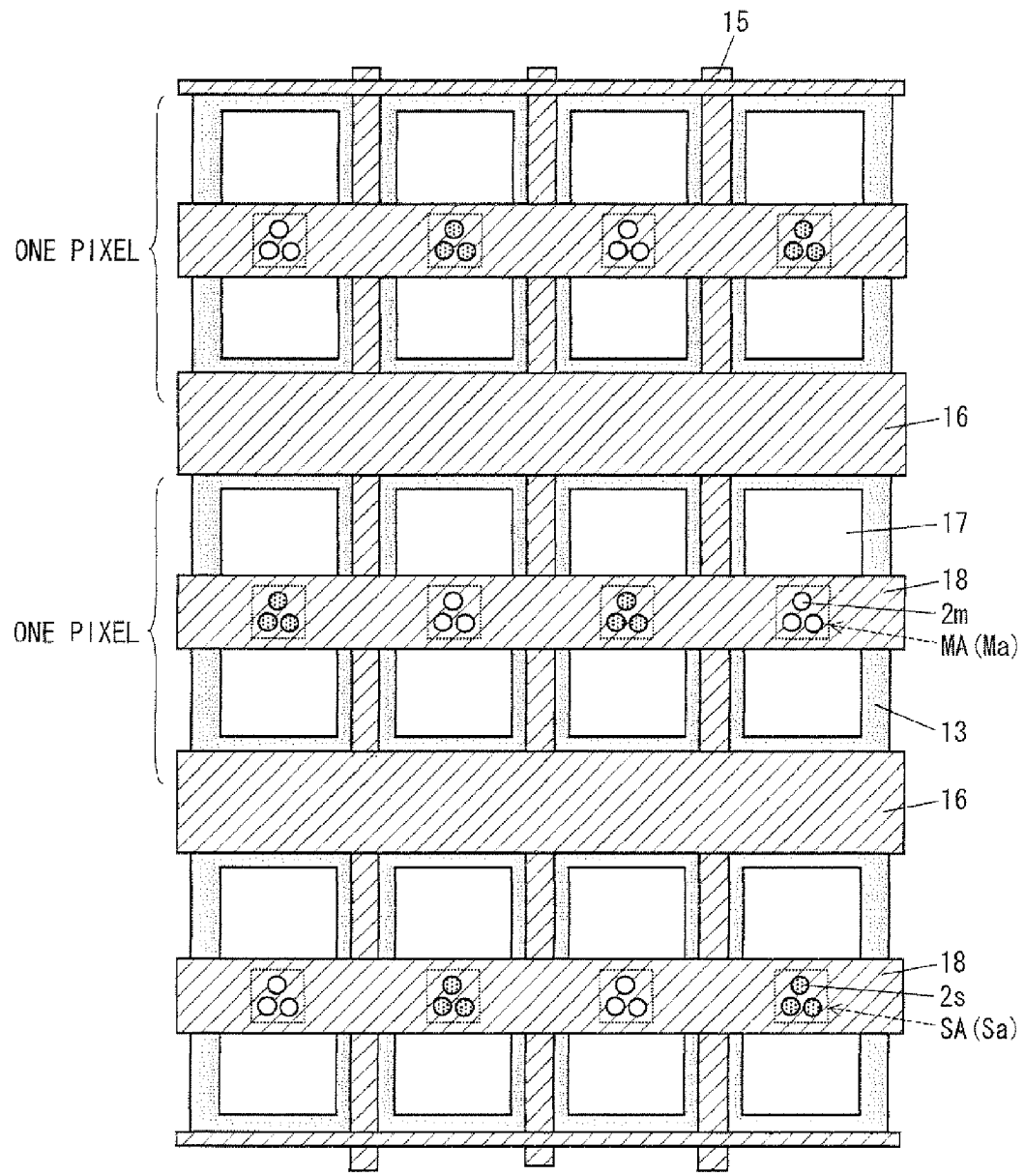
FIG. 27
Figure 28:
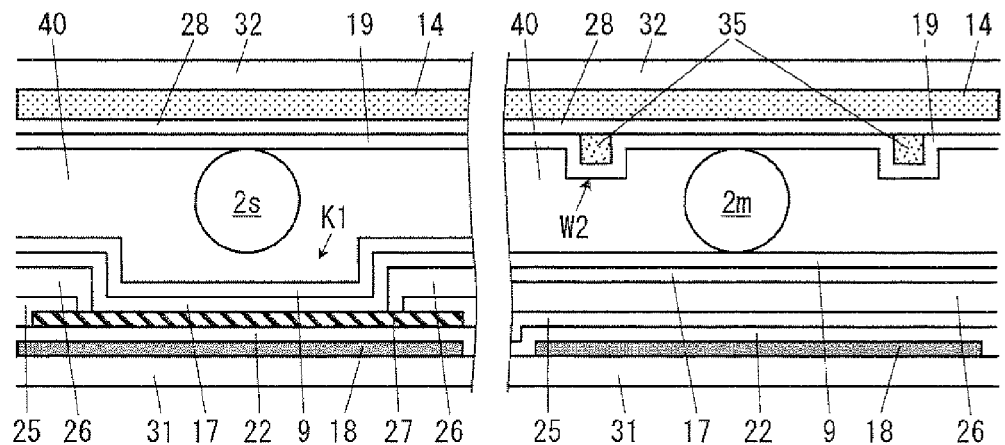
FIG. 28

In each of the foregoing embodiments, the sub spacer region and the main spacer region are formed so as to overlap the scanning signal line 16. However, the present invention is not limited to this. For example, as shown in FIG. 27, a sub spacer region and a main spacer region may be formed so as to overlap a retention capacitor wire 18. FIG. 28 shows respective cross-section views of these regions (MA and SA). As shown in FIG. 28, in an active matrix substrate, a retention capacitor wire 18 is formed on a transparent substrate 31, and an inorganic gate insulating film 22 is formed as an upper layer of the retention capacitor wire 18. A drain extraction electrode 27 connected with a drain electrode of a transistor is formed on the inorganic gate insulating film 22, and an inorganic interlayer insulating film 25 and an organic interlayer insulating film 26, which is thicker than the inorganic interlayer insulating film 25, are formed as an upper layer of the drain extraction electrode 27. Here, the inorganic interlayer insulating film 25 and the organic interlayer insulating film 26 are hollowed out so that the hollowed-out portion overlaps the drain extraction electrode 27, and thus a contact hole 11 is given. Through the contact hole 11, the pixel electrode 17 is connected with the drain extraction electrode 27. Further, a recess K1 on the surface of the active matrix substrate, which recess K1 is formed by the contact hole 11, is used as a sub spacer region SA. An alignment film 9 is formed as an upper layer of the organic interlayer insulating film 26. On the other hand, in a color filter substrate, a colored layer 14 is formed on a transparent substrate 32, and a common electrode 28 is formed so as to cover the colored layer 14. Here, in order to form, on the surface of the color filter substrate, a protruded wall W2 surrounding a region which faces a main spacer region MA, a rib 35 is formed on a portion of the common electrode 28 which portion corresponds to the protruded wall W2, and an alignment film 19 is formed so as to cover the common electrode 28 and the rib 35. In the configuration shown in FIG. 28, the first recess K1 is formed by the contact hole through which the pixel electrode 17 is connected with the drain extraction electrode 27. This also gives an effect of eliminating an additional step of forming the first recess K1.

Figure 29:
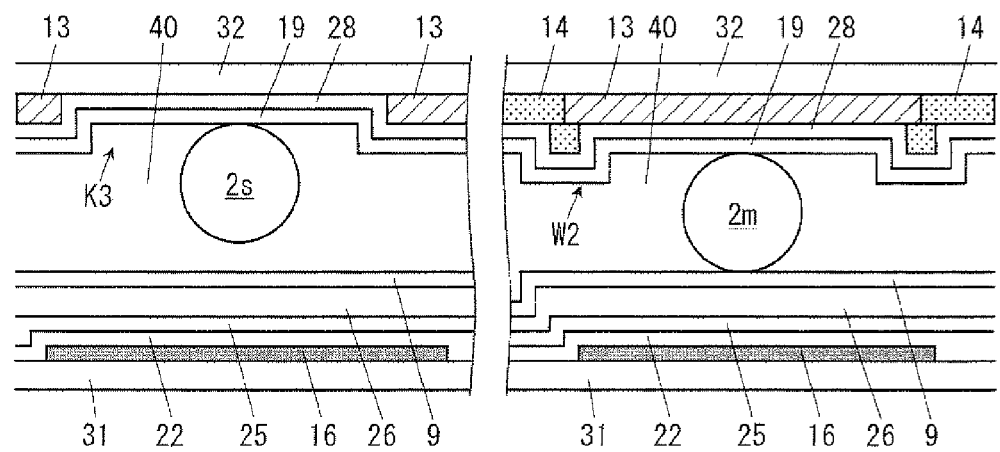
FIG. 29

In the configuration in which a protruded wall is formed on the color filter substrate side, it is also possible to form the protruded wall by an overlap (projection) of a colored layer and a light shielding layer. One example for this configuration is shown in FIG. 29. The configuration of an active matrix substrate is the same as that shown in (a) of FIG. 15. On the other hand, in a color filter substrate, a light shielding layer (black matrix) 13 is formed on a transparent substrate 32. Here, in order to form, on the surface of the color filter substrate, a protruded wall W2 surrounding a main spacer region Ma, an end of the light shielding layer 13 is caused to overlap an end of a colored layer 14 so that the overlapped portion corresponds to the protruded wall W2. In addition, in order to form, on the surface of the color filter substrate, a third recess K3 serving as a sub spacer region Sa, a portion of the light shielding layer 13 which portion corresponds to the sub spacer region Sa is hollowed out in a quadrangular shape. A common electrode 28 is formed as an upper layer of the light shielding layer 13 and the colored layer 14, and an alignment film 19 is formed so as to cover the common electrode 28.

Figure 30:
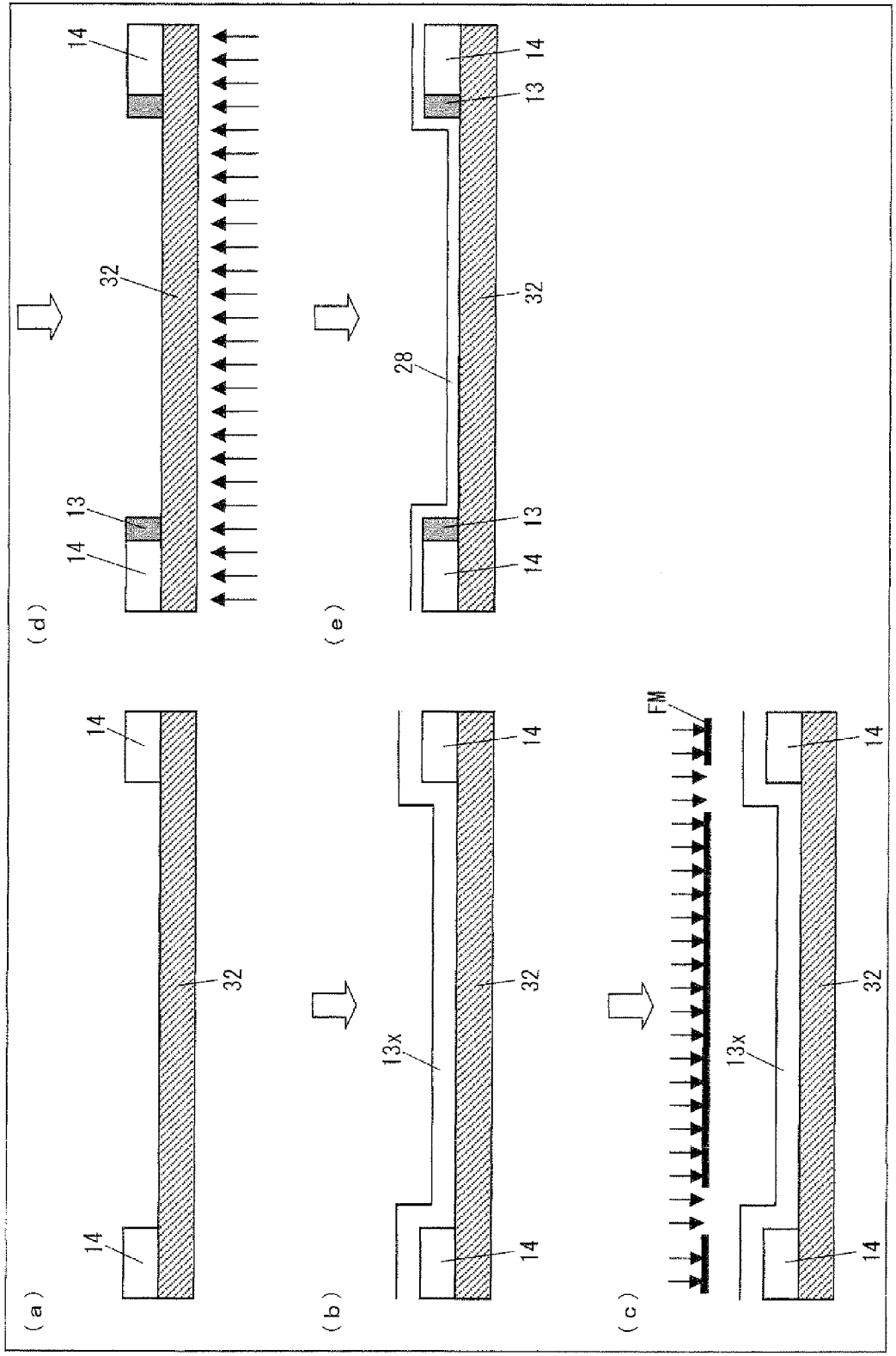
FIG. 30

Now, the following describes, with reference to FIG. 30, a method for locally hollowing out the light shielding layer 13. As shown in FIG. 30, firstly, first to third colored layers 14 respectively corresponding to three primary colors (red, green, blue) are formed (see (a) of FIG. 30). Subsequently, a negative acrylic black photosensitive resin film 13x in which carbon particles are dispersed is applied by e.g., spin-coating so as to cover the colored layer thus formed (see (b) of FIG. 30). After that, the negative acrylic black photosensitive resin film 13x is dried, and is subjected to exposure with use of a photo mask from the surface of the negative acrylic black photosensitive resin film 13x (see (c) of FIG. 30). The photo mask FM which is used in the exposure has a pattern with which (i) a portion which corresponds to a pixel region and in which each colored layer 14 is formed and (ii) a portion which corresponds to a hollowed-out portion (having a quadrangular shape) located at a gap region between the colored layers 14 are not subjected to exposure. Therefore, these two portions, which are not subjected to exposure, are not cured, whereas the other portion(s) (e.g., a surrounding of the hollowed-out portion) is/are cured by exposure. Thereafter, development is carried out, so that the portion(s) in a substantial uncured state is/are removed. Note that the "substantial uncured state" includes (i) a state in which the film is cured to an extent which allows the film to be substantially removed after development and (ii) a state in which the film is completely uncured. Consequently, the black photosensitive resin film is removed from (i) the portion which corresponds to the pixel region and in which each colored layer 14 is formed and (ii) the portion which corresponds to the hollowed-out portion located at the gap region between the colored layers 14, whereas the black photosensitive resin film 13x is left as it is at the portion which corresponds to the surrounding of the hollowed-out portion. Thus, a light shielding layer (black matrix) 13 which has been patterned in a desired shape is obtained (see (d) of FIG. 30).

Figure 31:
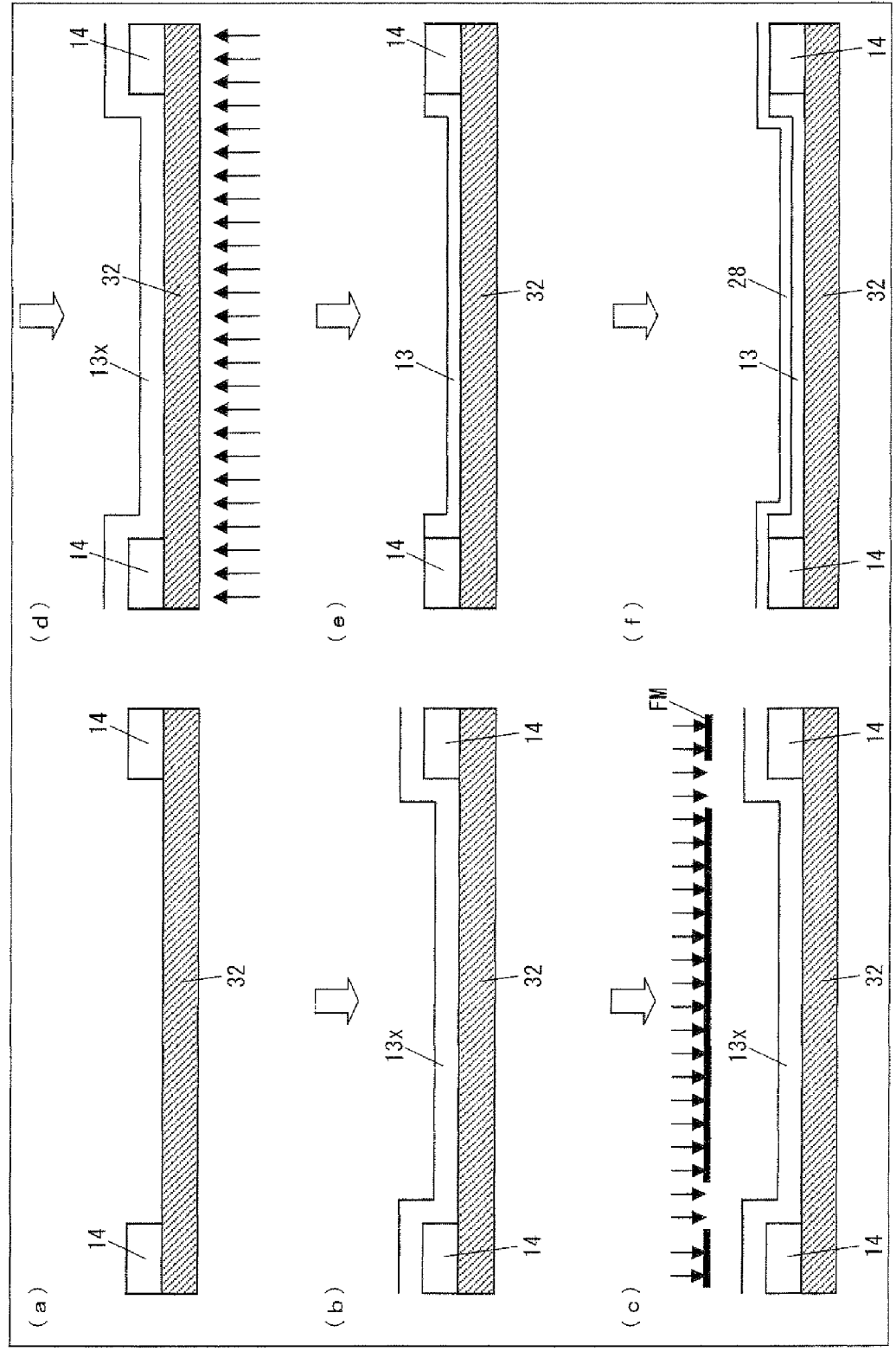
FIG. 31

A light shielding layer 13, which has a locally thinner portion as shown in (d) of FIG. 25, is formed by carrying out the steps shown in FIG. 31. That is, a first colored layer 14 (red), a second colored layer 14 (green), and a third colored layer 14 (blue) are formed (see (a) of FIG. 31), and a negative acrylic black photosensitive resin film 13x in which carbon particles are dispersed is applied by e.g., spin-coating so as to cover the colored layer thus formed (see (b) of FIG. 31). After that, the negative acrylic black photosensitive resin film 13x is dried, and is subjected to exposure with use of a photo mask FM from the surface of the negative acrylic black photosensitive resin film 13x (see (c) of FIG. 31). The photo mask which is used in the exposure has a pattern with which (i) a portion which corresponds to a pixel region and in which each colored layer 14 is formed and (ii) a portion which corresponds to a thin-film portion (having a quadrangular shape) located at a gap region between the colored layers 14 are not subjected to exposure. Therefore, these two portions, which are not subjected to exposure, are not cured, whereas the other portion(s) (e.g., a surrounding of the thin-film portion) is/are cured by exposure. Subsequently, the colored layer 14 is used as a mask to carry out exposure (back-surface exposure) on the black photosensitive resin film 13x from the back surface of the transparent substrate 32 (see (d) of FIG. 31). As a result, at the gap region between the colored layers 14, a back-surface-adjacent portion of the black photosensitive resin film 13x is cured. Thereafter, development is carried out, so that the portion(s) in a substantial uncured state is/are removed. Consequently, the black photosensitive resin film is removed from the portion which correspond to the pixel region and in which the colored layer 14 is formed; the black photosensitive resin film is made thinner and left at the portion which corresponds to the thin-film portion located at the gap region between the colored layers; and the black photosensitive resin film is left as it is (so as to remain thick) at the portion which corresponds to the surrounding of the thin-film portion. Thus, a black matrix 13 which has been patterned in a desired shape is obtained (see (e) of FIG. 31). Note that it is possible to adjust a thickness of the thin-film portion of the black photosensitive resin by adjusting an amount of light used in the back-surface exposure. The above-described method can also be used to form a colored layer locally having a thinner portion. In such a case, the above-described method may be carried out as follows: A negative colored photosensitive resin film is subjected to (i) exposure using a photo mask from the surface of the negative colored photosensitive resin film and (ii) exposure using another colored layer and a light shielding layer as a mask from the back surface of the transparent substrate, and then is subjected to development.

After the colored layer 14 and the black matrix 13 are formed as described above, a common electrode 28 made of a transparent electrode such as ITO is formed by sputtering (see (e) of FIG. 30 and (f) of FIG. 31), and an alignment film is applied on the common electrode 28 by e.g., an ink-jet method. In the above-described manufacturing steps, the colored layers (R, G, B) are formed before formation of the light shielding layer (black matrix), however, the present invention is not limited to this. Instead of this, it is possible to form a light shielding layer (black matrix) before formation of colored layers (R, G, B).

In the present embodiments, a thickness of the light shielding layer 13 (black matrix) is set to approximately 2.0 µm (approximately 1.0 µm at a thinner portion), a thickness of the colored layer is set to approximately 1.8 µm, and a depth of the third recess K3 is set to approximately 2.0 µm. Further, a shape of a recess (a first recess K1 or a third recess K3) for a sub spacer region is made so that each of the four sides of the recess is approximately 60 µm.

In the liquid crystal panel of the present invention, a recess may be formed on a surface of a color filter substrate also by locally hollowing out a light shielding layer 13 located on the data signal line. However, since the scanning signal line and the retention capacitor wire have a larger wire width than that of the data signal line, it is easier to form a main spacer region and a sub spacer region on the scanning signal line or the retention capacitor wire. That is, there may be a case where a recess having such a size that expands beyond the data signal line is within the width of the scanning signal line or the retention capacitor wire. Further, even in a case where a wire width is made larger in accordance with the size of a recess, an effect on an aperture ratio is small. Now, a reason why the scanning signal line has a wider width than that of the data signal line is explained. Comparing, on the per-line basis, the number of parasitic capacitances formed in a part where the scanning signal line and the data signal line intersect with each other, the scanning signal line has a larger number of parasitic capacitances than the data signal line has. In addition, the scanning signal line has a longer wire length than that of the data signal line. For these reasons, the scanning signal line is required to reduce its resistance (i.e., increase its wire width) in order to prevent a signal delay. Regarding the retention capacitor wire, there is a case where a wire width of the retention capacitor wire is set to be large so that an area where the retention capacitor wire overlaps a pixel electrode or a drain extraction electrode is gained and thereby a necessary retention capacitance is achieved.

Note that, in each of the foregoing embodiments, the inorganic gate insulating film 22 may be made of SiNx (silicon nitride); the inorganic interlayer insulating film 25 may be made of SiNx having a thickness of approximately 0.3 μm; and the organic interlayer insulating layer 26 may be made of acrylic resin having a thickness of approximately 2.0 μm.

A material of the organic gate insulating film 21 may be any insulating material, and preferably be a material including an organic matter or a spin-on-glass (SOG) material. The SOG material refers to a material with which a glass film (silica film) can be formed by means of a coating method such as spin-coating. Of the SOG materials, for example, a spin-on-glass material including an organic component (so-called organic SOG material) is more preferable. Particularly, as the organic SOG material, an SOG material using Si—O—C bonding as its framework or an SOG material using Si—C bonding as its framework may be preferably used. The organic SOG material has a low relative permittivity, and allows to form a thick film easily. That is, use of the organic SOG material makes it possible to easily form a thick organic gate insulating film 21 having a low relative permittivity. Not only that, use of the organic SOG material provides planarization. In the present embodiments, a thickness of the organic gate insulating film 21 is set to be within a range from approximately 1.5 μm to approximately 2.0 μm. Note that, in addition to the SOG material, examples of the material including an organic matter encompass acrylic resin, epoxy resin, polyimide resin, polyurethane resin, and polysiloxane resin.

In the foregoing embodiments, the SOG material or the like is applied by spin-coating so as to cover the retention capacitor wire 18 and the scanning signal line 16, so that the organic gate insulating film 21 (planarizing film) is formed. Here, in order to locally hollow out the organic gate insulating film 21, a photo resist is applied onto the organic gate insulating film 21, exposure is carried out with use of a photo mask, and thereafter development is carried out. Subsequently, dry-etching is carried out. In the dry-etching, for example, a mixed gas of hydrogen tetrafluoride (CF$_4$) and oxygen (O$_2$) is used.

In order to make an organic gate insulating film locally thinner, half exposure may be carried out on a region of a positive photo resist which region is desired to be made thinner. After development is carried out, the region having been subjected to half exposure has a resist whose film thickness is smaller than those of other resist regions. Therefore, through dry-etching process, the resist of the region having been subjected to half exposure is removed. Consequently, when the dry-etching is ended, a locally-thin organic gate insulating film is given. Note that the above-described methods for locally hollowing out an organic gate insulating film and for making an organic gate insulating film partially thinner may be carried out with various kinds of resin materials.

In a case where an SOG material or various kinds of resin materials has positive photosensitivity, if such an SOG material or various kinds of resin materials is applied by spin-coating and is subjected to exposure using a photo mask, the region having been subjected to the exposure is locally hollowed out after development. If such an SOG material or various kinds of resin materials is applied by spin-coating and is subjected to half exposure using a photo mask, the region having been subjected to the half exposure is locally made thinner after development. Thus, in the case where an insulating material has photosensitivity, it is not necessary to carry out dry-etching and/or the like. This provides an advantage of simplifying the steps, and also provides an advantage that a locally-thinner portion can be formed while an amount of film to be remained is controlled merely by an accuracy of half exposure (i.e., an accuracy of dry-etching is not affected). Note that the above-described method for locally hollowing out an organic gate insulating film or for making an organic gate insulating film partially thinner may be applied to an organic interlayer insulating film or an overcoating film.

Now, the following describes one method for manufacturing a liquid crystal panel with use of the foregoing color filter substrate and active matrix substrate.

Firstly, spacers are provided by an ink-jet method in recesses formed on a surface of the color filter substrate as described below. Described herein is a manufacturing method in which spacers are provided on a surface of the color filter substrate. However, a similar method can be used in a case where spacers are provided on a surface of the active matrix substrate. A method for providing spacers to predetermined positions by an ink-jet method is described in e.g., Japanese Patent Application Publication, Tokukaisho, No. 57-58124.

Specifically, an ink-jet coating device ejects droplets of e.g., isopropyl alcohol containing spacers, so that the droplets land in the recesses. Here, each of the spacers is a spherical particle (having a diameter of approximately 3 μm) which is made of a synthetic resin and whose surface is coated with an adhesive. Then, the ink (droplets) is dried, so that the spacers are fixed to the recesses by the adhesive covering their surfaces. Note that the adhesive is preferably thermosetting. In such a case, before both substrates are bonded to each other, a substrate to which spacers have been applied is heated so that the spacers are fixed to the substrate.

Liquid crystal may be filled by means of e.g., a vacuum filling method, in which an opening for injecting the liquid crystal is created on the periphery of the substrates with a thermosetting sealing resin or the like, and the liquid crystal is injected by immersing, under vacuum, the opening in the liquid crystal, and exposing it to the atmosphere, and then the opening is sealed with a UV cure resin or the like. Alternatively, the below-described one drop filling process may be used.

Specifically, a UV-cure sealing resin is applied to the periphery of the active matrix substrate, and the one drop filling method is carried out so that an optimum amount of liquid crystal is regularly dripped onto the color filter substrate and inside the sealing. The amount of liquid crystal to be dripped is determined by a cell gap value and a capacity value indicative of an amount of liquid crystal to be filled in the cell.

Further, in order to bond (i) the color filter substrate to (ii) the active matrix substrate, to which seal patterning and dripping of liquid crystal have been carried as described above, a pressure of atmosphere inside a combining device is reduced to 1 Pa, and the color filter substrate and the active matrix substrate are bonded to each other at the reduced pressure. After that, the atmosphere is returned to an atmospheric pressure.

Next, the structure that has obtained a desired cell gap is subjected to UV radiation by a UV cure device so that the sealing resin is tentatively cured. Subsequently, the sealing resin is baked to finalize the curing. At this stage, the liquid crystal spreads over the region inside the sealing resin, and the cell is filled with the liquid crystal. After completion of the baking, the structure is divided, so that a liquid crystal panel is created.

In the present embodiment, a liquid crystal display unit of the present invention and a liquid crystal display device of the present invention are made as follows:

Polarization plates are attached to both surfaces of a liquid crystal panel which has been washed. Note that the polarization plate may be stacked with an optical compensation sheet and/or the like, if necessary. Next, as shown in (a) of FIG. 34, drivers (gate driver 102, source driver 101) are connected with the liquid crystal panel. The following explains, as one example, a TCP (Tape Career Package) method for connecting the drivers. Firstly, ACFs (Anisotoropi Conduktive Films) are tentatively pressure-bonded to the terminals of the liquid crystal panel. Subsequently, TCPs on which drivers are mounted are punched out from the carrier tape, and are aligned to respective panel terminal electrodes. Then, heating is carried out, and the bonding is completed. After that, a circuit substrate 103 (PWB: Printed Wiring Board) for causing the driver TCPs to be coupled to each other is connected with the input terminals of the TCPs via ACF. Thus, a liquid crystal display unit 100 is completed.

Figure 34:
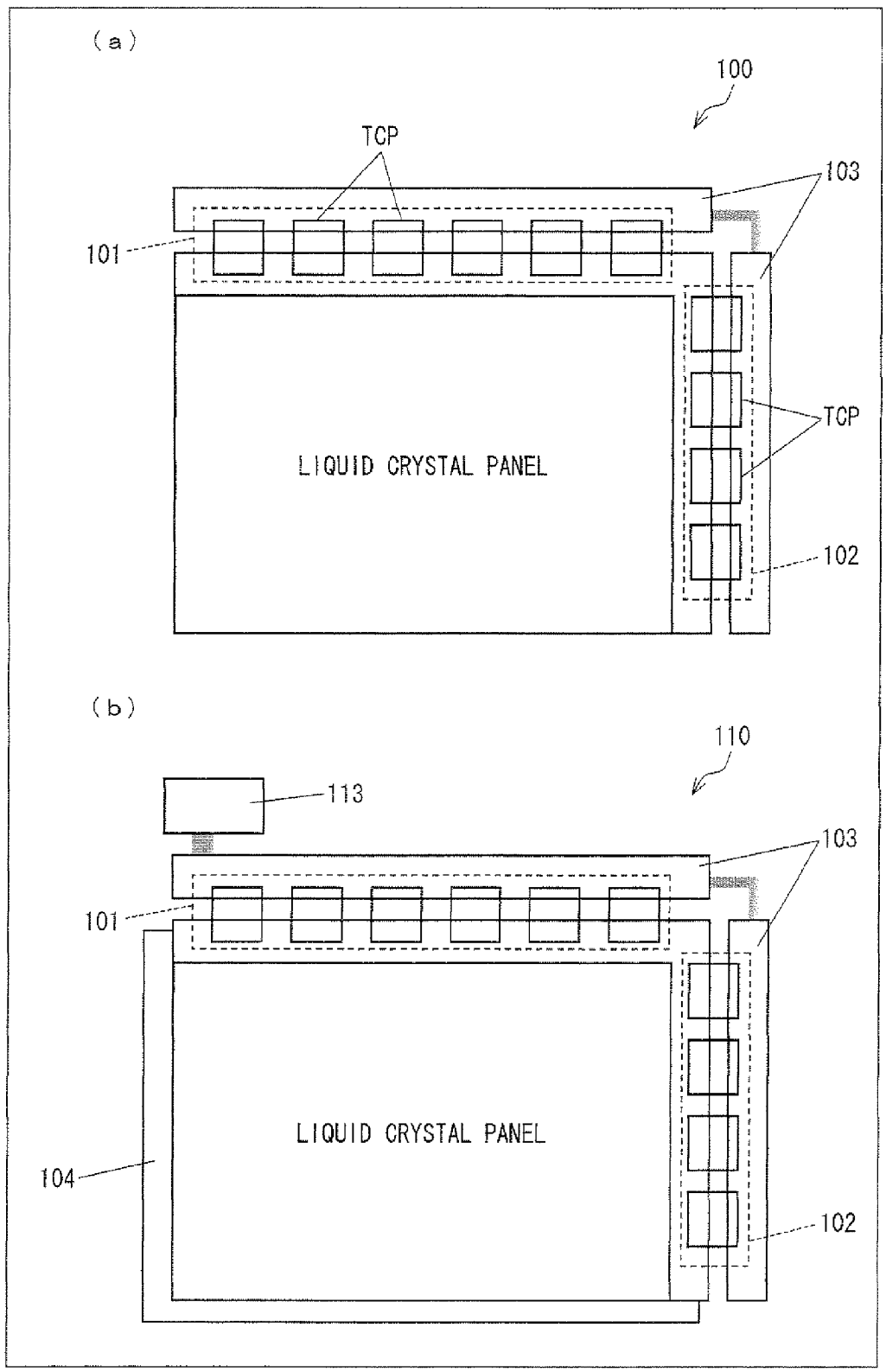
FIG. 34

After that, as shown in (b) of FIG. 34, the drivers (101, 102) of the liquid crystal display unit are connected with a display control circuit 113 via the circuit substrate 103, so that the liquid crystal display unit with which the display control circuit 113 is connected is combined with an illumination device (backlight unit) 104. Thus, a liquid crystal display device 110 is given.

Figure 35:
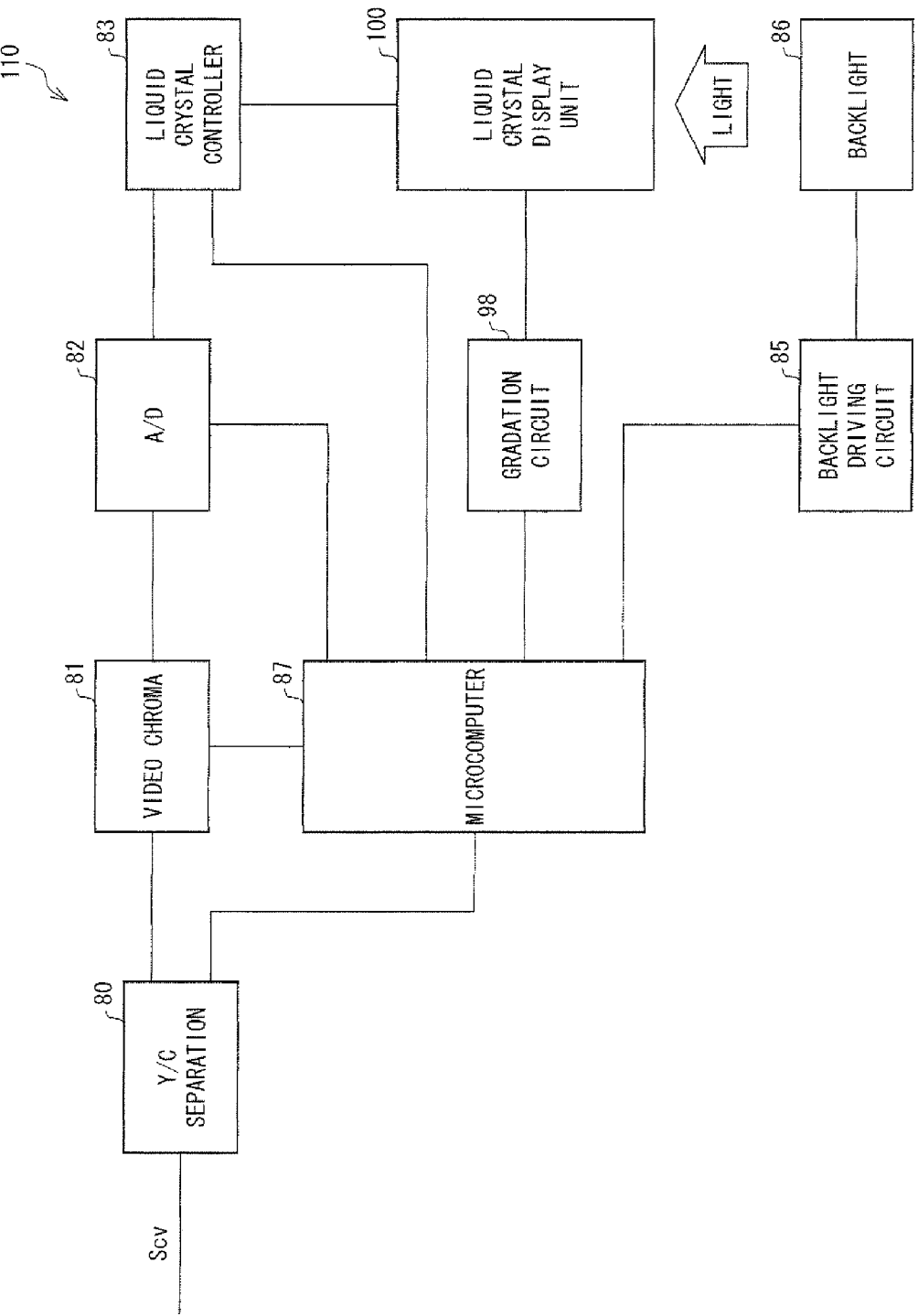
FIG. 35

Next, the following describes one example of a configuration in which a liquid crystal display device of the present invention is applied to a television receiver. FIG. 35 is a block diagram illustrating a configuration of a liquid crystal display device 110 to be applied to a television receiver. The liquid crystal display device 110 includes a liquid crystal display unit 100, a Y/C separation circuit 80, a video chroma circuit 81, an analog-to-digital converter 82, a liquid crystal controller 83, a backlight driving circuit 85, a backlight 86, a microcomputer 87, and a gradation circuit 98.

The liquid crystal display unit 100 includes: the liquid crystal panel described in the above-described embodiment; and a source driver and a gate driver each of which is for driving the liquid crystal panel.

In the liquid crystal display device 110 having this configuration, firstly, a complex color video signal Scv as a television signal is externally inputted to the Y/C separation circuit 80, and then the Y/C separation circuit 80 separates the complex color video signal Scv into a luminance signal and a color signal. The luminance signal and the color signal are converted by the video chroma circuit 81 into an analog RGB signal corresponding to three primary colors of light. Thereafter, the analog RGB signal is converted by the analog-to-digital converter 82 into a digital RGB signal. The digital RGB signal is inputted to the liquid crystal controller 83. Further, the Y/C separation circuit 80 also extracts, from the complex color video signal Scv externally inputted, horizontal and vertical synchronizing signals, and these synchronizing signals are also inputted to the liquid crystal controller 83 via the microcomputer 87.

The digital RGB signal and a timing signal which is based on the synchronizing signals are inputted to the liquid crystal display unit 100 from the liquid crystal controller 83 at a predetermined timing. The gradation circuit 98 generates gradation voltages for respective three primary colors, R, G, and B of color display, and the gradation voltages thus generated are supplied to the liquid crystal display unit 100. In the liquid crystal display unit 100, the source driver, the gate driver, and/or the like inside the liquid crystal display unit 100 generate driving signals (e.g., a data signal, a scanning signal) based on the RGB signal, the timing signal, and the gradation voltages. Based on the driving signals, a color image is displayed on a display section in the liquid crystal display unit 100. Here, in order to cause the liquid crystal display unit 100 to display an image, it is necessary to emit light from behind the liquid crystal display unit 100. In the liquid crystal display device 110, the backlight driving circuit 85 drives the backlight 86 under control of the microcomputer 87, so that light is emitted to the back surface of the liquid crystal panel.

The microcomputer 87 controls the whole of the system, including the above-described processes. Note that examples of a video signal (complex color video signal) externally inputted encompass, in addition to a video signal based on television broadcasting, a video signal picked up by a camera and a video signal supplied via the Internet. The liquid crystal display device 110 can display an image based on various kinds of video signals.

Figure 36:
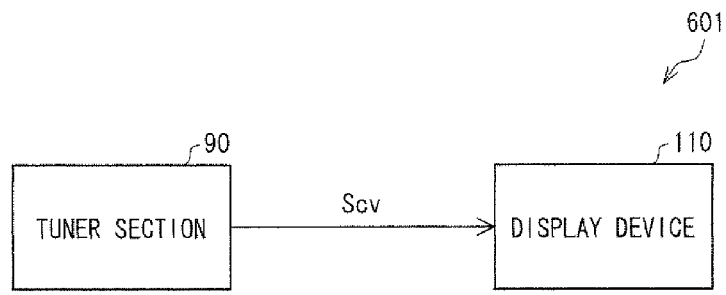
FIG. 36

In a case where the liquid crystal display device 110 displays an image based on television broadcasting, the liquid crystal display device 110 is connected with a tuner section 90, as shown in FIG. 36. Thus, a television receiver 601 of the present embodiment is constituted. This tuner section 90 selects, from received waves (high-frequency signals) received via an antenna (not illustrated), a signal of a channel to be received, and converts the selected signal into an intermediate-frequency signal. Then, the intermediate-frequency signal is detected to extract a complex color video signal Scv as a television signal. The complex color video signal Scv is inputted to the liquid crystal display device 110 as described above, and an image which is based on the complex color video signal Scv is displayed by the liquid crystal display device 110.

Figure 37:
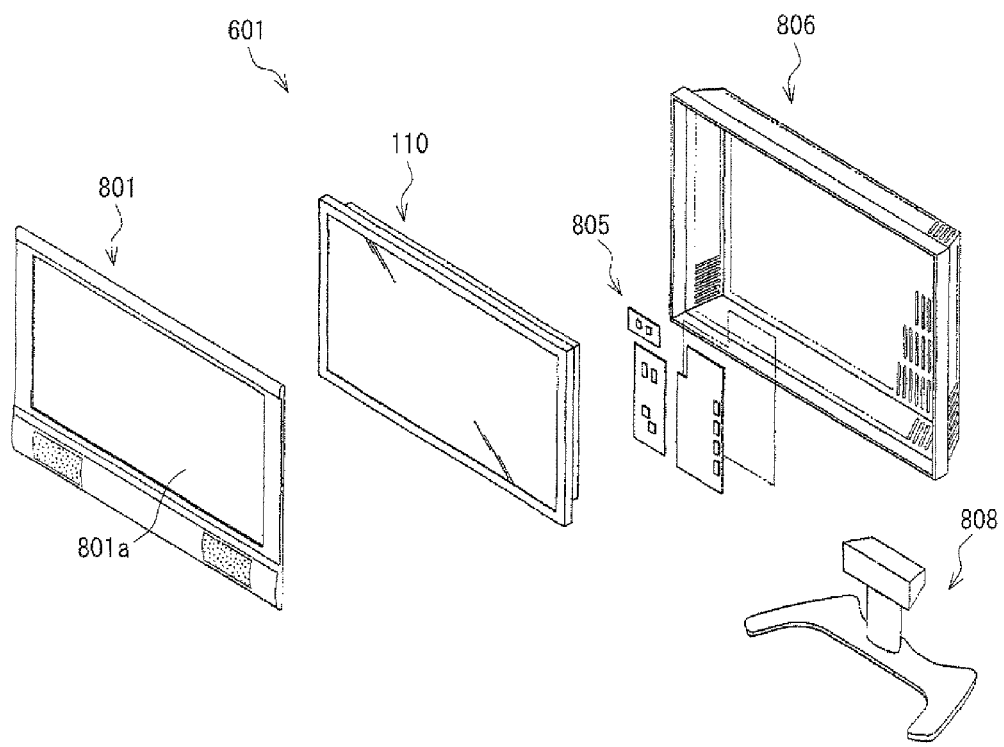
FIG. 37

FIG. 37 is an exploded perspective view illustrating one example of a configuration of a television receiver of the present embodiment. As shown in FIG. 37, the television receiver 601 includes, as its constituent elements, a first housing 801 and a second housing 806, in addition to the liquid crystal display device 110. The first housing 801 and the second housing 806 sandwich and wrap around the liquid crystal display device 110. The first housing 801 includes an opening 801a through which an image displayed on a display device 800 is transmitted. The second housing 806 covers the back surface of the display device 800. Further, the second housing 806 includes an operation circuit 805 for operating the display device 800, and is provided with a supporting member 808 below the second housing 806.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

A liquid crystal panel and a liquid crystal display device of the present invention can be suitably used in a liquid crystal television, for example.

The invention claimed is:

1. A liquid crystal panel comprising:
a first substrate including a transparent substrate on which a transistor, a pixel electrode, and a signal line are formed;
a second substrate including a transparent substrate on which a common electrode is formed;
a liquid crystal material provided between the first substrate and the second substrate; and
a main spacer which is spherical and is in contact with the first substrate and the second substrate,
the first substrate having a surface provided with a region which is away from the transparent substrate in the first substrate at a distance shorter than a distance between (i) the transparent substrate in the first substrate and (ii) a portion where the surface of the first substrate and the main spacer are in contact with each other,
a sub spacer which is spherical being provided so as to overlap the region;
wherein the region is defined by a first recess provided on the surface of the first substrate; and
the second substrate has a surface including a portion which overlaps the sub spacer and which is recessed.

2. The liquid crystal panel as set forth in claim 1, wherein: a diameter of the main spacer is equal to a diameter of the sub spacer.

3. The liquid crystal panel as set forth in claim 1, wherein: the region overlaps at least one of a scanning signal line formed in the first substrate, a retention capacitor wire formed in the first substrate, and a light shielding layer formed in the second substrate.

4. The liquid crystal panel as set forth in claim 1, wherein: the surface of the first substrate is formed with a protruded wall surrounding the main spacer.

5. The liquid crystal panel as set forth in claim 1, wherein: the second substrate has a surface formed with a protruded wall surrounding a portion of the surface of the second substrate which portion overlaps the main spacer.

6. The liquid crystal panel as set forth in claim 1, wherein: the main spacer is provided so as to overlap a second recess which is formed on the surface of the first substrate and which is shallower than the first recess.

7. The liquid crystal panel as set forth in claim 1, wherein: the second substrate has a surface including a portion which overlaps the sub spacer and which is recessed; and the surface of the second substrate includes a portion which overlaps the main spacer and which is recessed.

8. A liquid crystal panel comprising:
a first substrate including a transparent substrate on which a transistor, a pixel electrode, and a signal line are formed;
a second substrate including a transparent substrate on which a common electrode is formed;
a liquid crystal material provided between the first substrate and the second substrate; and
a main spacer which is spherical and is in contact with the first substrate and the second substrate,
the first substrate having a surface provided with a region which is away from the transparent substrate in the first substrate at a distance shorter than a distance between (i) the transparent substrate in the first substrate and (ii) a portion where the surface of the first substrate and the main spacer are in contact with each other,
a sub spacer which is spherical being provided so as to overlap the region;
wherein the region is defined by a first recess provided on the surface of the first substrate;
wherein: the first recess is formed by hollowing out an insulating film formed in the first substrate or by making the insulating film partially thinner;
wherein the insulating film is an interlayer insulating film provided above a gate insulating film; the interlayer insulating film includes a plurality of layers, and at least one of the plurality of layers is locally hollowed out.

9. The liquid crystal panel as set forth in claim 8, wherein: the insulating film is formable by coating.

10. The liquid crystal panel as set forth in claim 8, wherein: the insulating film includes an organic matter.

11. The liquid crystal panel as set forth in claim 8, wherein: the insulating film includes at least one of a spin-on-glass material, acrylic resin, epoxy resin, polyimide resin, polyurethane resin, novolac resin, and polysiloxane resin.

12. The liquid crystal panel as set forth in claim 8, wherein: the insulating film has photosensitivity.

13. A liquid crystal panel comprising:
a first substrate including a transparent substrate on which a transistor, a pixel electrode, and a signal line are formed;
a second substrate including a transparent substrate on which a common electrode is formed;
a liquid crystal material provided between the first substrate and the second substrate; and
a main spacer which is spherical and is in contact with the first substrate and the second substrate,
the first substrate having a surface provided with a region which is away from the transparent substrate in the first substrate at a distance shorter than a distance between (i) the transparent substrate in the first substrate and (ii) a portion where the surface of the first substrate and the main spacer are in contact with each other,
a sub spacer which is spherical being provided so as to overlap the region;
wherein the region is defined by a first recess provided on the surface of the first substrate;
the surface of the first substrate is formed with a protruded wall surrounding the main spacer; and
wherein: the protruded wall includes a metal layer or a semiconductor layer, the metal layer and a data signal line being formed in the same step, the semiconductor layer and a channel section of the transistor being formed in the same step.

14. The liquid crystal panel as set forth in claim 1, wherein: the first recess is formed by a contact hole through which the transistor and the pixel electrode are electrically connected with each other.

15. The liquid crystal panel as set forth in claim 1, wherein: a plurality of sub spacers are provided so as to overlap the first recess.

16. The liquid crystal panel as set forth in claim 1, wherein: the main spacer and the sub spacer are provided by means of an ink-jet method.

17. The liquid crystal panel as set forth in claim 1, wherein: an area of the first recess is set based on (i) the number of sub spacer(s) to be provided in the first recess and (ii) each size of the sub spacer(s).

* * * * *